US010665901B2

(12) United States Patent
Honda

(10) Patent No.: US 10,665,901 B2
(45) Date of Patent: May 26, 2020

(54) BATTERY AND BATTERY MANUFACTURING METHOD WITH FOLDED CONSTRUCTION

(71) Applicant: Panasonic Intellectual Property Management Co., Ltd., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 231 days.

(21) Appl. No.: 15/880,563

(22) Filed: Jan. 26, 2018

(65) Prior Publication Data

US 2018/0248228 A1 Aug. 30, 2018

(30) Foreign Application Priority Data

Feb. 24, 2017 (JP) ................................. 2017-033075

(51) Int. Cl.
*H01M 10/0583* (2010.01)
*H01M 10/0525* (2010.01)
(Continued)

(52) U.S. Cl.
CPC ....... *H01M 10/0583* (2013.01); *H01M 4/131* (2013.01); *H01M 4/70* (2013.01); *H01M 4/75* (2013.01); *H01M 10/0404* (2013.01); *H01M 10/0431* (2013.01); *H01M 10/0463* (2013.01); *H01M 10/0525* (2013.01); *H01M 10/052* (2013.01); *H01M 10/0562* (2013.01);
(Continued)

(58) Field of Classification Search
CPC ......... H01M 10/0583; H01M 10/0431; H01M 10/045; H01M 4/70
See application file for complete search history.

(56) References Cited

U.S. PATENT DOCUMENTS 5,534,368 A * 7/1996 Morris .................... H01M 2/14
429/152
2006/0008702 A1* 1/2006 Cheon .................... H01M 2/16
429/164
(Continued)

FOREIGN PATENT DOCUMENTS

JP 2000-195495 7/2000
JP 2010-067443 3/2010
(Continued)

*Primary Examiner* — Imran Akram
(74) *Attorney, Agent, or Firm* — McDermott Will & Emery LLP

(57) ABSTRACT

A battery includes a first current collector, first electrode layer, and first counter electrode layer. The first counter electrode layer is a counter electrode of the first electrode layer. The first current collector includes first front and rear face regions, second front and rear face regions, and a first fold portion. The first rear face region is a region situated on the rear face of the first front face region. The second rear face region is a region situated on the rear face of the second front face region. The first fold portion is situated between the first and second front face regions. The first current collector is folded at the first fold portion, whereby the first and second rear face regions face each other. The first electrode layer is in contact with the second front face region, and the first counter electrode layer with the first front face region.

20 Claims, 32 Drawing Sheets

(51) Int. Cl.
   *H01M 10/04* (2006.01)
   *H01M 10/0562* (2010.01)
   *H01M 4/75* (2006.01)
   *H01M 4/131* (2010.01)
   *H01M 4/70* (2006.01)
   *H01M 4/02* (2006.01)
   *H01M 10/052* (2010.01)
   *H01M 10/0585* (2010.01)

(52) U.S. Cl.
   CPC .. *H01M 10/0585* (2013.01); *H01M 2004/021* (2013.01); *Y02E 60/122* (2013.01); *Y02T 10/7011* (2013.01)

(56) References Cited

U.S. PATENT DOCUMENTS

| | | | | |
|---|---|---|---|---|
| 2008/0280201 A1* | 11/2008 | Konishiike | | H01M 4/134 429/209 |
| 2009/0169979 A1* | 7/2009 | Ohashi | | H01M 10/0431 429/94 |
| 2010/0203384 A1* | 8/2010 | West | | H01M 2/08 429/209 |
| 2011/0311854 A1* | 12/2011 | Takeuchi | | H01M 6/14 429/129 |
| 2011/0318633 A1* | 12/2011 | Kim | | H01M 2/26 429/163 |
| 2012/0040231 A1* | 2/2012 | Hagiwara | | H01G 9/016 429/136 |
| 2013/0177787 A1* | 7/2013 | Arima | | H01M 2/348 429/62 |
| 2014/0045040 A1* | 2/2014 | Chami | | H01M 2/1646 429/160 |
| 2015/0072204 A1* | 3/2015 | Kwon | | H01M 10/0436 429/94 |
| 2016/0240325 A1* | 8/2016 | Tajima | | H01G 11/82 |
| 2016/0285133 A1* | 9/2016 | Baumeister | | H01M 10/045 |
| 2016/0322685 A1* | 11/2016 | Choi | | H01M 2/1077 |
| 2017/0033327 A1* | 2/2017 | Tajima | | H01M 2/0212 |

FOREIGN PATENT DOCUMENTS

JP     2013-097907      5/2013
WO     WO-2017173615 A1 * 10/2017 ............. H01G 11/70

* cited by examiner

BATTERY AND BATTERY MANUFACTURING METHOD WITH FOLDED CONSTRUCTION

BACKGROUND

1. Technical Field

The present disclosure relates to a battery and a battery manufacturing method.

2. Description of the Related Art

Japanese Unexamined Patent Application Publication No. 2000-195495 discloses a sheet battery including a composite current collector having a positive current collector layer on one face side and having a negative current collector layer on the other face side.

Japanese Unexamined Patent Application Publication No. 2010-67443 discloses a battery including an electrode base material sectioned into multiple regions and folded at each region, and a unit battery portion including a solid electrolytic layer provided to each folded region of the electrode base material and a positive-and-negative pair of electrode active material layers that sandwich the solid electrolytic layer.

SUMMARY

Improved bonding strength of components of the battery is desired in the conventional art.

In one general aspect, the techniques disclosed here feature a battery including a first current collector, a first electrode layer, and a first counter electrode layer. The first counter electrode layer is a counter electrode of the first electrode layer. The first current collector includes a first front face region, a first rear face region, a second front face region, a second rear face region, and a first fold portion. The first rear face region is a region situated on the rear face of the first front face region. The second rear face region is a region situated on the rear face of the second front face region. The first fold portion is situated between he first front face region and second front face region. The first current collector is folded at the first fold portion, whereby the first rear face region and second rear face region are positioned facing each other. The first electrode layer is disposed in contact with the second front face region. The first counter electrode layer is disposed in contact with the first front face region.

A battery manufacturing method according to an aspect of the present disclosure is a battery manufacturing method using a battery manufacturing apparatus. The battery manufacturing apparatus includes an electrode layer forming unit, a counter electrode layer forming unit, and a current collector folding unit that folds a current collector. The current collector includes a first front face region, a first rear face region, a second front face region, a second rear face region, and a first fold region. The first rear face region is a region situated on the rear face of the first front face region. The second rear face region is a region situated on the rear face of the second front face region. The first fold region is a region situated between the first front face region and the second front face region. The method includes steps of: forming (a1) the first electrode layer in contact with the second front face region by the electrode layer forming unit; forming (b1) the first counter electrode layer, which is a counter electrode of the first electrode layer, in contact with the first front face region, by the counter electrode layer forming unit; and folding (c1) the first fold region by the current collector folding unit. The first rear face region and the second rear face region are positioned facing each other, due to the current collector being folded at the first fold region in the folding step (c1).

According to the present disclosure, bonding strength of components of the battery can be improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will be described below with reference to the drawings.

First Embodiment

Figure 1:
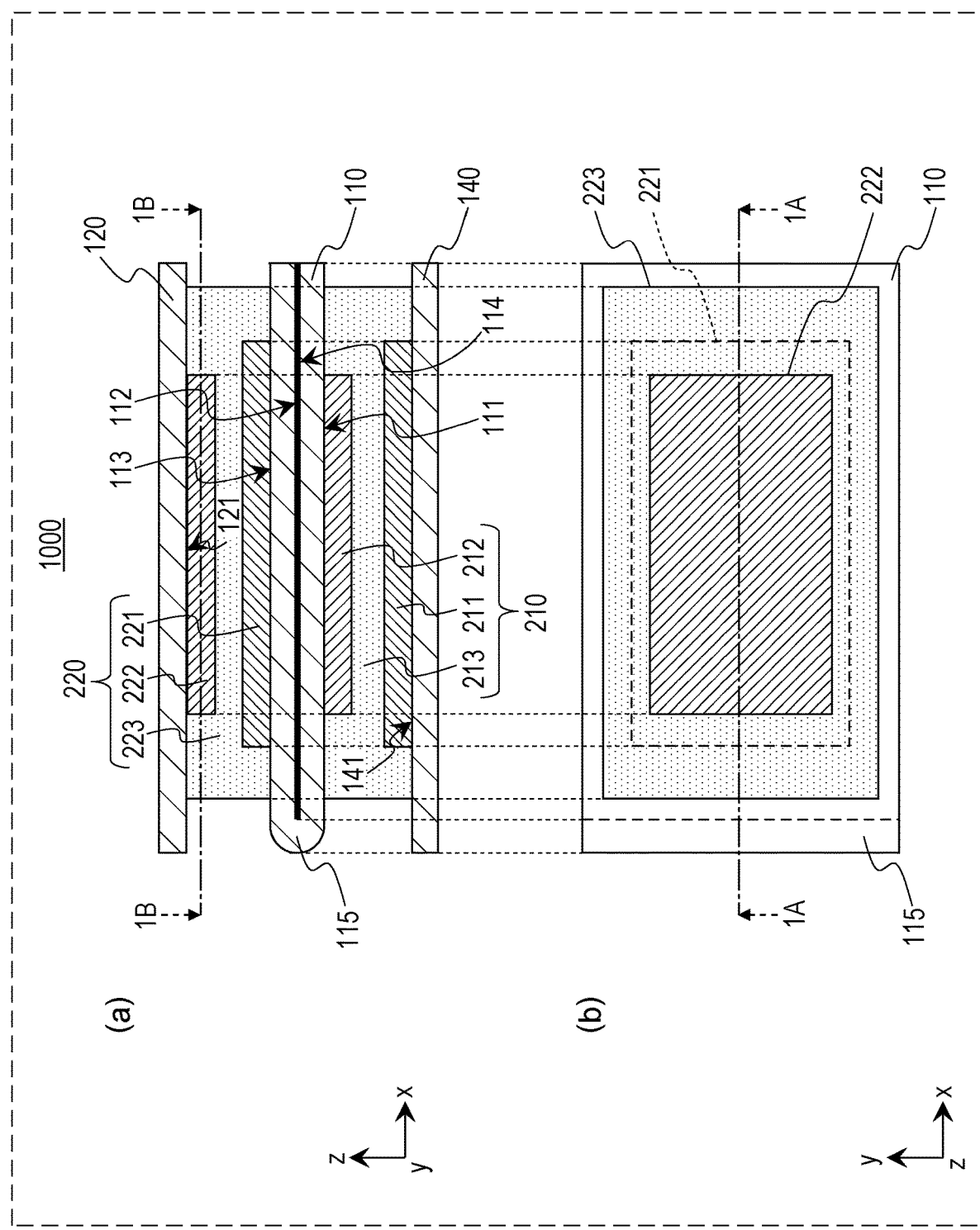
FIG. 1 is a diagram illustrating a schematic configuration of a battery according to a first embodiment.

FIG. 1 is a diagram illustrating a schematic configuration of a battery 1000 according to a first embodiment.

Indicated by (a) in FIG. 1 is an x-z view (cross-sectional view taken along 1A in FIG. 1) illustrating the schematic configuration of the battery 1000 according to the first embodiment.

Indicated by (b) in FIG. 1 is an x-y view (cross-sectional view taken along 1B in FIG. 1) illustrating the schematic configuration of the battery 1000 according to the first embodiment.

The battery 1000 according to the first embodiment includes a first current collector 110, a first electrode layer 221, and a first counter electrode layer 212.

The first counter electrode layer 212 is a counter electrode of the first electrode layer 221.

The first current collector 110 includes a first front face region 111, a first rear face region 112, a second front face region 113, a second rear face region 114, and a first fold portion 115.

The first rear face region 112 is a region situated on the rear face of the first front face region 111.

The second rear face region 114 is a region situated on the rear face of the second front face region 113.

The first fold portion 115 is situated between the first front face region 111 and second front face region 113.

The first current collector 110 is folded at the first fold portion 115. Thus, the first rear face region 112 and second rear face region 114 are positioned facing each other.

The first electrode layer 221 is disposed in contact with the second front face region 113.

The first counter electrode layer 212 is disposed in contact with the first front face region 111.

According to the above configuration, the bonding strength between components of the battery can be improved. That is to say, the first counter electrode layer 212 and first electrode layer 221 can be respectively disposed to the first front face region 111 and second front face region 113 (i.e., the two regions that are partial regions of the first current collector 110 and are linked by the first fold portion 115). Accordingly, the positional relationship between the first counter electrode layer 212 disposed on the first front face region 111 and the first electrode layer 221 disposed on the second front face region 113 can be strongly maintained by the first fold portion 115 (in other words, by the first current collector 110 that is one component). Accordingly, in a case where a laminated battery is configured using the first current collector 110 for example, two battery cells making up the battery can be linked to each other by the first current collector 110. Thus, the layers (or cells) making up the battery can be prevented from exhibiting positional shifting or separation due to shock, vibration, and so forth, when manufacturing the battery or using the battery, for example. That is to say, the strength of bonding of the layers (or cells) making up the battery can be improved by the first current collector 110. Thus, reliability of the battery can be improved.

Also, according to the above configuration, the first front face region 111 on which the first counter electrode layer 212 is disposed and the second front face region 113 on which the first electrode layer 221 is disposed can be connected by the first fold portion 115 with low resistance. That is to say, the resistance between the first front face region 111 and the second front face region 113 can be reduced. Accordingly, even in a case where the battery is operated under a large current for example, generation of heat due to contact resistance between the first rear face region 112 and second rear face region 114 can be made less easy to occur. Accordingly, deterioration performance does not readily occur even if a thin current collector is used as the first current collector 110, for example. As a result, reduced weight of the battery can be realized.

The battery 1000 according to the first embodiment may further include an outer electrode layer 211 and a first solid electrolyte layer 213, as illustrated in FIG. 1.

The outer electrode layer 211 is a counter electrode of the first counter electrode layer 212.

The first solid electrolyte layer 213 is disposed between the first counter electrode layer 212 and outer electrode layer 211.

According to the above configuration, one solid battery cell (first power-generating element 210) can be configured from the outer electrode layer 211, first counter electrode layer 212, and first solid electrolyte layer 213.

Note that the battery 1000 according to the first embodiment may further be provided with an outer current collector 140, as illustrated in FIG. 1.

The outer current collector 140 is disposed in contact with the outer electrode layer 211.

The first solid electrolyte layer 213 is disposed in contact with the first current collector 110 and the outer current collector 140.

According to the above configuration, the strength of bonding between components of the battery can be further improved. That is to say, the strength of bonding between the first current collector 110 and outer current collector 140 can be improved by the first solid electrolyte layer 213. Accordingly, the first counter electrode layer 212 can be suppressed from peeling loose from the first current collector 110. Further, the outer electrode layer 211 can be suppressed from peeling loose from the outer current collector 140. Thus, the layers making up the first power-generating element 210 can be prevented from exhibiting positional shifting or separation due to shock, vibration, and so forth, when manufacturing the battery or using the battery, for example. Thus, reliability of the battery can be improved even further.

Note that the battery 1000 according to the first embodiment may further be provided with a second counter electrode layer 222 and a second solid electrolyte layer 223, as illustrated in FIG. 1.

The second counter electrode layer 222 is a counter electrode of the first electrode layer 221.

The second solid electrolyte layer 223 is disposed between the first electrode layer 221 and second counter electrode layer 222.

According to the above configuration, one solid battery cell (second power-generating element 220) can be configured from the first electrode layer 221, second counter electrode layer 222, and second solid electrolyte layer 223. Thus, a laminated battery can be configured of the first power-generating element 210 and second power-generating element 220 being serially connected via the first current collector 110. The first power-generating element 210 (i.e., the outer electrode layer 211, first counter electrode layer 212, and first solid electrolyte layer 213) and the second power-generating element 220 (i.e., the first electrode layer 221, second counter electrode layer 222, and second solid electrolyte layer 223) can be strongly linked by the first current collector 110 at this time. Accordingly, the battery cells making up the battery (first power-generating element 210 and second power-generating element 220) can be prevented from exhibiting positional shifting or separation due to shock, vibration, and so forth, when manufacturing the battery or using the battery, for example. That is to say, the strength of bonding of the battery cells making up the battery (first power-generating element 210 and second power-generating element 220) can be improved by the first current collector 110. Thus, the reliability of the battery can be improved while raising the battery voltage by the serial connection of the first power-generating element 210 and second power-generating element 220.

Note that the battery 1000 according to the first embodiment may further be provided with a second current collector 120, as illustrated in FIG. 1.

The second current collector 120 is disposed in contact with the second counter electrode layer 222.

The second solid electrolyte layer 223 is disposed in contact with the first current collector 110 and second current collector 120.

According to the above configuration, the strength of bonding between components of the battery can be further improved. That is to say, the strength of bonding between the first current collector 110 and second current collector 120 can be improved by the second solid electrolyte layer 223. Accordingly, the first electrode layer 221 can be suppressed from peeling loose from the first current collector 110. Further, the second counter electrode layer 222 can be suppressed from peeling loose from the second current collector 120. Thus, the layers making up the second power-generating element 220 can be prevented from exhibiting positional shifting or separation due to shock, vibration, and so forth, when manufacturing the battery or using the battery, for example. Thus, reliability of the battery can be improved even further.

Details of advantages of the above will be described below by way of first and second comparative examples.

Figure 34:
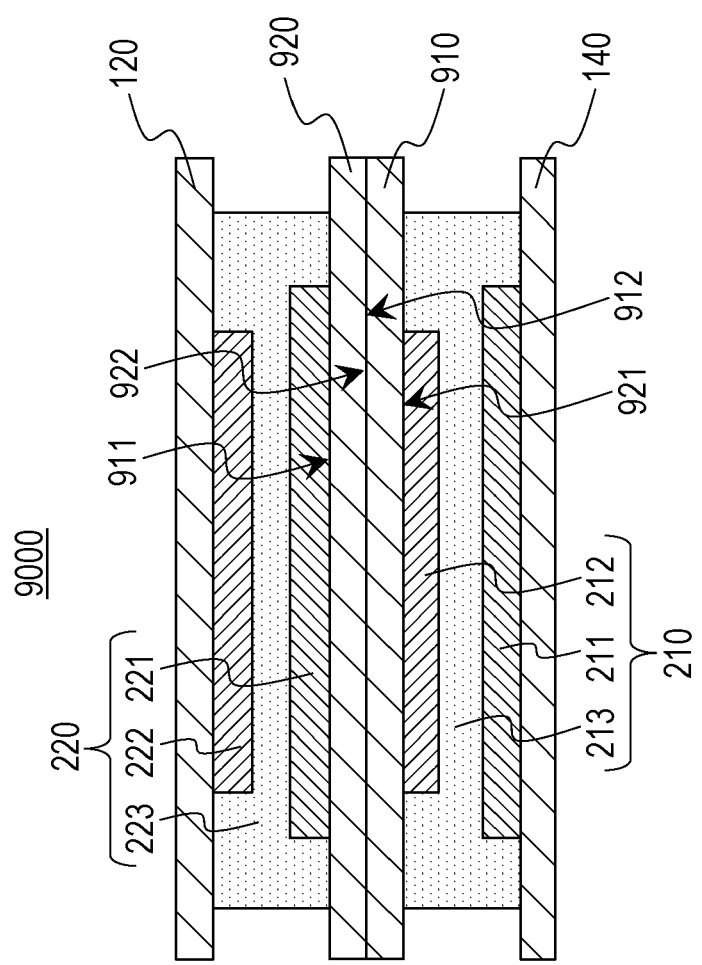
FIG. 34 is a cross-sectional view illustrating a schematic configuration of a battery according to a first comparative example.

FIG. 34 is a cross-sectional view illustrating a schematic configuration of a battery 9000 according to the first comparative example.

The battery 9000 according to the first comparative example has a current collector 910 and a current collector 920. The first electrode layer 221 is formed in a front face region 911 of the current collector 910. The first counter electrode layer 212 is formed in a front face region 921 of the current collector 920. A rear face region 912 of the current collector 910 and a rear face region 922 of the current collector 920 are disposed in contact with each other here.

Now, the battery 9000 according to the first comparative example does not have the first current collector 110 in the battery 1000 according to the first embodiment. In other words, the current collector 910 and current collector 920 are not linked to each other by a member equivalent to the first fold portion 115.

Accordingly, the strength of bonding among components of the battery cannot be improved in the first comparative example. That is to say, there is a higher probability of positional deviation occurring between the current collector 910 and current collector 920 that are not linked to each other. Accordingly, there is a higher probability of positional deviation occurring between the components situated at the front face region 911 side of the current collector 910 (e.g., the second power-generating element 220) and the components situated at the front face region 921 side of the current collector 920 (e.g., the first power-generating element 210), due to shock, vibration, and so forth, when manufacturing the battery or using the battery, for example. Accordingly, the battery reliability cannot be improved in the battery 9000 according to the first comparative example.

As opposed to this, the bonding strength among the components of the battery can be improved in the first embodiment, by having the first current collector 110 that has the first fold portion 115, as described above. The positional relationship of the components of the battery (e.g., the first power-generating element 210 and second power-generating element 220) can be maintained more strongly by the first fold portion 115 in the first embodiment, as compared to a case where the rear face region 912 of the current collector 910 and the rear face region 922 of the current collector 920 simply have an adhesive layer provided there between, in the battery 9000 according to the first comparative example, for example. Further, the resistance between the first front face region 111 and the second front face region 113 can be reduced by the first fold portion 115.

Figure 35:
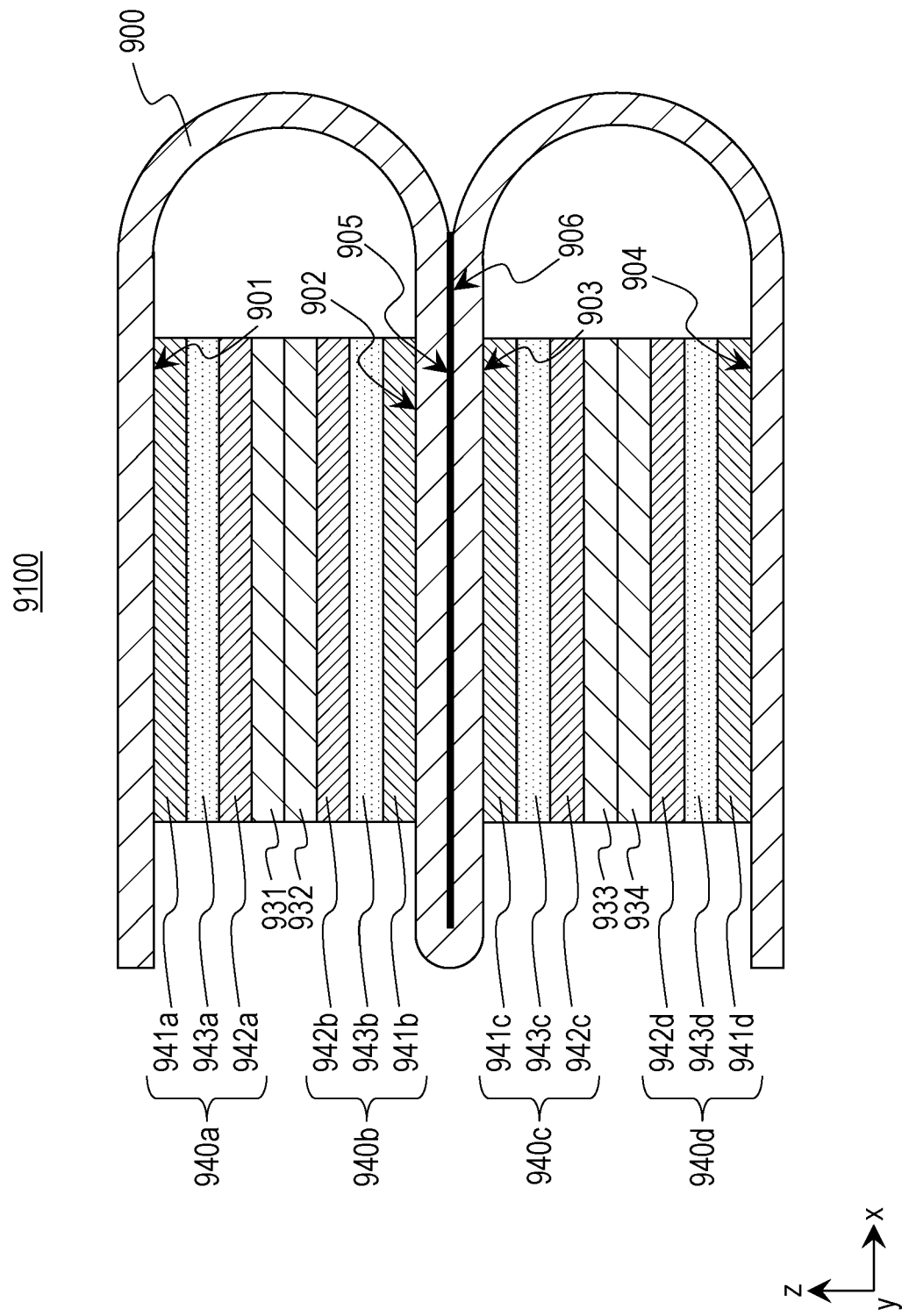
FIG. 35 is a cross-sectional view illustrating a schematic configuration of a battery according to a second comparative example.

FIG. 35 is a cross-sectional view illustrating a schematic configuration of a battery 9100 according to the second comparative example.

The battery 9100 according to the second comparative example has the current collector 900. The current collector 900 is folded so that a rear face region 905 and a rear face region 906 come into contact. Power-generating elements (940a, 940b, 940c, and 940d) are disposed in contact with front face regions (901, 902, 903, and 904) of the current collector 900. That is to say, electrode layers (941a, 941b, 941c, and 941d) are each disposed in contact with the front face regions (901, 902, 903, and 904) of the current collector 900. Solid electrolyte layers (943a, 943b, 943c, and 943d) are also each disposed in contact with the electrodes (941a, 941b, 941c, and 941d). Counter electrode layers (942a, 942b, 942c, and 942d) are each disposed in contact with the solid electrolyte layers (943a, 973b, 943c, and 943d). Current collectors (931, 932, 933, and 934) are each disposed in contact with the counter electrode layers (942a, 942b, 942c, and 942d).

The battery 9100 according to the second comparative example has two electrode layers of the same polarity (i.e., electrode layer 941b and electrode layer 941c) disposed across the fold portion of the current collector 900. That is to say, the battery 9100 according to the second comparative example does not have a bipolar electrode structure including the first current collector 110 in the battery 1000 according to the first embodiment. In other words, the battery 9100 according to the second comparative example does not have a configuration where two electrode layers of polarity opposite to each other (e.g., the first electrode layer 221 and first counter electrode layer 212) are disposed across the first fold portion 115 of the first current collector 110, as in the battery 1000 according to the first embodiment.

Accordingly, a laminated battery where the power-generating elements are serially connected cannot be made with the second comparative example. That is to say, the power-generating elements (940a, 940b, 940c, and 940d) can only be connected in parallel in the battery 9100 according to the second comparative example. Accordingly, the battery voltage cannot be raised by serially connecting the power-generating elements in the second comparative example.

As opposed to this, a laminated battery where the first power-generating element 210 and second power-generating element 220 are serially connected via the first current collector 110 can be configured in the first embodiment, as described above. Further, the intensity of bonding of the battery cells making up the battery (first power-generating element 210 and second power-generating element 220) can be raised by the first current collector 110. Accordingly, the reliability of the battery can be improved while raising the battery voltage by the serial connection of the first power-generating element 210 and second power-generating element 220.

Also, current collectors (931 and 932) of opposite polarity as that of the current collector 900 are disposed between the front face region 901 and front face region 902 of the current collector 900 in the battery 9100 according to the second comparative example. Further, current collectors (933 and 934) of opposite polarity as that of the current collector 900 are disposed between the front face region 903 and front face region 904 of the current collector 900 in the battery 9100 according to the second comparative example. That is to say, the battery 9100 according to the second comparative example does not have solid electrolyte layers disposed in contact with current collectors on both sides, as in the battery 1000 according to the first embodiment.

Accordingly, the strength of bonding between components of the battery cannot be improved in the second comparative example. That is to say, the current collector 931 and current collector 932 (or the current collector 933 and 934) in the battery 9100 according to the second comparative example readily peel away, for example. Further, the counter electrode layers (942a, 942b, 942c, and 942d) readily peel loose from the current collectors (931, 932, 933, and 934) in the battery 9100 according to the second comparative example. Thus, there is a possibility that positional deviation or separation will occur among the power-generating elements.

As opposed to this, the strength of bonding among the components of the battery can be improved even further, by the solid electrolyte layers (i.e., the first solid electrolyte layer 213 and second solid electrolyte layer 223) disposed in contact with the current collectors on both sides in the first embodiment, as described above. That is to say, the strength of bonding between the first current collector 110 and outer current collector 140 can be improved by the first solid electrolyte layer 213. The strength of bonding between the first current collector 110 and second current collector 120 can also be improved by the second solid electrolyte layer 223.

The first current collector 110, outer current collector 140, and second current collector 120 may be thin films having electroconductivity, for example. Examples of material from which first current collector 110, outer current collector 140, and second current collector 120 are formed include metal (stainless steel (SUS), aluminum (Al), copper (Cu), and so forth), for example. The thickness of the first current collector 110 (i.e., the distance between the first front face region 111 and first rear face region 112, or the distance between the second front face region 113 and second rear face region 114) may be 5 to 100 µm, for example. The thickness of the outer current collector 140 and second current collector 120 may be 5 to 100 µm, for example.

The first power-generating element 210 and second power-generating element 220 are power-generating units having charging and discharging properties (e.g., batteries), for example. The first power-generating element 210 and second power-generating element 220 may be battery cells, for example.

Note that the first power-generating element 210 and second power-generating element 220 may have solid electrolyte layers. That is to say, the first power-generating element 210 and second power-generating element 220 may be fully-solid batteries.

The configurations of the first power-generating element 210 and second power-generating element 220 (e.g., thicknesses of the layers, area, materials included, etc.) may be the same as each other, or may be different.

The outer electrode layer 211 and first electrode layer 221 are layers including electrode material (e.g., active material).

The configurations of the outer electrode layer 211 and first electrode layer 221 (e.g., thicknesses of the layers, area, materials included, etc.) may be the same as each other, or may be different.

The first counter electrode layer 212 and second counter electrode layer 222 are layers including counter electrode material (e.g., active material). Counter electrode material is material making up counter electrodes to the electrode material.

The configurations of the first counter electrode layer 212 and second counter electrode layer 222 (e.g., thicknesses of the layers, area, materials included, etc.) may be the same as each other, or may be different.

Also, the outer electrode layer 211 and first counter electrode layer 212 may be each formed over ranges narrower than the outer current collector 140 and first current collector 110 (i.e., the first front face region 111 of the first current collector 110), as illustrated in FIG. 1.

The first electrode layer 221 and second counter electrode layer 222 each may be formed over ranges narrower than the first current collector 110 (i.e., the second front face region 113 of the first current collector 110) and the second current collector 120, as illustrated in FIG. 1.

The first solid electrolyte layer 213 and second solid electrolyte layer 223 are solid electrolyte layers including solid electrolytes.

The configurations of the first solid electrolyte layer 213 and second solid electrolyte layer 223 (e.g., thicknesses of the layers, area, materials included, etc.) may be the same as each other, or may be different.

The first solid electrolyte layer 213 may be disposed over a greater area than that of the outer electrode layer 211 and first counter electrode layer 212, as illustrated in FIG. 1. That is to say, the first solid electrolyte layer 213 may be disposed in a manner covering the outer electrode layer 211 and first counter electrode layer 212. Accordingly, short-circuiting of the outer electrode layer 211 and first counter electrode layer 212 due to direct contact can be prevented.

Also, the first solid electrolyte layer 213 may be disposed over a narrower area than that of the outer current collector 140 and first current collector 110 (i.e., the first front face region 111 of the first current collector 110), as illustrated in FIG. 1. Alternatively, the range of formation of the first solid electrolyte layer 213 may be the same range as that of the outer current collector 140 and first current collector 110 (i.e., the first front face region 111 of the first current collector 110).

Also, the second solid electrolyte layer 223 may be disposed over a greater area than that of the first electrode layer 221 and second counter electrode layer 222, as illustrated in FIG. 1. That is to say, the second solid electrolyte layer 223 may be disposed in a manner covering the first electrode layer 221 and second counter electrode layer 222. Accordingly, short-circuiting of the first electrode layer 221 and second counter electrode layer 222 due to direct contact can be prevented.

Also, the second solid electrolyte layer 223 may be disposed in a range that is narrower than that of the first current collector 110 (i.e., the second front face region 113 of the first current collector 110), as illustrated in FIG. 1. Alternatively, the range of formation of the second solid electrolyte layer 223 may be the same range as that of the first current collector 110 (i.e., the second front face region 113 of the first current collector 110) and the second current collector 120.

Note that the outer electrode layer 211 and first electrode layer 221 may be negative active material layers. The electrode material in this case is a negative active material. The outer current collector 140 is a negative current collector. The first counter electrode layer 212 and second counter electrode layer 222 are positive active material layers. The counter electrode material is a positive active material. The second current collector 120 is a positive current collector.

Alternatively, the outer electrode layer 211 and first electrode layer 221 may be positive active material layers. The electrode material in this case is a positive active material. The outer current collector 140 is a positive current collector. The first counter electrode layer 212 and second counter electrode layer 222 are negative active material layers. The counter electrode material is a negative active material. The second current collector 120 is a negative current collector.

Known positive active materials (e.g., lithium cobalt oxide, lithium oxonitrate (LiNO), etc.) may be used as positive active material included in the positive active material layers. Various materials capable of detachment and insertion such as lithium (Li) may be used as ingredients of the positive active material.

Known solid electrolytes (e.g., inorganic solid electrolytes, etc.) may be used as materials included in the positive active material layers. Sulfide solid electrolytes, oxide solid electrolytes, or the like, may be used as an inorganic solid electrolyte. As an example of a sulfide solid electrolyte, a mixture of lithium sulfide and phosphorus pentasulfide ($Li_2S:P_2S_5$) may be used. The surface of the positive active material may be coated with a solid electrolyte. Conductors (e.g., acetylene black, etc.), adhesive binders (e.g., polyvinylidene difluoride, etc.) may be used as materials included in the positive active material layers.

A positive active material layer may be fabricated by a paste-like coating agent, in which these materials included in the positive active material layers have been kneaded with a solvent, being coated upon the face of a positive current collector, and dried. Pressing may be performed after drying, in order to improve the density of the positive active material layer. The thickness of the positive active material layer fabricated in this way is 5 to 300 μm, for example.

Metal foil (e.g., SUS foil or Al foil) or the like may be used as the positive current collector.

Known negative active materials (e.g., graphite, etc.) may be used as negative active material included in the negative active material layers. Various materials capable of detachment and insertion such as lithium (Li) may be used as ingredients of the negative active material.

Known solid electrolytes (e.g., inorganic solid electrolytes, etc.) may be used as materials included in the negative active material layers. Sulfide solid electrolytes, oxide solid electrolytes, or the like, may be used as an inorganic solid electrolyte. As an example of a sulfide solid electrolyte, a mixture of $Li_2S:P_2S_5$ may be used. Conductors (e.g., acetylene black, etc.), adhesive binders (e.g., polyvinylidene difluoride, etc.) may be used as materials included in the negative active material layers.

A negative active material layer may be fabricated by a paste-like coating agent, in which these materials included in the negative active material layers have been kneaded with a solvent, being coated upon the face of a negative current collector, and dried. Pressing of the negative polarity plate may be performed in order to improve the density of the negative active material layer. The thickness of the negative active material layer fabricated in this way is 5 to 300 μm, for example.

Metal foil (e.g., SUS foil or Cu foil) or the like may be used as the negative current collector.

The range of formation of the positive active material layers and the negative active material layers may be the same. Alternatively, the range of formation of the negative active material layers may be larger than the range of formation of the positive active material layers. According to this, deterioration in reliability of the battery due to lithium deposition (or magnesium deposition), for example, can be prevented.

Known solid electrolytes (e.g., inorganic solid electrolytes, etc.) may be used as materials included in the solid electrolyte layers. Sulfide solid electrolytes, oxide solid electrolytes, or the like, may be used as an inorganic solid electrolyte. As an example of a sulfide solid electrolyte, a mixture of $Li_2S:P_2S_5$ may be used.

Adhesive binders (e.g., polyvinylidene difluoride, etc.) may be used as materials included in the solid electrolyte layers.

A solid electrolyte layer may be fabricated by a paste-like coating agent, in which these included materials have been kneaded with a solvent, being coated upon the face of a positive current collector or negative current collector, and dried.

The range of formation of the solid electrolyte layer may be a narrower range than that of an adjacent current collector, as illustrated in FIG. 1. Alternatively, the range of formation of the solid electrolyte layer may be the same range as that of an adjacent current collector.

Note that in the first embodiment, the first fold portion 115 may be covered by at least one of the first solid electrolyte layer 213 and second solid electrolyte layer 223.

According to the above configuration, the first fold portion 115 can be prevented from being exposed. Accordingly, the first solid electrolyte layer 213 or second solid electrolyte layer 223 can prevent, for example, another current collector adjacent to the first current collector 110 (e.g., the outer current collector 140 or second current collector 120) and the first current collector 110 from coming into contact with each other at the first fold portion 115. Accordingly, the probability of another current collector adjacent to the first current collector 110 (e.g., the outer current collector 140 or second current collector 120) and the first current collector 110 short-circuiting can be reduced. Thus, the reliability of the battery can be improved.

Figure 2:
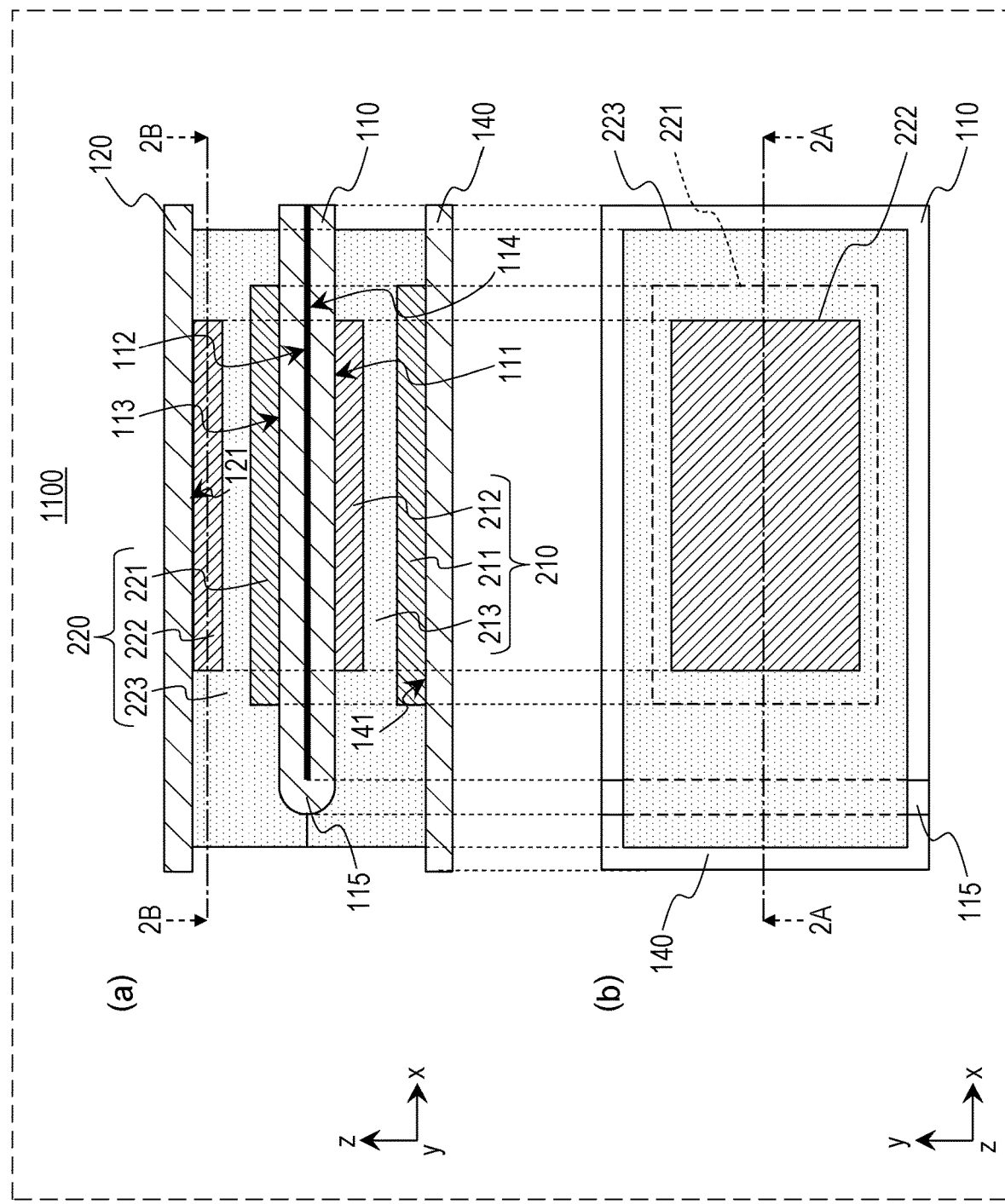
FIG. 2 is a diagram illustrating a schematic configuration of a battery according to the first embodiment.

FIG. 2 is a diagram illustrating a schematic configuration of a battery 1100 according to the first embodiment.

Indicated by (a) in FIG. 2 is an x-z view (cross-sectional view taken along 2A in FIG. 2) illustrating a schematic configuration of an example of the battery 1100 according to the first embodiment.

Indicated by (b) in FIG. 2 is an x-y view (cross-sectional view taken along 2B in FIG. 2) illustrating a schematic configuration of an example of the battery 1100 according to the first embodiment.

The battery 1100 according to the first embodiment further has, in addition to the configuration of the above-described battery 1000 according to the first embodiment, the following configuration.

That is, the first fold portion 115 of the battery 1100 according to the first embodiment is covered by both of the first solid electrolyte layer 213 and second solid electrolyte layer 223. More specifically, part of the first fold portion 115 (i.e., the part adjacent to the first front face region 111) is covered by the first solid electrolyte layer 213. Further, part of the first fold portion 115 (i.e., the part adjacent to the second front face region 113) may be covered by the second solid electrolyte layer 223.

Note that in the first embodiment, the first fold portion 115 may be covered by the first solid electrolyte layer 213 alone. Alternatively, the first fold portion 115 may be covered by the second solid electrolyte layer 223 alone.

The first rear face region 112 and second rear face region 114 may be in contact with each other in the first embodiment, as illustrated in FIGS. 1 and 2.

According to the above configuration, the first rear face region 112 and second rear face region 114 that are in contact with each other can conduct electricity. Thus, electron mobility is realized at the first fold portion 115, and also electron mobility is realized between the first rear face region 112 and second rear face region 114 that are in contact with each other, while increasing the bonding strength between the component materials of the battery by the first fold portion 115.

Note that the entire faces of the first rear face region 112 and second rear face region 114 may be in contact with each other, as illustrated in FIGS. 1 and 2. Alternatively, part of the first rear face region 112 and second rear face region 114 may be in contact with each other. Alternatively, the first rear face region 112 and second rear face region 114 do not have to be in contact with each other. In this case, a separate member may be disposed between the first rear face region 112 and second rear face region 114.

Figure 3:
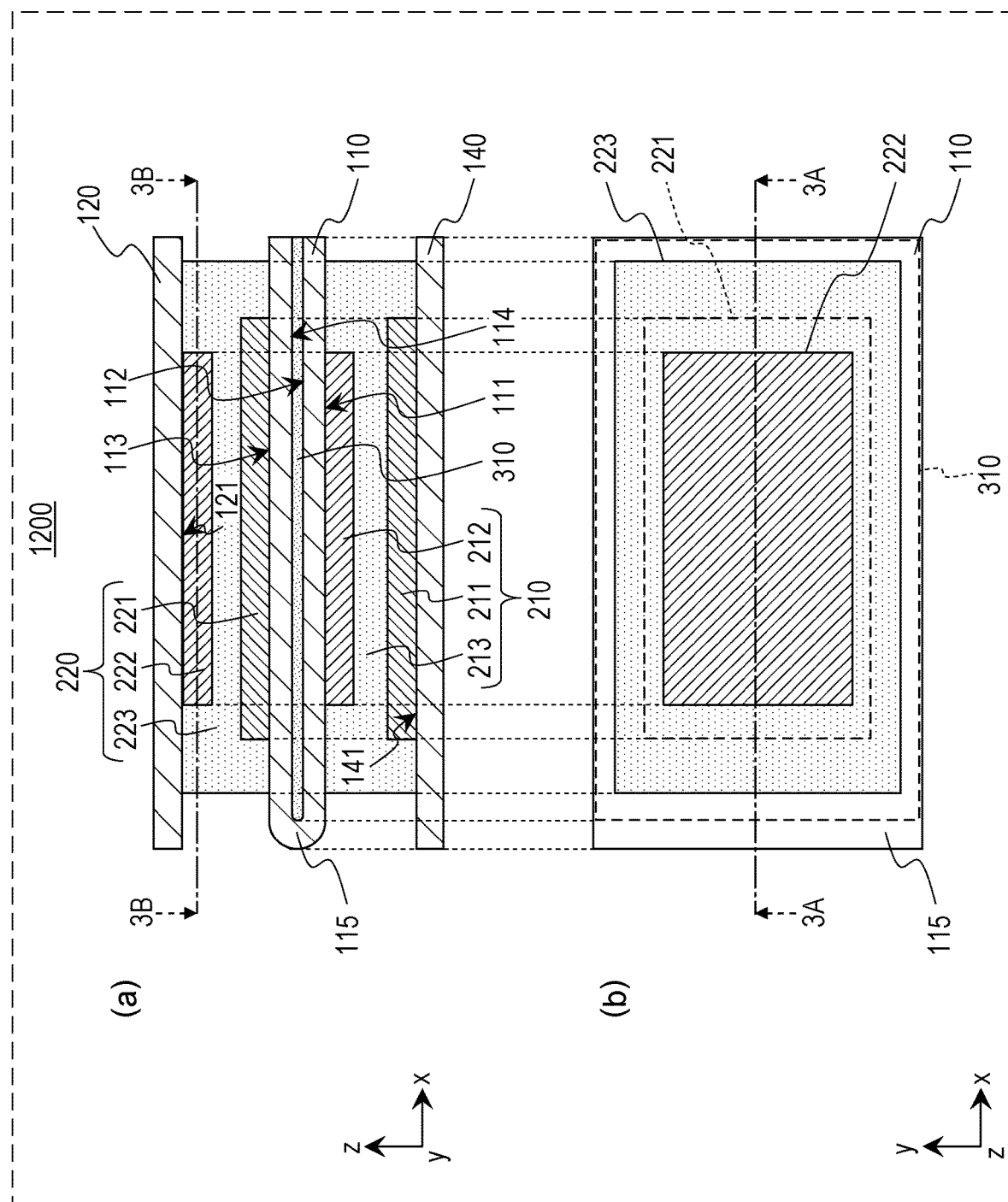
FIG. 3 is a diagram illustrating a schematic configuration of a battery according to the first embodiment.

FIG. 3 is a diagram illustrating a schematic configuration of a battery 1200 according to the first embodiment.

Indicated by (a) in FIG. 3 is an x-z view (cross-sectional view taken along 3A in FIG. 3) illustrating a schematic configuration of the battery 1200 according to the first embodiment.

Indicated by (b) in FIG. 3 is an x-y view (cross-sectional view taken along 3B in FIG. 3) illustrating a schematic configuration of the battery 1200 according to the first embodiment.

The battery 1200 according to the first embodiment further has, in addition to the configuration of the above-described battery 1000 according to the first embodiment, the following configuration.

That is to say, the battery 1200 according to the first embodiment further includes a first adhesion portion 310.

The first adhesion portion 310 is a member that adheres the first rear face region 112 and second rear face region 114 to each other.

The first adhesion portion 310 is disposed between the first rear face region 112 and the second rear face region 114.

According to the above configuration, the bonding strength among the component members of the battery can be further strengthened. That is to say, the positional relationship between the first counter electrode layer 212 disposed on the first front face region 111 and the first electrode layer 221 disposed on the second front face region 113 can be more strongly maintained by the first adhesion portion 310, in addition to the first fold portion 115. Accordingly, the layers (or cells) making up the battery can be prevented from exhibiting positional shifting or separation due to shock, vibration, and so forth, when manufacturing the battery or using the battery, for example. Thus, reliability of the battery can be improved.

Note that in the first embodiment, the first adhesion portion 310 may contain an electroconductive adhesive agent.

According to the above configuration, the first adhesion portion 310 can have electroconductivity. That is to say, the first adhesion portion 310 can conduct electricity. Accordingly, the first front face region 111 on which the first counter electrode layer 212 is disposed and the second front face region 113 on which the first electrode layer 221 is disposed can be connected with low resistance by the first adhesion portion 310, in addition to the first fold portion 115. That is to say, the contact resistance between the first front face region 111 and the second front face region 113 can be reduced. Accordingly, even in a case where the battery is operated under a large current, generation of heat due to contact resistance between the first front face region 111 and second front face region 113 can be made less easy to occur, for example.

Note that in the first embodiment, the first adhesion portion 310 may be disposed on the entire region where the first rear face region 112 and the second rear face region 114 face each other, as illustrated in FIG. 3. In this case, the first adhesion portion 310 may be formed as a uniformly continuous film. Alternatively, the first adhesion portion 310 may be disposed at a part of the region where the first rear face region 112 and second rear face region 114 face each other.

Figure 4:
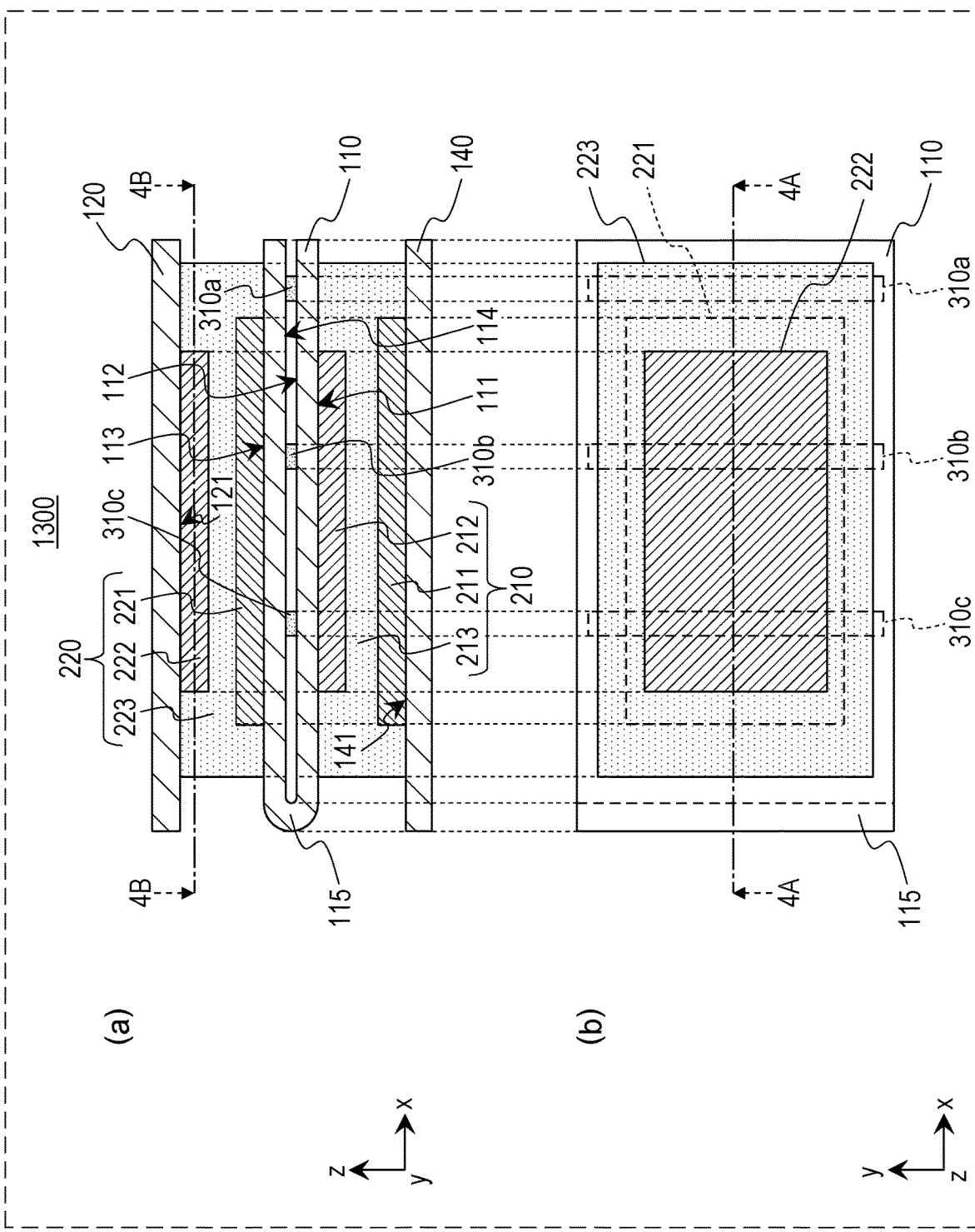
FIG. 4 is a diagram illustrating a schematic configuration of a battery according to the first embodiment.

FIG. 4 is a diagram illustrating a schematic configuration of a battery 1300 according to the first embodiment.

Indicated by (a) in FIG. 4 is an x-z view (cross-sectional view taken along 4A in FIG. 4) illustrating a schematic configuration of the battery 1300 according to the first embodiment.

Indicated by (b) in FIG. 4 is an x-y view (cross-sectional view taken along 4B in FIG. 4) illustrating a schematic configuration of the battery 1300 according to the first embodiment.

The battery 1300 according to the first embodiment further has, in addition to the configuration of the above-described battery 1000 according to the first embodiment, the following configuration.

That is to say, the battery 1300 according to the first embodiment further includes an adhesion portion 310a, an adhesion portion 310b, and an adhesion portion 310c, as the first adhesion portion 310.

The adhesion portion 310a, adhesion portion 310b, and adhesion portion 310c are members that adhere the first rear face region 112 and second rear face region 114 to each other.

The adhesion portion 310a, adhesion portion 310b, and adhesion portion 310c are disposed between the first rear face region 112 and second rear face region 114.

At least one (or all) of the adhesion portion 310a, adhesion portion 310b, and adhesion portion 310c may contain an electroconductive adhesive agent.

In the battery 1300 according to the first embodiment, the first rear face region 112 and second rear face region 114 may come into contact with each other at positions where the adhesion portion 310a, adhesion portion 310b, and adhesion portion 310c are not formed.

Note that in the first embodiment, a commonly known adhesive agent may be used for the adhesive material included in the first adhesion portion 310 (or at least one of the adhesion portion 310a, adhesion portion 310b, and adhesion portion 310c). Examples of the adhesive material include electroconductive adhesive agents such as soft-silicone electroconductive adhesive agents (e.g., TB 3303G, TB 3333C, etc., manufactured by Three Bond Co., Ltd.), silver-epoxy based electroconductive adhesive agents (e.g., XA-874, XA-910, etc., manufactured by Fujikura Kasei Co., Ltd.), and so forth.

Figure 5:
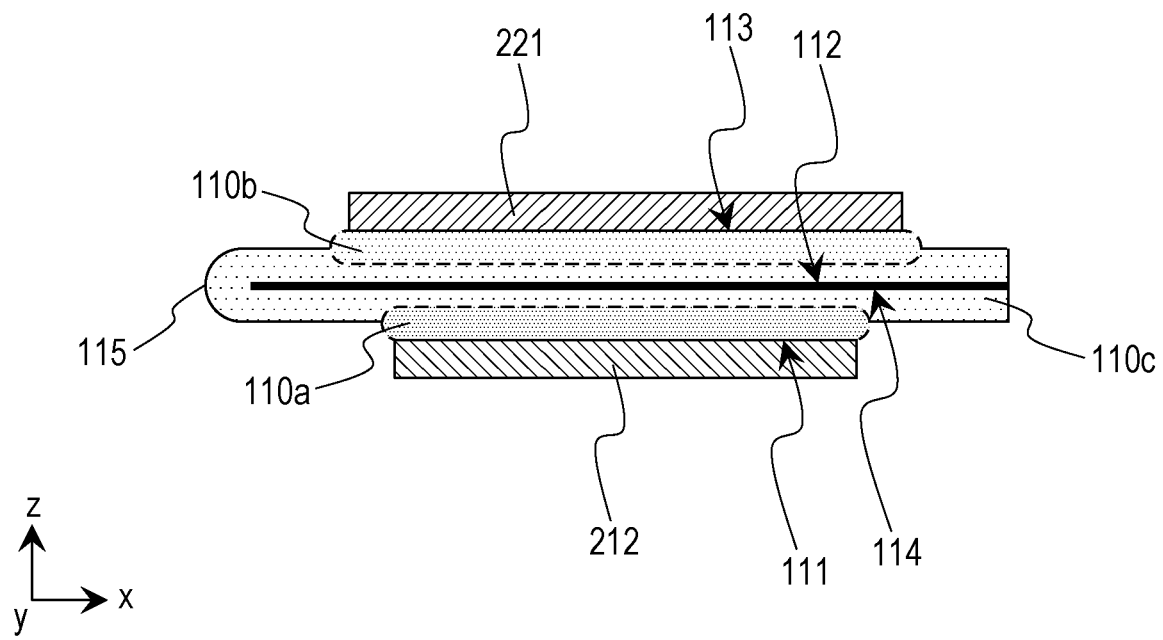
FIG. 5 is a diagram illustrating a schematic configuration of an example of a first current collector according to the first embodiment.

FIG. 5 is a cross-sectional diagram illustrating a schematic configuration of an example of the first current collector 110 according to the first embodiment.

The first current collector 110 illustrated in FIG. 5 includes a material 110a in the first front face region 111.

The first current collector 110 illustrated in FIG. 5 also includes a material 110b in the second front face region 113. The material 110b here is a different material from the material 110a.

The first current collector 110 illustrated in FIG. 5 also includes a material 110c in a region including the first rear face region 112, second rear face region 114, and first fold portion 115. The material 110c here is a different material from the material 110a and the material 110b.

Figure 6:
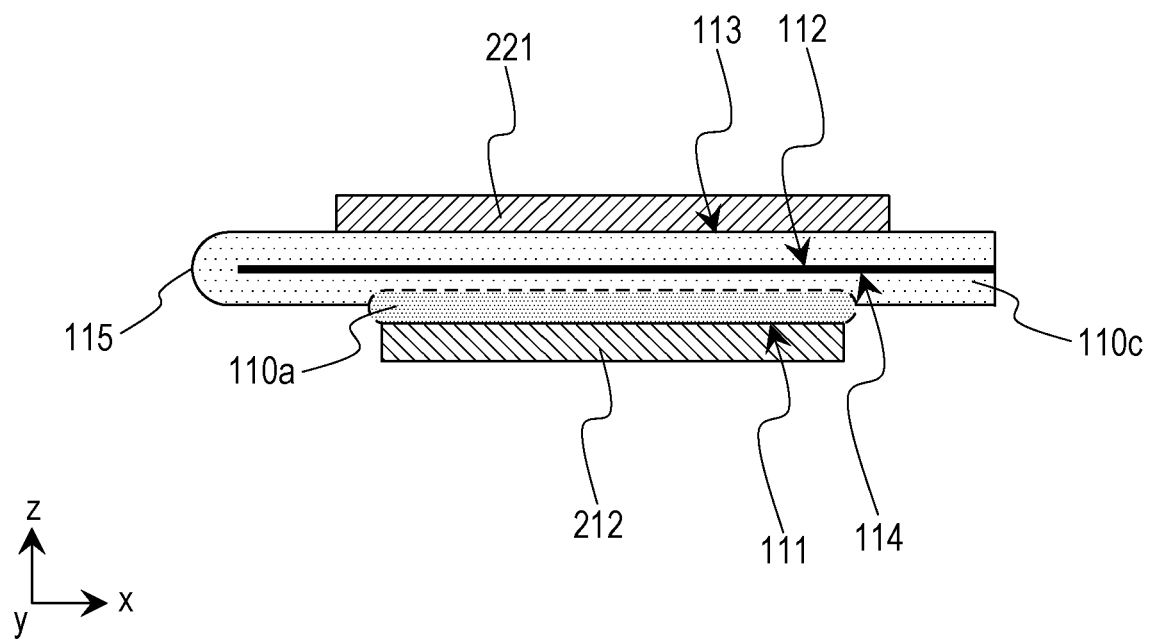
FIG. 6 is a diagram illustrating a schematic configuration of an example of a first current collector according to the first embodiment.

FIG. 6 is a cross-sectional diagram illustrating a schematic configuration of an example of the first current collector 110 according to the first embodiment.

The first current collector 110 illustrated in FIG. 6 includes the material 110a in the first front face region 111.

The first current collector 110 illustrated in FIG. 6 also includes the material 110c in the region including the second front face region 113, first rear face region 112, second rear face region 114, and first fold portion 115. The material 110c here is a different material from the material 110a.

Figure 7:
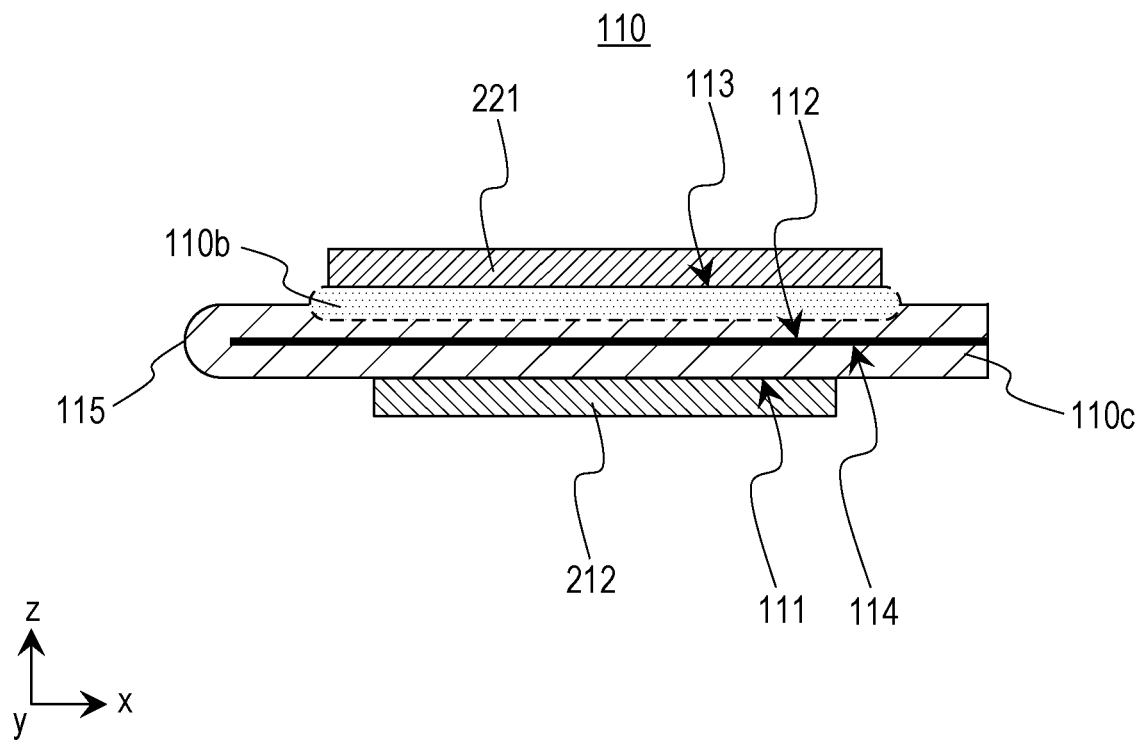
FIG. 7 is a diagram illustrating a schematic configuration of an example of a first current collector according to the first embodiment.

FIG. 7 is a cross-sectional diagram illustrating a schematic configuration of an example of the first current collector 110 according to the first embodiment.

The first current collector 110 illustrated in FIG. 7 includes the material 110b in the second front face region 113.

The first current collector 110 illustrated in FIG. 7 also includes the material 110c in the region including the first front face region 111, first rear face region 112, second rear face region 114, and first fold portion 115. The material 110c here is a different material from the material 110b.

Figure 8:
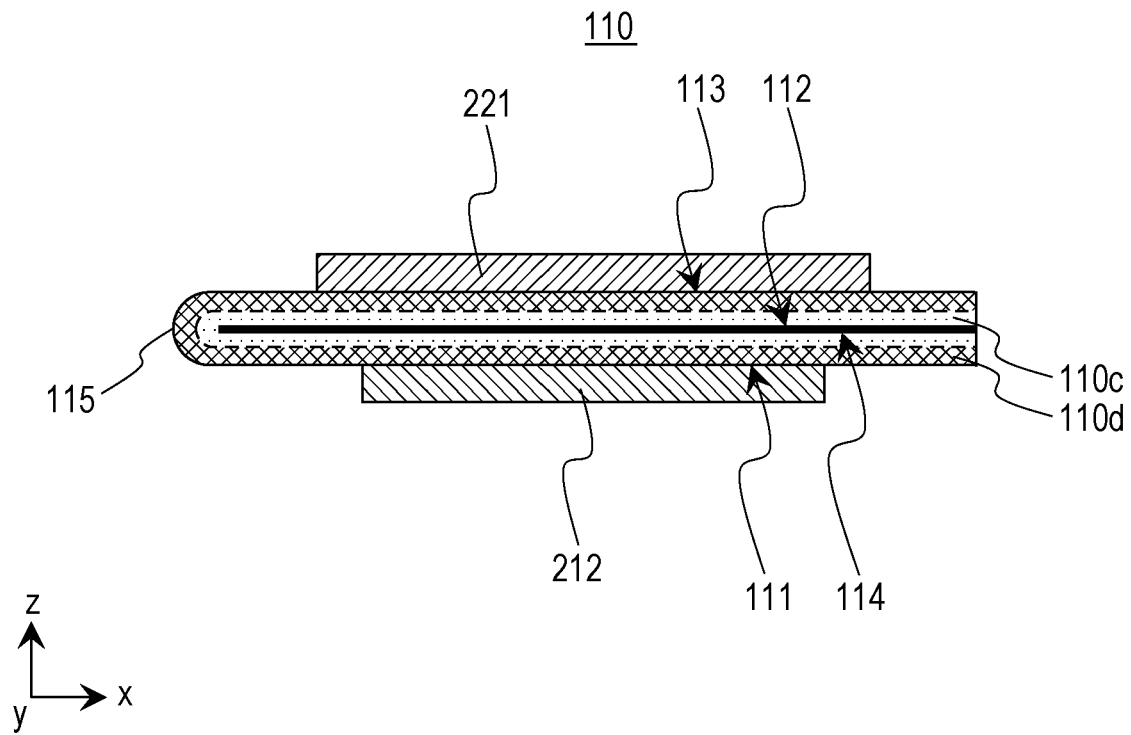
FIG. 8 is a diagram illustrating a schematic configuration of an example of a first current collector according to the first embodiment.

FIG. 8 is a cross-sectional diagram illustrating a schematic configuration of an example of the first current collector 110 according to the first embodiment.

The first current collector 110 illustrated in FIG. 8 includes the material 110c in a region including part of the first rear face region 112, second rear face region 114, and first fold portion 115 (e.g., a region on the inner side of the folded structure).

The first current collector 110 illustrated in FIG. 8 also includes a material 110d in a region including part of the first front face region 111, second front face region 113, and first fold portion 115 (e.g., a region on the outer side of the folded structure). The material 110d here is a different material from the material 110c.

Note that in the first embodiment, the first front face region 111 may include a first material. For example, the first front face region 111 may be formed of the first material or include the first material as the primary component thereof.

Also, the second front face region 113 may include a second material. For example, the second front face region 113 may be formed of the second material or include the second material as the primary component thereof.

The second material here may be a material that is different from the first material, as illustrated in the examples in any one of FIGS. 5 through 7.

According to the above configuration, a material suitable for electric connection to the first counter electrode layer 212 can be used as the first material. At the same time, a material suitable for electric connection to the first electrode layer 221 can be used as the second material. According to these, the electrical connection between the first front face region 111 and first counter electrode layer 212 and the electrical connection between the second front face region 113 and first electrode layer 221 can be improved, while increasing bonding strength between the component materials of the battery by the first fold portion 115.

Note that in the example illustrated in FIG. 5, the first material is material 110a and the second material is material 110b.

Also, in the example illustrated in FIG. 6, the first material is material 110a and the second material is material 110c.

Further, in the example illustrated in FIG. 7, the first material is material 110c and the second material is material 110b.

In the first embodiment, the first rear face region 112 and second rear face region 114 may include a third material, as illustrated in any one of FIGS. 5 through 8. For example, the first rear face region 112 and second rear face region 114 may be formed of the third material or include the third material as the primary component thereof. That is to say, the first rear face region 112 and second rear face region 114 may include the same material 110c.

According to the configuration described above, reliability of connection among power-generating elements can be improved while increasing bonding strength between the component materials of the battery by the first fold portion 115. That is to say, occurrence of trouble between the first rear face region 112 and second rear face region 114 can be reduced by a configuration where the first rear face region 112 and second rear face region 114 are of the same third material. More specifically, even in a case where environmental gas (e.g., gas component remaining in or invading into the containing the laminated member of the first power-generating element 210 and second power-generating element 220) enters into a minute gap region between the first rear face region 112 and second rear face region 114, there is no different in miniature potential different or ionization rate between the first rear face region 112 and second rear face region 114, due to being formed of the same third material. Accordingly, even if used for a long period of time for example, trouble such as the corrosion phenomenon does not occur between the first rear face region 112 and second rear face region 114.

Note that in the first embodiment, the first material may be a different material from the third material, as illustrated in the examples in any one of FIGS. 5, 6, and 8.

According to the configuration described above, a material suitable for electrical connection to the first counter electrode layer 212 can be used as the first material. Thus, the first rear face region 112 and second rear face region 114 can be formed of the third material, while increasing bonding strength between the component materials of the battery by the first fold portion 115, and while obtaining good electrical connection between the first front face region 111 and the first counter electrode layer 212 by using the first material.

Also, a minute gap region does not form between the first front face region 111 and the first rear face region 112 (e.g., the first front face region 111 and first rear face region 112 are in tight contact), due to integrally forming the first front face region 111 and first rear face region 112 as a single member (i.e., the first current collector 110). Accordingly, invasion of environmental gas between the first front face region 111 and first rear face region 112 can be prevented. Thus, trouble such as the corrosion phenomenon does not occur between the first front face region 111 and first rear face region 112 that are formed of different materials from each other, as well.

Note that in the example illustrated in FIG. 5, the first material is material 110a and the third material is material 110c.

Also, in the example illustrated in FIG. 6, the first material is material 110a and the third material is material 110c.

Further, in the example illustrated in FIG. 8, the first material is material 110d and the third material is material 110c.

Moreover, in the first embodiment, the second material may be a different material form the third material, as illustrated in the examples in any one of FIGS. 5, 7, and 8.

According to the configuration described above, a material suitable for electrical connection to the first electrode layer 221 can be used as the second material. Thus, the first rear face region 112 and second rear face region 114 can be formed of the third material, while increasing bonding strength between the component materials of the battery by the first fold portion 115, and while obtaining good electrical connection between the second front face region 113 and the first electrode layer 221 by using the second material.

Also, a minute gap region does not form between the second front face region 113 and the second rear face region 114 (e.g., the second front face region 113 and second rear face region 114 are in tight contact), due to integrally forming the second front face region 113 and second rear face region 114 as a single member (i.e., the first current collector 110). Accordingly, invasion of environmental gas between the second front face region 113 and second rear face region 114 can be prevented. Thus, trouble such as the corrosion phenomenon does not occur between the second front face region 113 and second rear face region 114 that are formed of different materials from each other, as well.

Note that in the example illustrated in FIG. 5, the second material is material 110b and the third material is material 110c.

Also, in the example illustrated in FIG. 7, the second material is material 110b and the third material is material 110c.

Further, in the example illustrated in FIG. 8, the second material is material 110d and the third material is material 110c.

In a case where the first counter electrode layer 212 is a positive active material layer (i.e., in a case where the counter electrode material is positive active material), SUS, Al, and so forth, may be used as the first material included in the first front face region 111.

Alternatively, in a case where the first counter electrode layer 212 is a negative active material layer (i.e., in a case where the counter electrode material is negative active material), SUS, Cu, and so forth, may be used as the first material included in the first front face region 111.

In a case where the first electrode layer 221 is a positive active material layer (i.e., in a case where the electrode material is positive active material), SUS, Al, and so forth, may be used as the second material included in the second front face region 113.

Alternatively, in a case where the first electrode layer 221 is a negative active material layer (i.e., in a case where the electrode material is negative active material), SUS, Cu, and so forth, may be used as the second material included in the second front face region 113.

Al, Cu, platinum (Pt), nickel (Ni), and alloys thereof, may be used as the third material included in the first rear face region 112 and second rear face region 114. Using Pt, Ni, and alloys thereof, as the third material, enables anti-corrosion nature to be improved. Alternatively, the third material may be a material that has high chemical resistance to environmental gas that may exist around the power-generating elements in minute amounts (e.g., hydrogen sulfide ($H_2S$) gas). Examples of the third material may include tantalum, gold, Inconel, alloys thereof, and so forth.

Note that in the first embodiment, the expression, "a predetermined region includes a predetermined material as a primary component" means that, for example, "a predetermined region includes 50% by weight or more of a predetermined material as to the entirety of the predetermined region".

Figure 9:
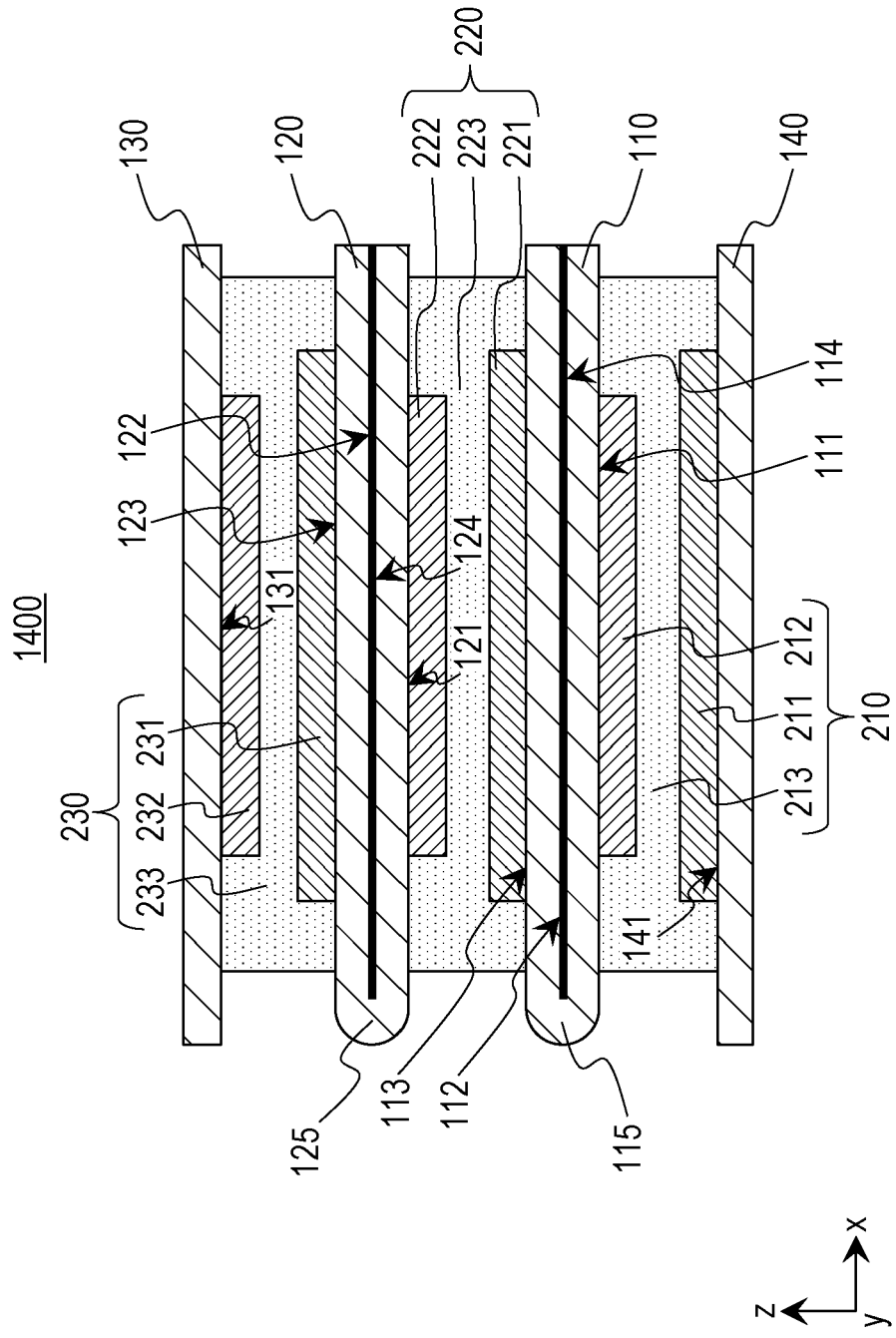
FIG. 9 is a diagram illustrating a schematic configuration of a battery according to the first embodiment.

FIG. 9 is a cross-sectional diagram illustrating a schematic configuration of a battery 1400 according to the first embodiment.

The battery 1400 according to the first embodiment has the following configuration in addition to the configuration of the above-described battery 1000 according to the first embodiment.

That is to say, the battery 1400 according to the first embodiment further includes the second current collector 120, a second electrode layer 231, the second counter electrode layer 222, and the second solid electrolyte layer 223.

The second counter electrode layer 222 is a counter electrode of the first electrode layer 221 and second electrode layer 231.

The second current collector 120 includes a third front face region 121, a third rear face region 122, a fourth front face region 123, a fourth rear face region 124, and a second fold portion 125.

The third rear face region 122 is a region situated on the rear face of the third front face region 121.

The fourth rear face region 124 is a region situated on the rear face of the fourth front face region 123.

The second fold portion 125 is situated between the third front face region 121 and fourth front face region 123.

The third rear face region 122 and fourth rear face region 124 are positioned facing each other, due to the second current collector 120 being folded at the second fold portion 125.

The second electrode layer 231 is disposed in contact with the fourth front face region 123.

The second counter electrode layer 222 is disposed in contact with the third front face region 121.

The second solid electrolyte layer 223 is disposed between the first electrode layer 221 and second counter electrode layer 222.

According to the above configuration, the bonding strength among component members of the battery can be further improved. That is to say, the second counter electrode layer 222 and second electrode layer 231 can be respectively disposed on the third front face region 121 and fourth front face region 123 (i.e., two regions that are partial regions of the second current collector 120 and that are linked by the second fold portion 125). Accordingly, the positional relationship between the second counter electrode layer 222 disposed on the third front face region 121 and the second electrode layer 231 disposed on the fourth front face region 123 can be strongly maintained by the second fold portion 125 (in other words, by the second current collector 120 that is one component). Accordingly, in a case where the laminated battery is configured using the first current collector 110 and the second current collector 120 for example, three battery cells (cells) making up the battery can be linked with each other by the first current collector 110 and second current collector 120. Thus, the layers (or cells) making up the battery can be prevented from exhibiting positional shifting or separation due to shock, vibration, and so forth, when manufacturing the battery or using the battery, for example. That is to say, the strength of bonding of the layers (or cells) making up the battery can be improved by the first current collector 110 and second current collector 120. Thus, reliability of the battery can be improved.

Also, according to the above configuration, the third front face region 121 on which the second counter electrode layer 222 is disposed and the fourth front face region 123 on which the second electrode layer 231 is disposed can be connected by the second fold portion 125 with low resistance. That is to say, the resistance between the third front face region 121 and the fourth front face region 123 can be reduced. Accordingly, even in a case where the battery is operated under a large current for example, generation of heat due to contact resistance between the third rear face region 122 and fourth rear face region 124 can be made less easy to occur. Accordingly, deterioration performance does not readily occur even if a thin current collector is used as the second current collector 120, for example. As a result, reduced weight of the battery can be realized.

Note that the battery 1400 according to the first embodiment may further include a third counter electrode layer 232 and a third solid electrolyte layer 233, as illustrated in FIG. 9.

The third counter electrode layer 232 is a counter electrode of the second electrode layer 231.

The third solid electrolyte layer 233 is situated between the second electrode layer 231 and third counter electrode layer 232.

According to the above configuration, one solid battery cell (third power-generating element 230) can be configured from the second electrode layer 231, third counter electrode layer 232, and third solid electrolyte layer 233. Thus, a laminated battery can be configured of the first power-generating element 210, second power-generating element 220, and third power-generating element 230 each being serially connected via the first current collector 110 and second current collector 120. The second power-generating element 220 (i.e., the first electrode layer 221, second counter electrode layer 222, and second solid electrolyte layer 223) and the third power-generating element 230 (i.e., the second electrode layer 231, third counter electrode layer 232, and third solid electrolyte layer 233) can be strongly linked by the second current collector 120 at this time. Accordingly, the battery cells (second power-generating element 220 and third power-generating element 230) can be prevented from exhibiting positional shifting or separation due to shock, vibration, and so forth, when manufacturing the battery or using the battery, for example. That is to say, the strength of bonding of the battery cells (second power-generating element 220 and third power-generating element 230) can be improved by the second current collector 120. Thus, the reliability of the battery can be improved while raising the battery voltage by the serial connection of the second power-generating element 220 and third power-generating element 230.

Note that the battery 1400 according to the first embodiment may further be provided with a third current collector 130, as illustrated in FIG. 9.

The third current collector 130 is disposed in contact with the third counter electrode layer 232.

The third solid electrolyte layer 233 is disposed in contact with the second current collector 120 and third current collector 130.

According to the above configuration, the strength of bonding among component members of the battery can be further improved. That is to say, the strength of bonding between the second current collector 120 and third current collector 130 can be improved by the third solid electrolyte layer 233. Accordingly, the second electrode layer 231 can be suppressed from peeling loose from the second current collector 120. Further, the third counter electrode layer 232 can be suppressed from peeling loose from the third current collector 130. Thus, the layers making up the third power-generating element 230 can be prevented from exhibiting positional shifting or separation due to shock, vibration, and so forth, when manufacturing the battery or using the battery, for example. Thus, reliability of the battery can be improved even further.

The second current collector 120 and third current collector 130 may be thin films having electroconductivity, for example. Examples of material from which the second current collector 120 and third current collector 130 are formed include metal (SUS, Al, Cu, and so forth), for example. The thickness of the second current collector 120 (i.e., the distance between the third front face region 121 and third rear face region 122, or the distance between the fourth front face region 123 and fourth rear face region 124) may be 5 to 100 μm, for example. The thickness of the third current collector 130 may be 5 to 100 μm, for example.

The configuration illustrated as the above-described first current collector 110 may be used as the configuration of the second current collector 120 as appropriate.

The configurations of the first current collector 110 and second current collector 120 (e.g., thicknesses, area of formation, materials included, etc.) may be the same as each other, or may be different.

The third power-generating element 230 is a power-generating unit having charging and discharging properties (e.g., a battery), for example. The third power-generating element 230 may be a battery cell, for example. Also, the third power-generating element 230 may be a fully-solid battery.

The configurations of the first power-generating element 210, second power-generating element 220, and third power-generating element 230 (e.g., thicknesses of the layers, area of formation, materials included, etc.) may be the same as each other, or may be different.

The second electrode layer 231 is a layer including electrode material (e.g., active material).

The configurations of the outer electrode layer 211, first electrode layer 221, and second electrode layer 231 (e.g., thicknesses of the layers, area of formation, materials included, etc.) may be the same as each other, or may be different.

The third counter electrode layer 232 is a layer including counter electrode material (e.g., active material). Counter electrode material is material making up counter electrodes to the electrode material.

The configurations of the first counter electrode layer 212, second counter electrode layer 222, and third counter electrode layer 232 (e.g., thicknesses of the layers, area of formation, materials included, etc.) may be the same as each other, or may be different.

Also, the second electrode layer 231 and third counter electrode layer 232 may be each formed over ranges narrower than the second current collector 120 (i.e., the fourth front face region 123 of the second current collector 120) and the third current collector 130, as illustrated in FIG. 9.

The third solid electrolyte layer 233 is a solid electrolyte layer including a solid electrolyte.

The configurations of the first solid electrolyte layer 213, second solid electrolyte layer 223, and third solid electrolyte layer 233 (e.g., thicknesses of the layers, area of formation, materials included, etc.) may be the same as each other, or may be different.

Also, the third solid electrolyte layer 233 may be disposed over a greater area than that of the second electrode layer 231 and third counter electrode layer 232, as illustrated in FIG. 9. That is to say, the third solid electrolyte layer 233 may be disposed in a manner covering the second electrode layer 231 and third counter electrode layer 232. Accordingly, short-circuiting of the second electrode layer 231 and third counter electrode layer 232 due to direct contact can be prevented.

Also, the third solid electrolyte layer 233 may be disposed in a range that is narrower than that of the second power-generating element 220 (i.e., fourth front face region 123 of the second current collector 120) and third current collector 130, as illustrated in FIG. 9. Alternatively, the range of formation of the third solid electrolyte layer 233 may be the same range as that of the second current collector 120 (i.e., the fourth front face region 123 of the second current collector 120) and third current collector 130.

Note that the outer electrode layer 211, first electrode layer 221, and second electrode layer 231 may be negative active material layers. The electrode material in this case is a negative active material. The outer current collector 140 is a negative current collector. The first counter electrode layer 212, second counter electrode layer 222, and third counter electrode layer 232 are positive active material layers. The counter electrode material is a positive active material. The third current collector 130 is a positive current collector.

Alternatively, the outer electrode layer 211, first electrode layer 221, and second electrode layer 231 may be positive active material layers. The electrode material in this case is a positive active material. The outer current collector 140 is a positive current collector. The first counter electrode layer 212, second counter electrode layer 222, and third counter electrode layer 232 are negative active material layers. The counter electrode material is a negative active material. The third current collector 130 is a negative current collector.

Figure 10:
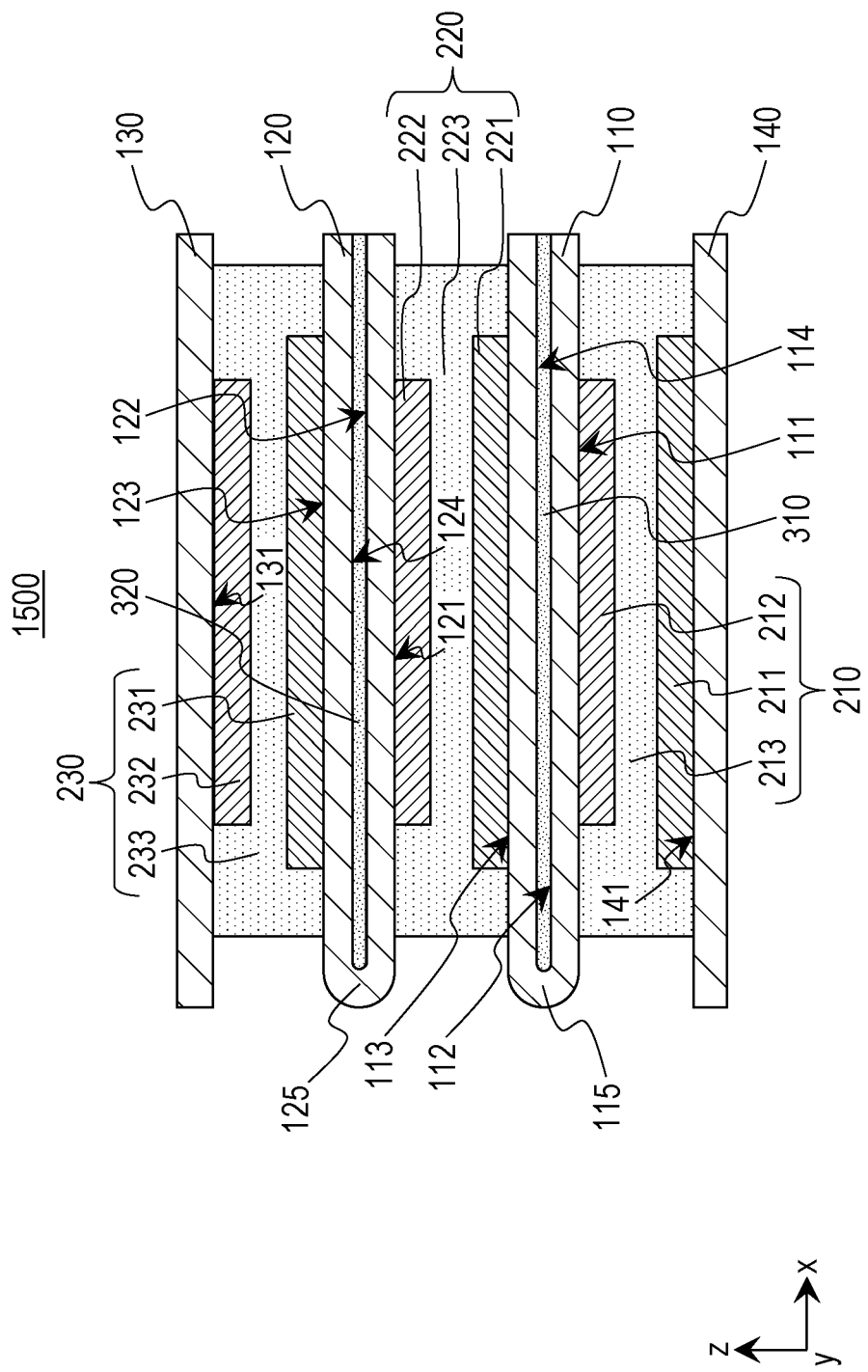
FIG. 10 is a diagram illustrating a schematic configuration of a battery according to the first embodiment.

FIG. 10 is a cross-sectional diagram illustrating a schematic configuration of a battery 1500 according to the first embodiment.

The battery 1500 according to the first embodiment has the following configuration in addition to the configuration of the above-described battery 1400 according to the first embodiment.

That is to say, the battery 1500 according to the first embodiment further is provided with the first adhesion portion 310 and a second adhesion portion 320.

The second adhesion portion 320 is a member that adheres the third rear face region 122 and fourth rear face region 124 to each other.

The second adhesion portion 320 is disposed between the third rear face region 122 and fourth rear face region 124.

According to the above configuration, the bonding strength among the component members of the battery can be further improved. That is to say, the positional relationship between the second counter electrode layer 222 disposed on the third front face region 121 and the second electrode layer 231 disposed on the fourth front face region 123 can be strongly maintained by the second adhesion portion 320, in addition to the second fold portion 125. Accordingly, the layers (or cells) making up the battery can be prevented from exhibiting positional shifting or separation due to shock, vibration, and so forth, when manufacturing the battery or using the battery, for example. Thus, reliability of the battery can be improved.

Note that the second adhesion portion 320 may contain an electroconductive adhesive agent.

According to the above configuration, the second adhesion portion 320 can have electroconductivity. That is to say, the second adhesion portion 320 can conduct electricity. Accordingly, the third front face region 121 on which the second counter electrode layer 222 is disposed and the fourth front face region 123 on which the second electrode layer 231 is disposed can be connected with low resistance by the second adhesion portion 320, in addition to the second fold portion 125. That is to say, the contact resistance between the third front face region 121 and the fourth front face region 123 can be reduced. Accordingly, even in a case where the battery is operated under a large current, generation of heat due to contact resistance between the third front face region 121 and fourth front face region 123 can be made less easy to occur, for example.

Note that the second adhesion portion 320 may be disposed on the entire region where the third rear face region 122 and fourth rear face region 124 face each other, as illustrated in FIG. 10. In this case, the second adhesion portion 320 may be formed as a uniformly continuous film. Alternatively, the second adhesion portion 320 may be disposed at a part of the region where the third rear face region 122 and fourth rear face region 124 face each other.

The configurations of the first adhesion portion 310 and second adhesion portion 320 (e.g., thicknesses of the layers, area of formation, materials included, etc.) may be the same as each other, or may be different.

Figure 11:
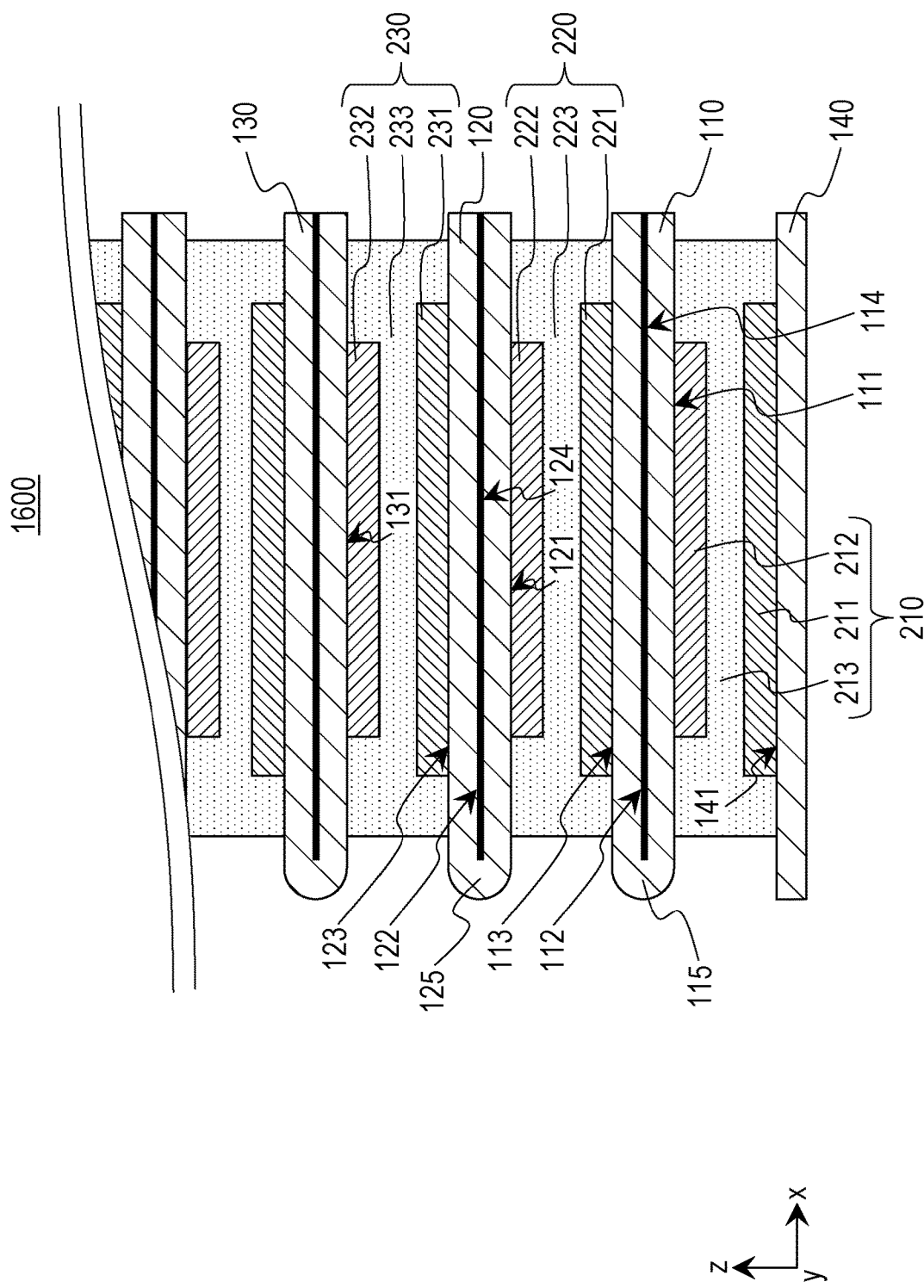
FIG. 11 is a diagram illustrating a schematic configuration of a battery according to the first embodiment.

FIG. 11 is a cross-sectional diagram illustrating a schematic configuration of a battery 1600 according to the first embodiment.

The battery according to the first embodiment may be configured with four or more power-generating elements having been laminated, as illustrated in FIG. 11.

A fourth and subsequent power-generating elements are further laminated on the third current collector 130 in the battery 1600 illustrated in FIG. 11. A bipolar battery where multiple power-generating elements (cells) are serially connected is capable of yielding high voltage, for example.

The number of layers of power-generating elements making up the battery according to the first embodiment may be two to 200, for example. Adjusting the number of layers of power-generating elements can realize adjustment of output in accordance with the usage of the battery (electronic devices, electric machines, electric vehicles, stationary batteries, etc.).

Note that in the first embodiment, part (or all) of the side faces of the laminated structure of power-generating elements may be covered by an insulating material (e.g., a sealant). Accordingly, the serially-connected power-generating elements can be sealed. The sealant here may be a moisture-preventing laminating sheet. Thus, the sealant can prevent the power-generating elements from deteriorating due to moisture. The laminated structure of the power-generating elements may be contained within a sealing case. Commonly known battery cases (e.g., laminating sacks, metal cans, resin cases, etc.) may be used as a sealing case.

Also, the battery according to the first embodiment may further have a pair of external electrodes. The pair of external electrodes may protrude to the outer side of the top and bottom faces (or side faces) of the laminated structure, in a case where the entirety of the laminated structure of power-generating elements is to be sealed by the sealant. One of the external electrodes may be connected to the outer current collector 140, for example. The other of the external electrodes here may be connected to, for example, the second current collector 120 or third current collector 130. This enables discharge to a load connected to the pair of external electrodes, and charging of the battery (the power-generating elements) by a charging device connected to the pair of external electrodes.

A manufacturing method of the battery according to the first embodiment will be described below as a second embodiment.

Second Embodiment

A second embodiment will be described below. Description that is redundant with that of the above-described first embodiment will be omitted as appropriate.

Figure 12:
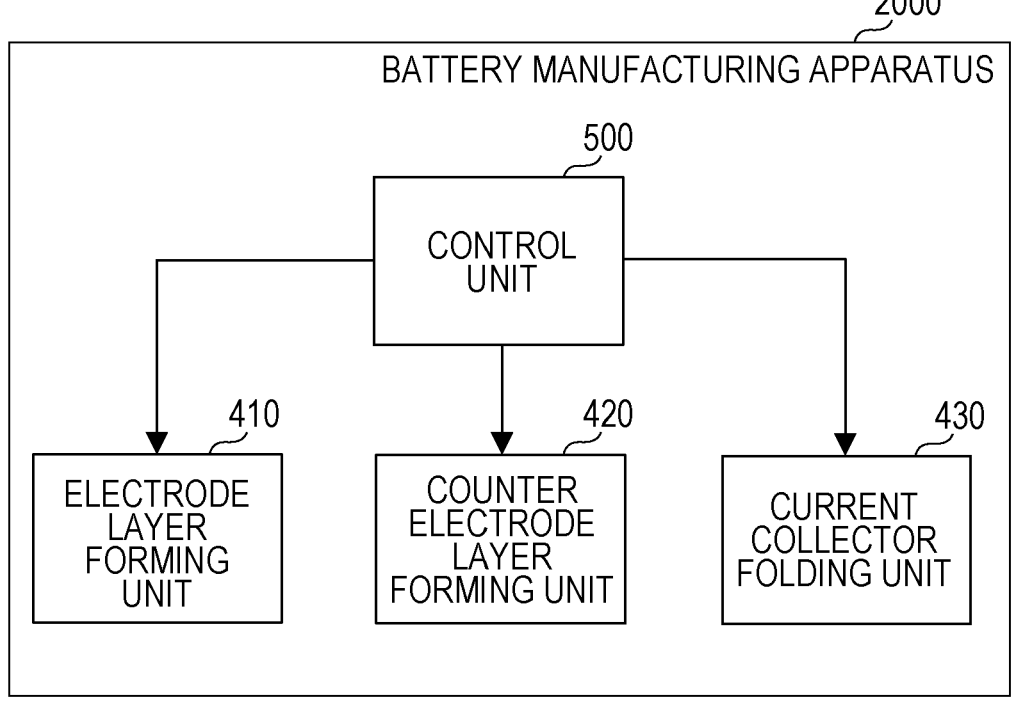
FIG. 12 is a diagram illustrating a schematic configuration of a battery manufacturing apparatus according to a second embodiment.

FIG. 12 is a diagram illustrating a schematic configuration of a battery manufacturing apparatus 2000 according to the second embodiment.

The battery manufacturing apparatus 2000 according to the second embodiment is provided with an electrode layer forming unit 410, a counter electrode layer forming unit 420, and a current collector folding unit 430.

The current collector folding unit 430 folds a current collector 100.

The current collector 100 has the first front face region 111, first rear face region 112, second front face region 113, second rear face region 114, and a first fold region 116.

The first rear face region 112 is a region situated on the rear face of the first front face region 111.

The second rear face region 114 is a region situated on the rear face of the second front face region 113.

The first fold region 116 is a region situated between the first front face region 111 and second front face region 113.

The electrode layer forming unit 410 forms the first electrode layer 221 in contact with the second front face region 113.

The counter electrode layer forming unit 420 forms the first counter electrode layer 212, which is a counter electrode of the first electrode layer 221, in contact with the first front face region 111.

The current collector folding unit 430 folds the first fold region 116.

The first rear face region 112 and second rear face region 114 are positioned facing each other, due to the current collector 100 being folded at the first fold region 116 by the current collector folding unit 430.

Figure 13:
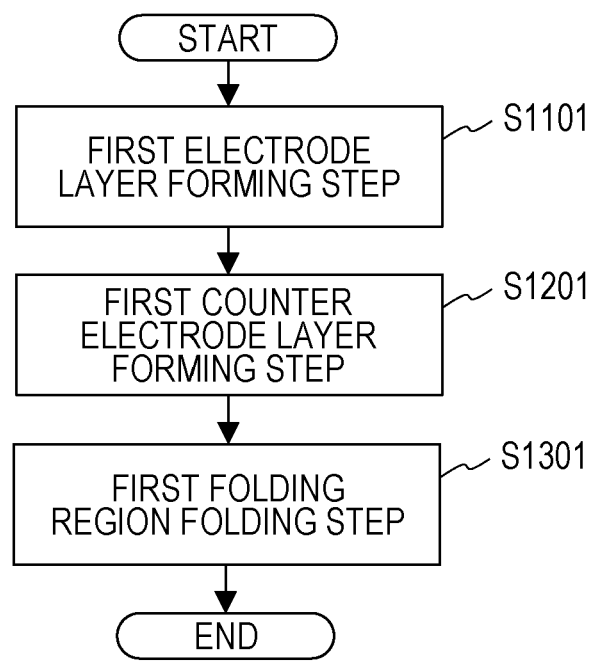
FIG. 13 is a flowchart illustrating an example of a battery manufacturing method according to the second embodiment.

FIG. 13 is a flowchart illustrating an example of a battery manufacturing method according to the second embodiment.

The battery manufacturing method according to the second embodiment is a battery manufacturing method using the battery manufacturing apparatus according to the second embodiment. For example, the battery manufacturing method according to the second embodiment is a battery manufacturing method executed at the battery manufacturing apparatus according to the second embodiment.

The battery manufacturing method according to the second embodiment includes a first electrode layer forming step S1101 (i.e., a step (a1)), a first counter electrode layer forming step S1201 (i.e., a step (b1)), and a first fold region folding step S1301 (i.e., a step (c1)).

The first electrode layer forming step S1101 is a step in which the first electrode layer 221 is formed in contact with the second front face region 113 by the electrode layer forming unit 410.

The first counter electrode layer forming step S1201 is a step in which the first counter electrode layer 212, which is a counter electrode of the first electrode layer 221, is formed in contact with the first front face region 111 by the counter electrode layer forming unit 420.

The first fold portion folding step S1301 is a step in which the first fold region 116 is folded by the current collector folding unit 430.

The first rear face region 112 and second rear face region 114 are positioned facing each other, due to the current collector 100 being folded by the current collector folding unit 430 in the first fold region folding step S1301.

According to the above manufacturing apparatus and manufacturing method, the bonding strength among component members of the battery can be further improved. That is to say, the first counter electrode layer 212 and first electrode layer 221 can be respectively disposed on the first front face region 111 and second front face region 113 (i.e., two regions that are partial regions of the current collector 100 and that are linked by the first fold region 116). Accordingly, the positional relationship between the first counter electrode layer 212 and the first electrode layer 221 can be strongly maintained by the first fold region 116 (in other words, by the current collector 100 that is one component). Accordingly, positional deviation of the formation positions of the first counter electrode layer 212 and first electrode layer 221 in the steps of forming the first counter electrode layer 212 and first electrode layer 221 on the current collector 100 (or in other steps) can be prevented. Further, the layers (or cells) making up the battery can be prevented from exhibiting positional shifting or separation due to shock, vibration, and so forth, when manufacturing the battery, for example. Thus, yield when manufacturing the battery can be improved.

According to the above configuration, electrodes having a bipolar structure can be fabricated by a convenient single-face film formation process. That is to say, a bipolar current collector having the two poles of the first counter electrode layer 212 and first electrode layer 221 can be fabricated by the step of forming the first counter electrode layer 212 and first electrode layer 221 on one face of the current collector 100 (i.e., the front face of the current collector 100 where the first front face region 111 and second front face region 113 are situated), and the step of folding at the first fold region 116. Thus, bipolar-structure electrodes can be fabricated more conveniently and less expensively as compared to a case of using a process of forming films on both faces of the current collector.

The configurations illustrated as the first current collector 110 in the above-described first embodiment may be used for the configuration of the current collector 100 (e.g., materials, thicknesses, etc.) as appropriate. Part of the current collector 100 may have the configurations (materials) illustrated in any of FIGS. 5 through 8 described above.

Figure 14:
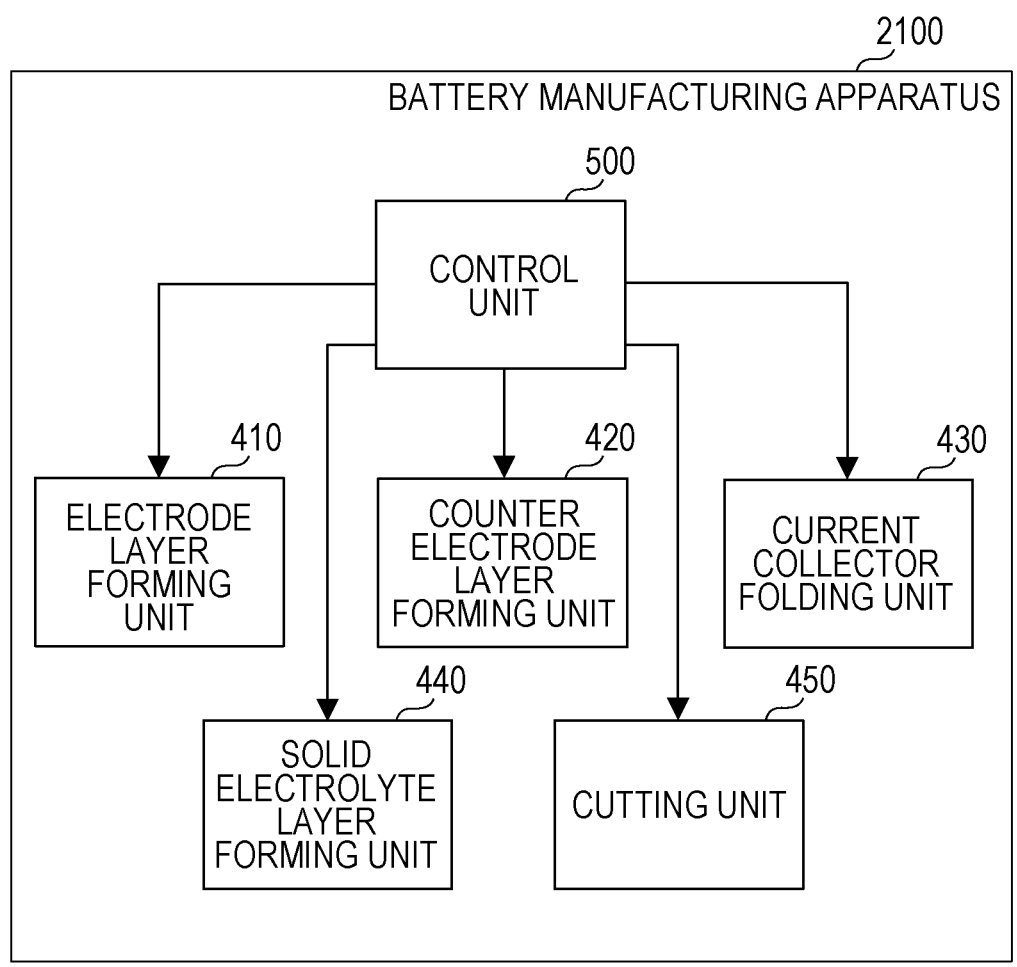
FIG. 14 is a diagram illustrating a schematic configuration of a battery manufacturing apparatus according to the second embodiment.

FIG. 14 is a diagram illustrating a schematic configuration of a battery manufacturing apparatus 2100 according to the second embodiment.

The battery manufacturing apparatus 2100 according to the second embodiment further has the following configuration, in addition to the configuration of the above-described battery manufacturing apparatus 2000 according to the second embodiment.

That is to say, the battery manufacturing apparatus 2100 according to the second embodiment is provided with a solid electrolyte layer forming unit 440 and a cutting unit 450.

The current collector 100 has a first linking portion 151 and an outer region 141.

The first linking portion 151 is a region adjacent to the first front face region 111.

The outer region 141 is a region adjacent to the first linking portion 151.

The electrode layer forming unit 410 forms the outer electrode layer 211, which is a counter electrode of the first counter electrode layer 212, in contact with the outer region 141.

The solid electrolyte layer forming unit 440 forms the first solid electrolyte layer 213 on at least one of the first counter electrode layer 212 and outer electrode layer 211.

The current collector folding unit 430 folds the first linking portion 151.

The first solid electrolyte layer 213 is interposed between the first counter electrode layer 212 and outer electrode layer 211, due to the current collector 100 being folded at the first linking portion 151 by the current collector folding unit 430.

The cutting unit 450 cuts the first linking portion 151.

Figure 15:
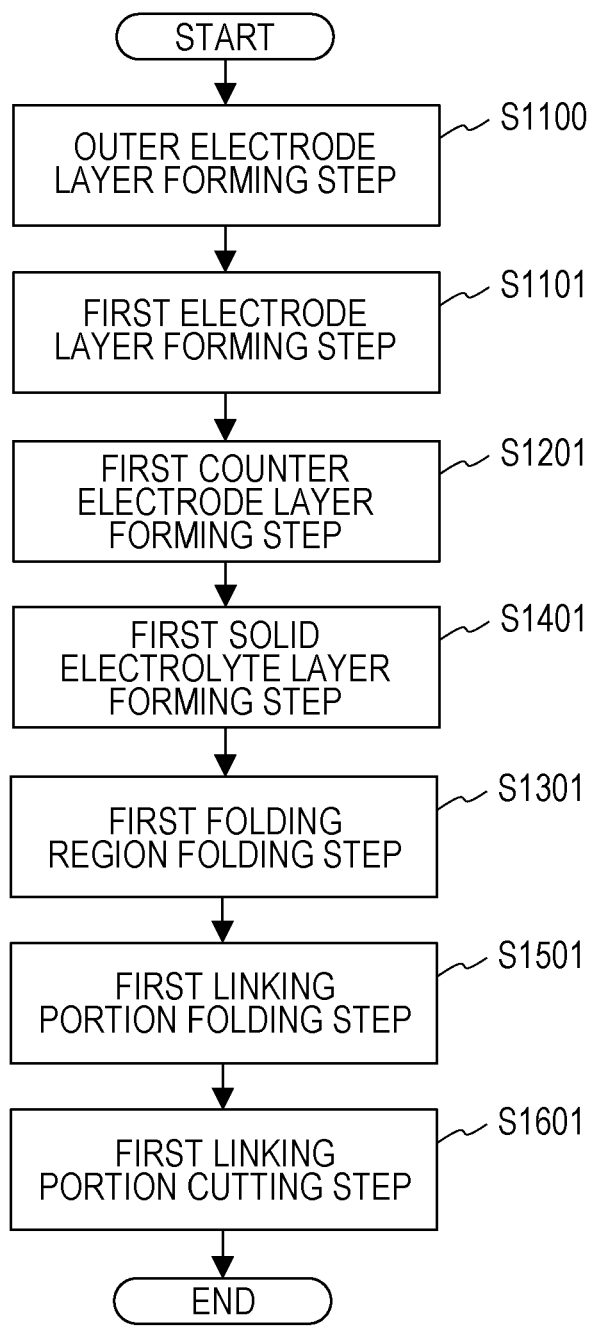
FIG. 15 is a flowchart illustrating an example of a battery manufacturing method according to the second embodiment.

FIG. 15 is a flowchart illustrating an example of a battery manufacturing method according to the second embodiment.

The battery manufacturing method illustrated in FIG. 15 further includes the following steps, in addition to the steps of the above-described battery manufacturing method illustrated in FIG. 13.

That is to say, the battery manufacturing method illustrated in FIG. 15 further includes an outer electrode layer forming step S1100 (i.e., a step (a0)), a first solid electrolyte layer forming step S1401 (i.e., a step (d1)), a first linking portion folding step S1501 (i.e., a step (e1)), and a first linking portion cutting step S1601 (i.e., a step (f1)).

The outer electrode layer forming step S1100 is a step in which the outer electrode layer 211, which is a counter electrode of the first counter electrode layer 212, is formed in contact with the outer region 141 by the electrode layer forming unit 410.

The first solid electrolyte layer forming step S1401 is a step in which the first solid electrolyte layer 213 is formed on at least one of the first counter electrode layer 212 and outer electrode layer 211 by the solid electrolyte layer forming unit 440.

The first linking portion folding step S1501 is a step in which the first linking portion 151 is folded by the current collector folding unit 430. The first linking portion folding step S1501 may be executed after the first solid electrolyte layer forming step S1401.

The first solid electrolyte layer 213 is interposed between the first counter electrode layer 212 and outer electrode layer 211, due to the current collector 100 being folded at the first linking portion 151 by the current collector folding unit 430 in the first linking portion folding step S1501.

The first linking portion cutting step S1601 is a step in which the first linking portion 151 is cut by the cutting unit 450. The first linking portion cutting step S1601 may be executed after the first linking portion folding step S1501.

According to the above manufacturing apparatus and manufacturing method, one solid battery cell (first power-generating element 210) can be fabricated by a convenient single-face film formation process. That is to say, a solid battery cell (first power-generating element 210) having the outer electrode layer 211, first counter electrode layer 212, and the first solid electrolyte layer 213, can be formed by a step of forming the first counter electrode layer 212 and outer electrode layer 211 on one face of a current collector 100 (i.e., the front face of the current collector 100 where the first front face region 111 and outer region 141 are situated), a step of folding the first linking portion 151, and a step of cutting the first linking portion 151. Accordingly, a solid battery cell can be fabricated while suppressing positional deviating among the component members, as compared with a case of using a process of laminating a great number of individual component members.

Note that the current collector 100 according to the second embodiment may include a second linking portion 152 and a third front face region 121.

The second linking portion 152 is a region adjacent to the second front face region 113.

The third front face region 121 is a region adjacent to the second linking portion 152.

In the battery manufacturing apparatus 2100 according to the second embodiment, the counter electrode layer forming unit 420 may form the second counter electrode layer 222, which is a counter electrode of the first electrode layer 221, in contact with the third front face region 121.

The solid electrolyte layer forming unit 440 may form the second solid electrolyte layer 223 on at least one of the first electrode layer 221 and second counter electrode layer 222.

The current collector folding unit 430 may fold the second linking portion 152.

At this time, the second solid electrolyte layer 223 may be disposed between the first electrode layer 221 and second counter electrode layer 222, due to the current collector 100 being folded at the second linking portion 152 by the current collector folding unit 430.

The cutting unit 450 may cut the second linking portion 152.

Figure 16:
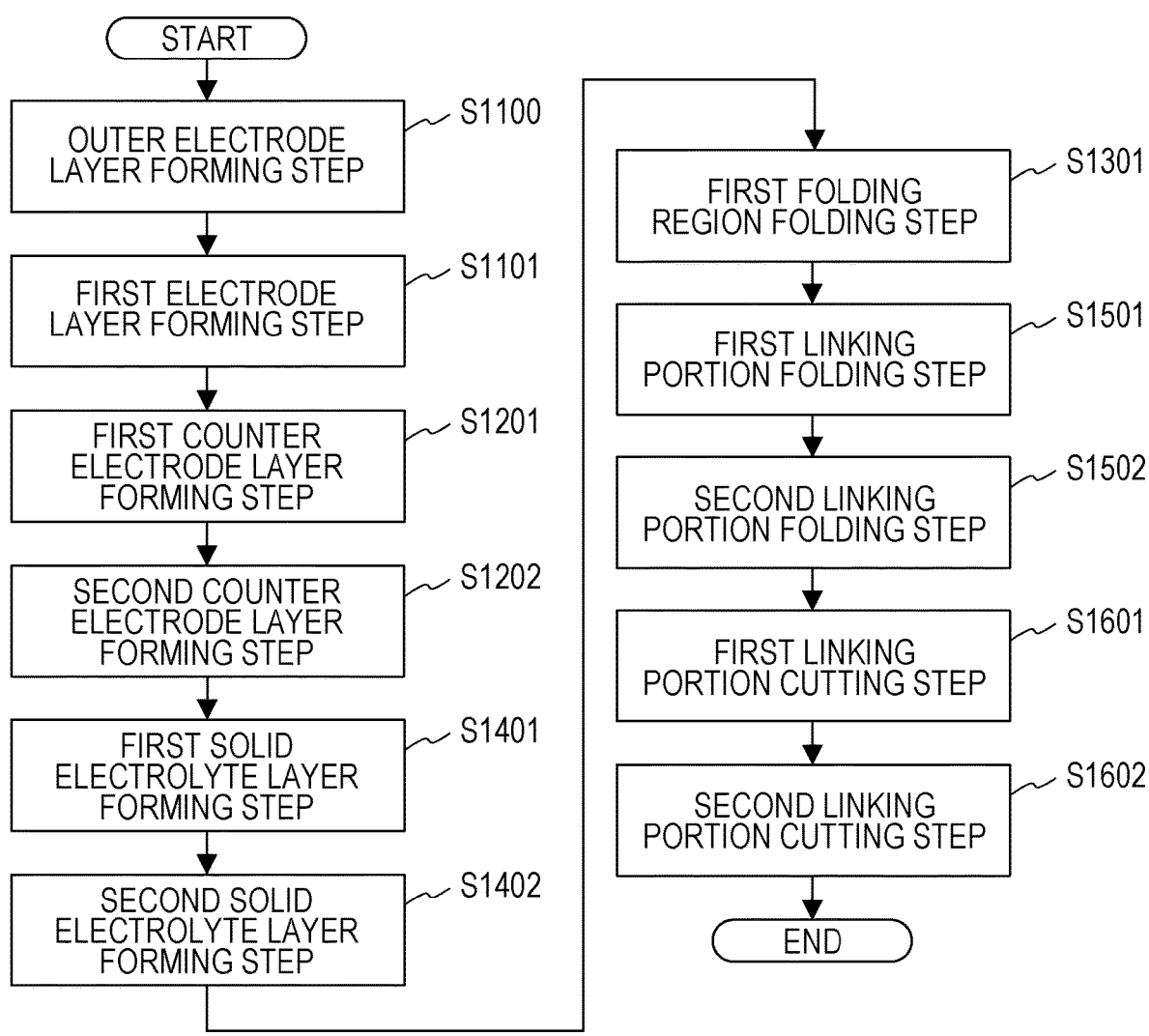
FIG. 16 is a flowchart illustrating an example of a battery manufacturing method according to the second embodiment.

FIG. 16 is a flowchart illustrating an example of a battery manufacturing method according to the second embodiment.

The battery manufacturing method illustrated in FIG. 16 further includes the following steps, in addition to the steps of the above-described battery manufacturing method illustrated in FIG. 15.

That is to say, the battery manufacturing method illustrated in FIG. 16 further includes a second counter electrode layer forming step S1202 (i.e., a step (b2)), a second solid electrolyte layer forming step S1402 (i.e., a step (d2)), a second linking portion folding step S1502 (i.e., a step (e2)), and a second linking portion cutting step S1602 (i.e., a step (f2)).

The second counter electrode layer forming step S1202 is a step in which the second counter electrode layer 222, which is a counter electrode of the first electrode layer 221, is formed in contact with the third front face region 121 by the counter electrode layer forming unit 420.

The second solid electrolyte layer forming step S1402 is a step in which the second solid electrolyte layer 223 is formed on at least one of the first electrode layer 221 and second counter electrode layer 222 by the solid electrolyte layer forming unit 440.

The second linking portion folding step S1502 is a step of folding the second linking portion 152 by the current collector folding unit 430. The second linking portion folding step S1502 may be executed after the second solid electrolyte layer forming step S1402.

The second solid electrolyte layer 223 is interposed between the first electrode layer 221 and second counter electrode layer 222, due to the current collector 100 being folded at the second linking portion 152 by the current collector folding unit 430 in the second linking portion folding step S1502.

The second linking portion cutting step S1602 is a step of cutting the second linking portion 152 by the cutting unit 450. The second linking portion cutting step S1602 may be executed after the second linking portion folding step S1502.

According to the above manufacturing apparatus and manufacturing method, one solid battery cell (second power-generating element 220) can be fabricated by a convenient single-face film formation process. That is to say, a solid battery cell (second power-generating element 220) having the first electrode layer 221, second counter electrode layer 222, and second solid electrolyte layer 223, can be formed by a step of forming the first electrode layer 221 and second counter electrode layer 222 on one face of the current collector 100 (i.e., the front face of the current collector 100 where the second front face region 113 and third front face region 121 are situated), a step of folding the second linking portion 152, and a step of cutting the second linking portion 152. Accordingly, a laminated battery, where the first power-generating element 210 and second power-generating element 220 are serially connected via part of the current collector 100 (i.e., the first current collector 110), can be fabricated while suppressing positional deviating among the component members, as compared with a case of using a process of laminating a great number of individual component members.

According to the above-described manufacturing apparatus and manufacturing method, the battery 1000 according to the first embodiment can be manufactured.

A specific example of the battery manufacturing method according to the second embodiment will be described below.

Figure 17:
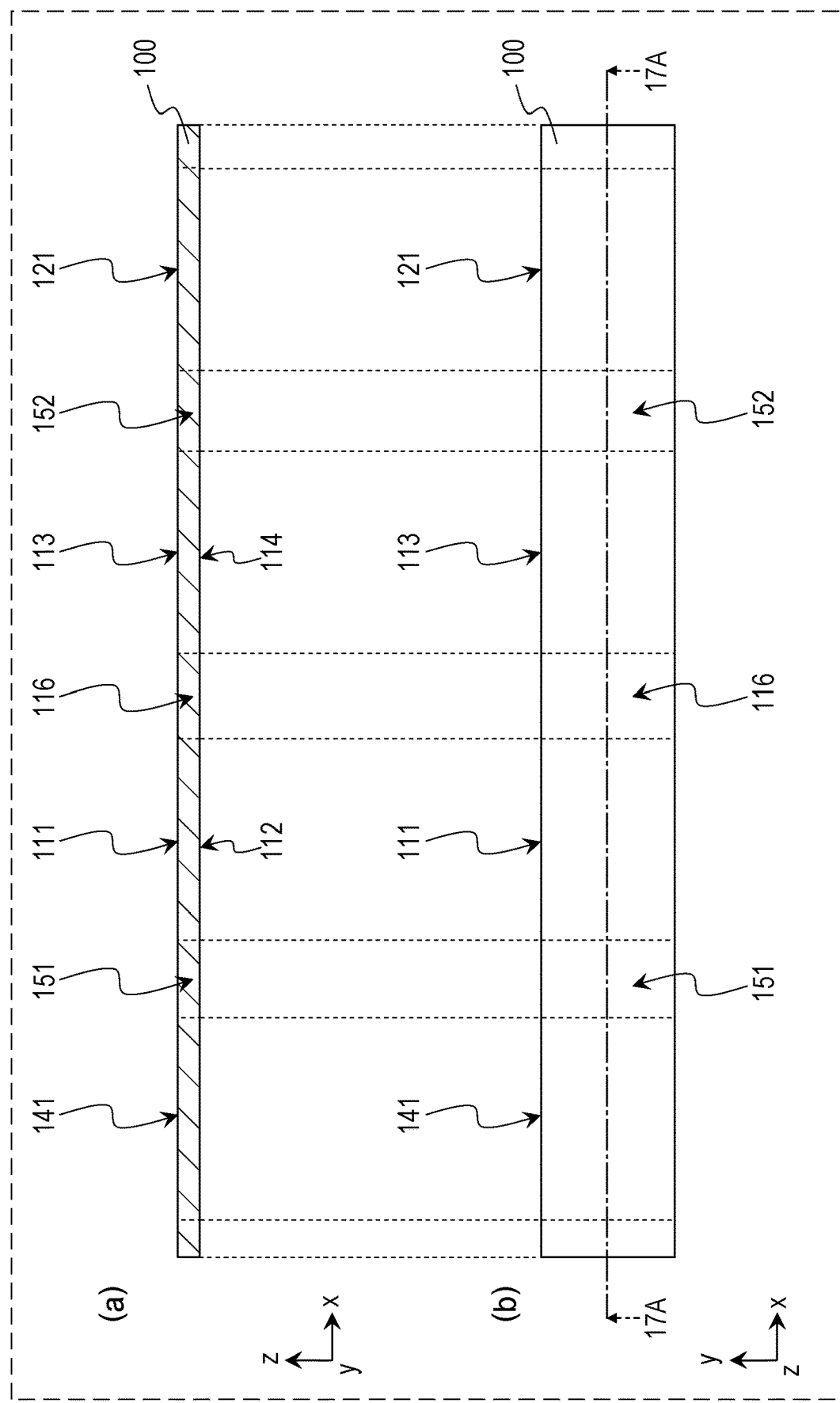
FIG. 17 is a diagram illustrating a schematic configuration of a current collector according to the second embodiment.

FIG. 17 is a diagram illustrating a schematic configuration of the current collector 100 according to the second embodiment.

Indicated by (a) in FIG. 17 is an x-z diagram (cross-sectional view taken along 17A in FIG. 17) illustrating a schematic configuration of the current collector 100 according to the second embodiment.

Indicated by (b) in FIG. 17 is an x-y diagram (plan view) illustrating a schematic configuration of the current collector 100 according to the second embodiment.

Figure 18:
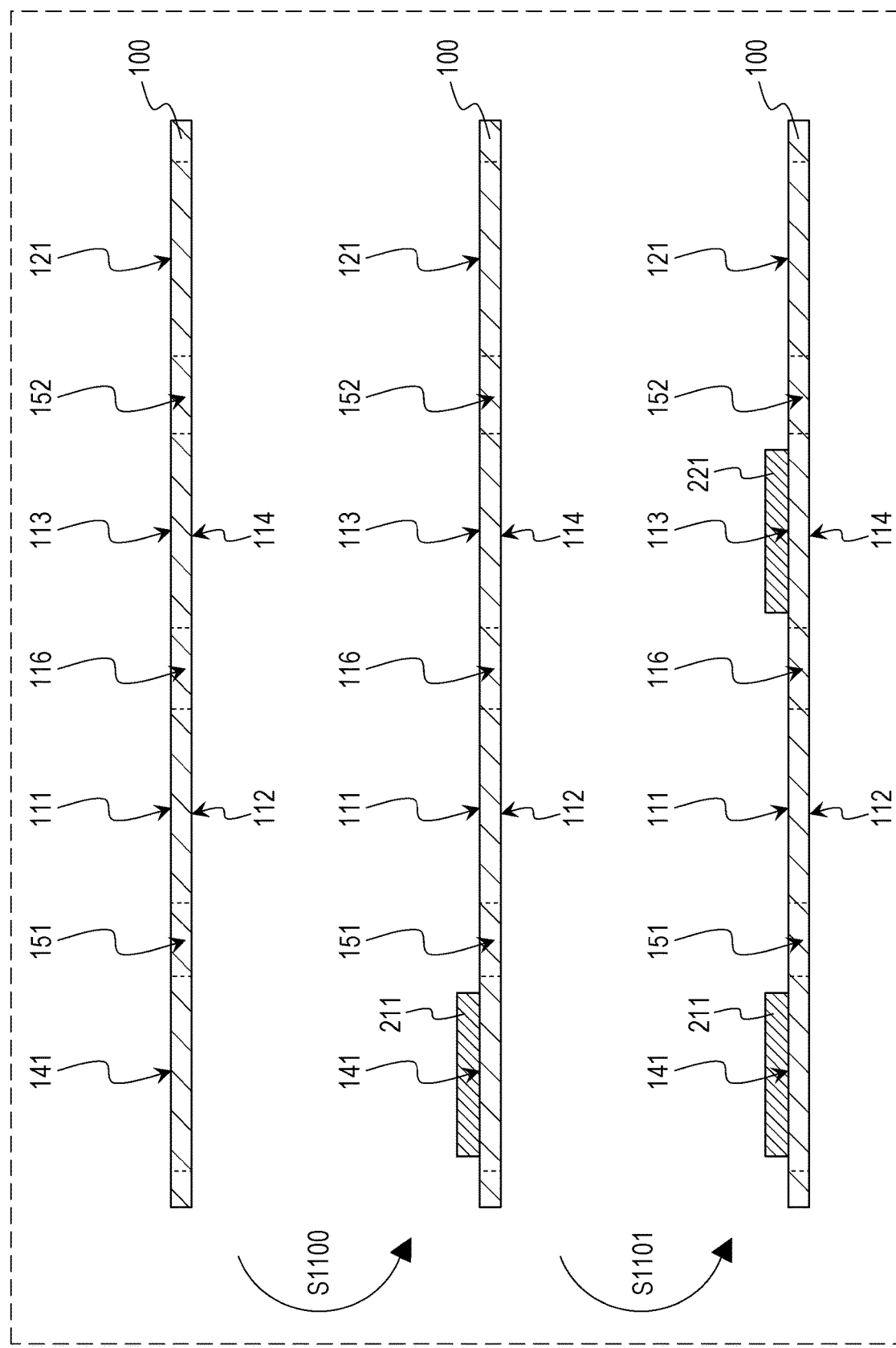
FIG. 18 is a diagram illustrating an example of an outer electrode layer forming step and a first electrode layer forming step.

FIG. 18 is a diagram illustrating an example of the outer electrode layer forming step S1100 and first electrode layer forming step S1101.

The outer electrode layer 211 is formed in contact with the outer region 141 by the electrode layer forming unit 410, by the outer electrode layer forming step S1100 being performed. The electrode layer forming unit 410 may apply a coating material (a paste-like coating agent, in which materials making up the outer electrode layer 211 have been kneaded with a solvent) on the outer region 141 of the current collector 100 prepared beforehand, for example. The coating material may then be dried. The coating material may be pressed after drying. This enables the density of the material of the outer electrode layer 211 to be increased.

The first electrode layer 221 is formed in contact with the second front face region 113 by the electrode layer forming unit 410, by the first electrode layer forming step S1101 being performed. The electrode layer forming unit 410 may apply a coating material (a paste-like coating agent, in which in which materials making up the first electrode layer 221 have been kneaded with a solvent) on the second front face region 113 of the current collector 100 prepared beforehand, for example. The coating material may then be dried. The coating material may be pressed after drying. This enables the density of the material of the first electrode layer 221 to be increased.

Note that the outer electrode layer forming step S1100 may be executed before the first electrode layer forming step S1101, or may be executed afterwards.

Thus, the electrode layers may be intermittently formed, having a regularity, on the front face of the current collector 100. For example, the electrode layers may be formed in rectangular regions at predetermined intervals, as illustrated in FIG. 18.

Figure 19:
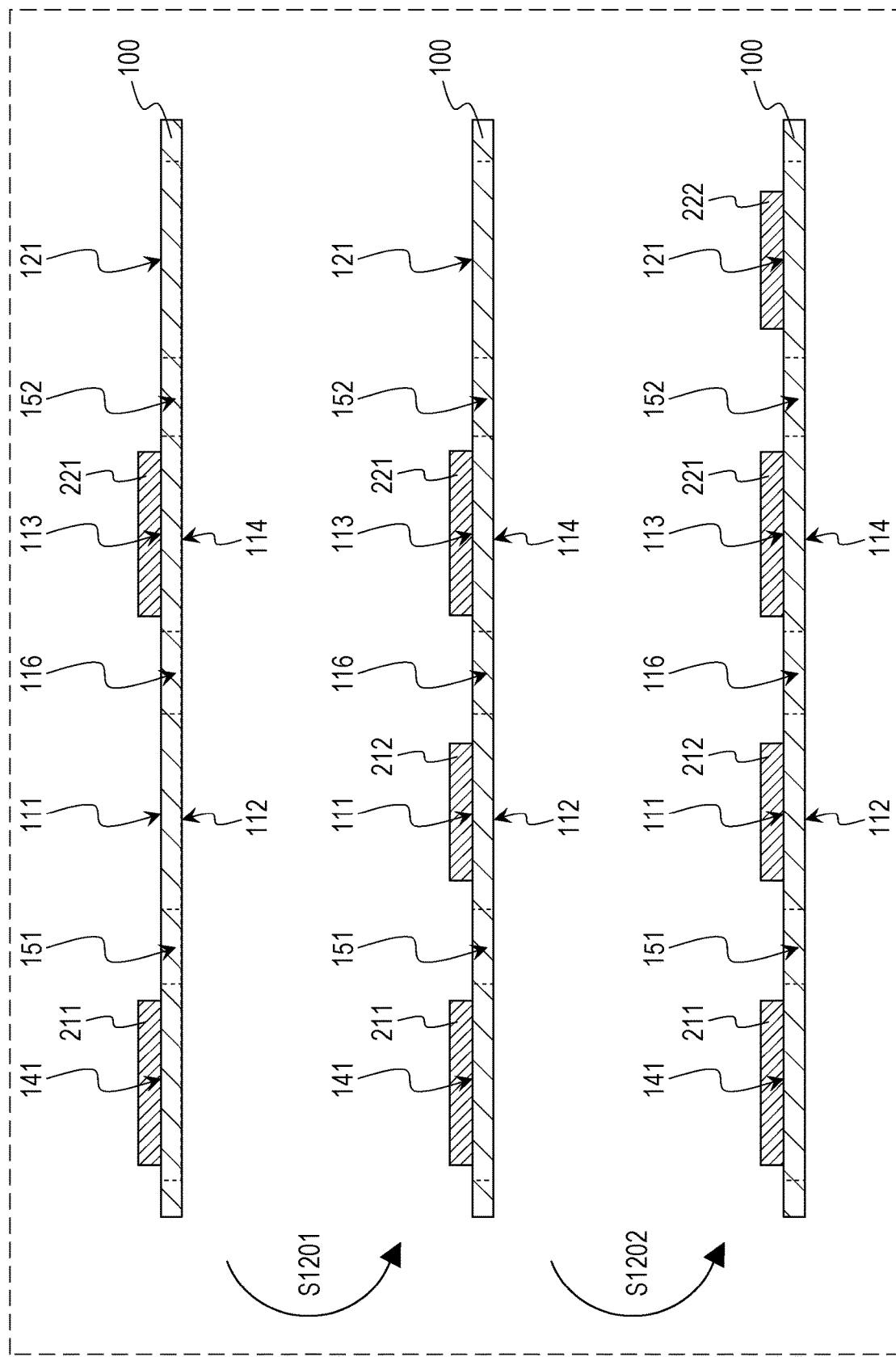
FIG. 19 is a diagram illustrating an example of a first counter electrode layer forming step and a second solid electrolyte layer forming step.

FIG. 19 is a diagram illustrating an example of the first counter electrode layer forming step S1201 and second counter electrode layer forming step S1202.

The first counter electrode layer 212 is formed in contact with the first front face region 111 by the counter electrode layer forming unit 420, by the first counter electrode layer forming step S1201 being performed. The counter electrode layer forming unit 420 may apply a coating material (a paste-like coating agent, in which materials making up the first counter electrode layer 212 have been kneaded with a solvent) on the first front face region 111 of the current collector 100 prepared beforehand, for example. The coating material may then be dried. The coating material may be pressed after drying. This enables the density of the material of the first counter electrode layer 212 to be increased.

The second counter electrode layer 222 is formed in contact with the third front face region 121 by the counter electrode layer forming unit 420, by the second counter electrode layer forming step S1202 being performed. The counter electrode layer forming unit 420 may apply a coating material (a paste-like coating agent, in which materials making up the second counter electrode layer 222 have been kneaded with a solvent) on the third front face region 121 of the current collector 100 prepared beforehand, for example. The coating material may then be dried. The coating material may be pressed after drying. This enables the density of the material of the second counter electrode layer 222 to be increased.

The first counter electrode layer forming step S1201 may be executed before the second counter electrode layer forming step S1202, or may be executed afterwards.

Thus, the counter electrode layers may be intermittently formed, having a regularity, on the front face of the current collector 100. For example, the electrode layers may be formed in rectangular regions at predetermined intervals, as illustrated in FIG. 19.

Note that the first counter electrode layer forming step S1201 and second counter electrode layer forming step S1202 may be executed before the outer electrode layer forming step S1100 and first electrode layer forming step S1101, or may be executed afterwards.

Figure 20:
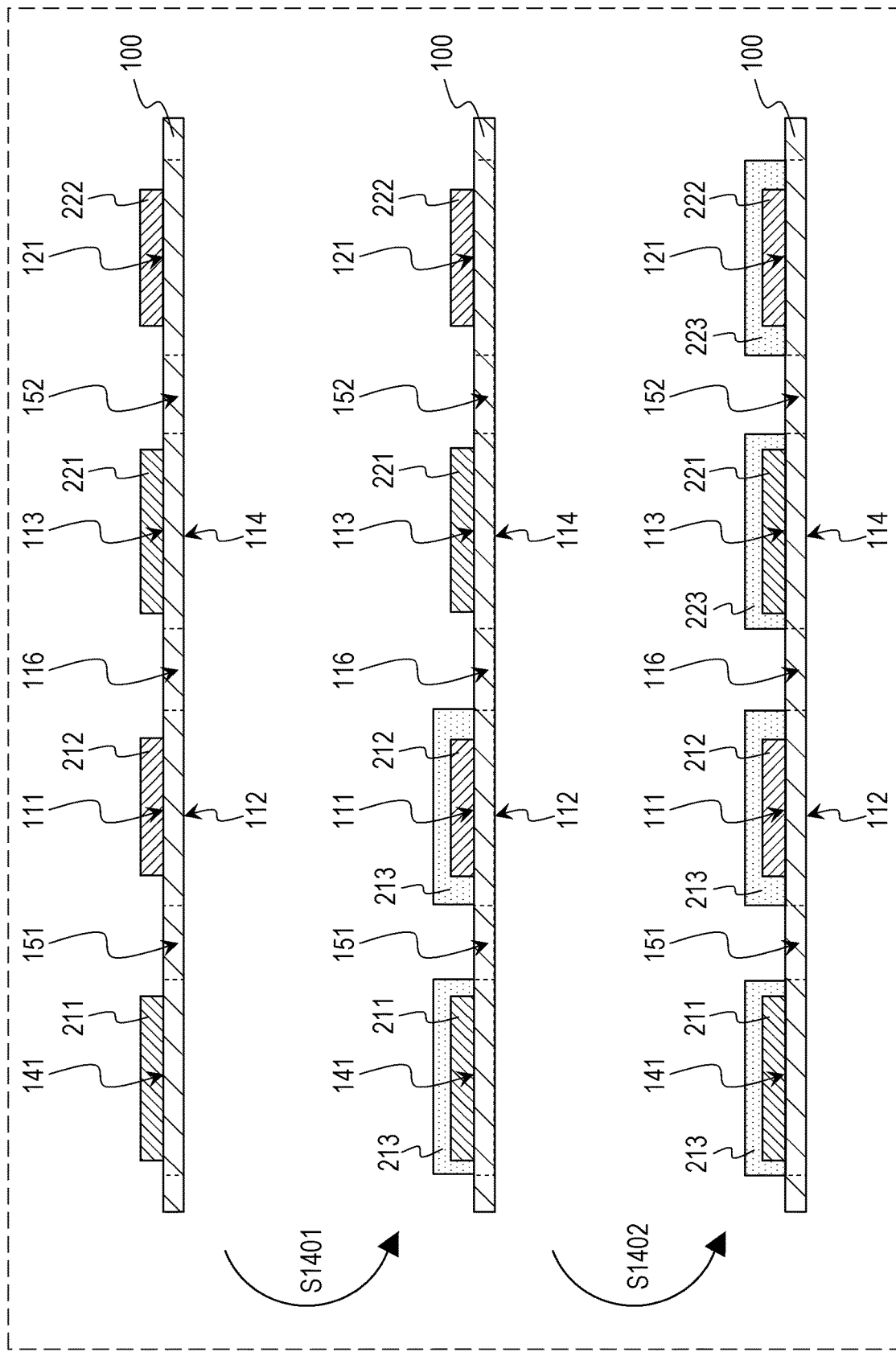
FIG. 20 is a diagram illustrating an example of a first solid electrolyte layer forming step and a second solid electrolyte layer forming step.

FIG. 20 is a diagram illustrating an example of the first solid electrolyte layer forming step S1401 and second solid electrolyte layer forming step S1402.

The first solid electrolyte layer 213 is formed on at least one of the first counter electrode layer 212 and outer electrode layer 211 by the solid electrolyte layer forming unit 440, by the first solid electrolyte layer forming step S1401 being performed. The solid electrolyte layer forming unit 440 may apply a coating material (a paste-like coating agent, in which materials making up the first solid electrolyte layer 213 have been kneaded with a solvent) on at least one of the first counter electrode layer 212 and outer electrode layer 211, for example. The coating material may then be dried. The coating material may be pressed after drying. This enables the density of the material of the first solid electrolyte layer 213 to be increased.

The first solid electrolyte layer 213 may be formed on both of the first counter electrode layer 212 and outer electrode layer 211, as illustrated in FIG. 20.

Alternatively, the first solid electrolyte layer 213 may be formed on only one of the first counter electrode layer 212 and outer electrode layer 211. In this case, the first solid electrolyte layer forming step S1401 may be executed before one of the outer electrode layer forming step S1100 and first counter electrode layer forming step S1201.

The second solid electrolyte layer 223 is formed on at least one of the first electrode layer 221 and second counter electrode layer 222 by the solid electrolyte layer forming unit 440, by the second solid electrolyte layer forming step S1402 being performed. The solid electrolyte layer forming unit 440 may apply a coating material (a paste-like coating unit, in which materials making up the second solid electrolyte layer 223 have been kneaded with a solvent) on at least one of the first electrode layer 221 and second counter electrode layer 222, for example. The coating material may then be dried. The coating material may be pressed after drying. This enables the density of the material of the second solid electrolyte layer 223 to be increased.

The second solid electrolyte layer 223 may be formed on both of the first electrode layer 221 and second counter electrode layer 222, as illustrated in FIG. 20.

Alternatively, the second solid electrolyte layer 223 may be formed on only one of the first electrode layer 221 and second counter electrode layer 222. In this case, the second solid electrolyte layer forming step S1402 may be executed before one of the first electrode layer forming step S1101 and second counter electrode layer forming step S1202.

Note that the first solid electrolyte layer forming step S1401 may be executed before the second solid electrolyte layer forming step S1402, or may be executed afterwards.

Figure 21:
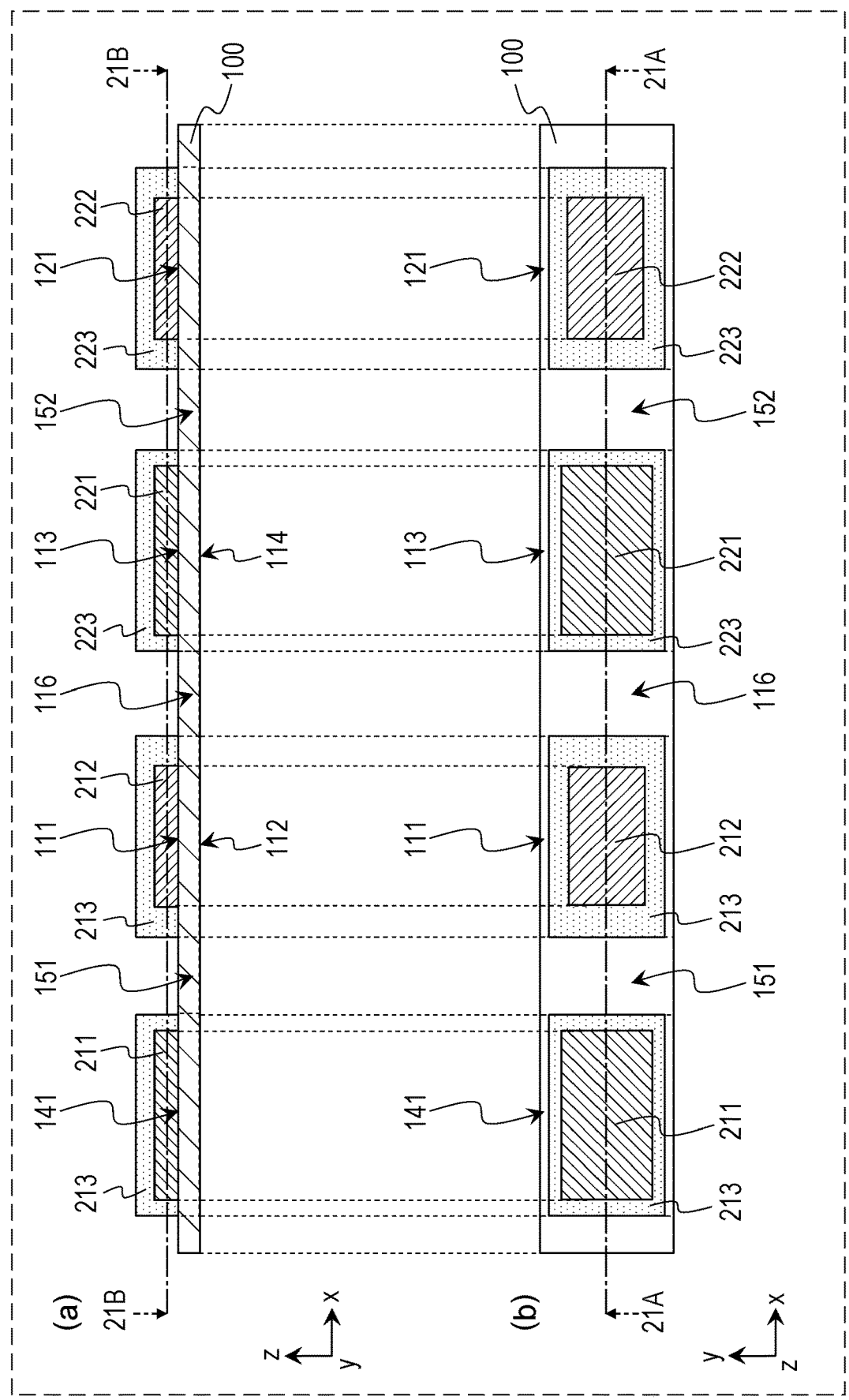
FIG. 21 is a diagram illustrating a schematic configuration of a current collector where electrode layers, counter electrode layers, and solid electrolyte layers have been formed.

FIG. 21 is a diagram illustrating a schematic configuration of the current collector 100 where electrode layers, counter electrode layers, and solid electrolyte layers have been formed.

Indicated by (a) in FIG. 21 is an x-z diagram (cross-sectional view taken along 21A in FIG. 21), illustrating a schematic configuration of the current collector 100.

Indicated by (b) FIG. 21 is an x-y diagram (cross-sectional view taken along 21B in FIG. 21), illustrating a schematic configuration of the current collector 100.

Note that in the first solid electrolyte layer forming step S1401, the first solid electrolyte layer 213 may be formed over a greater area than the outer electrode layer 211 and first counter electrode layer 212, as illustrated in FIG. 21. Accordingly, the first solid electrolyte layer 213 can be disposed in contact with the first current collector 110 and outer current collector 140.

Also, in the second solid electrolyte layer forming step S1402, the second solid electrolyte layer 223 may be formed over a greater area than the first electrode layer 221 and second counter electrode layer 222, as illustrated in FIG. 21. Accordingly, the second solid electrolyte layer 223 can be disposed in contact with the first current collector 110 and second current collector 120.

Figure 22:
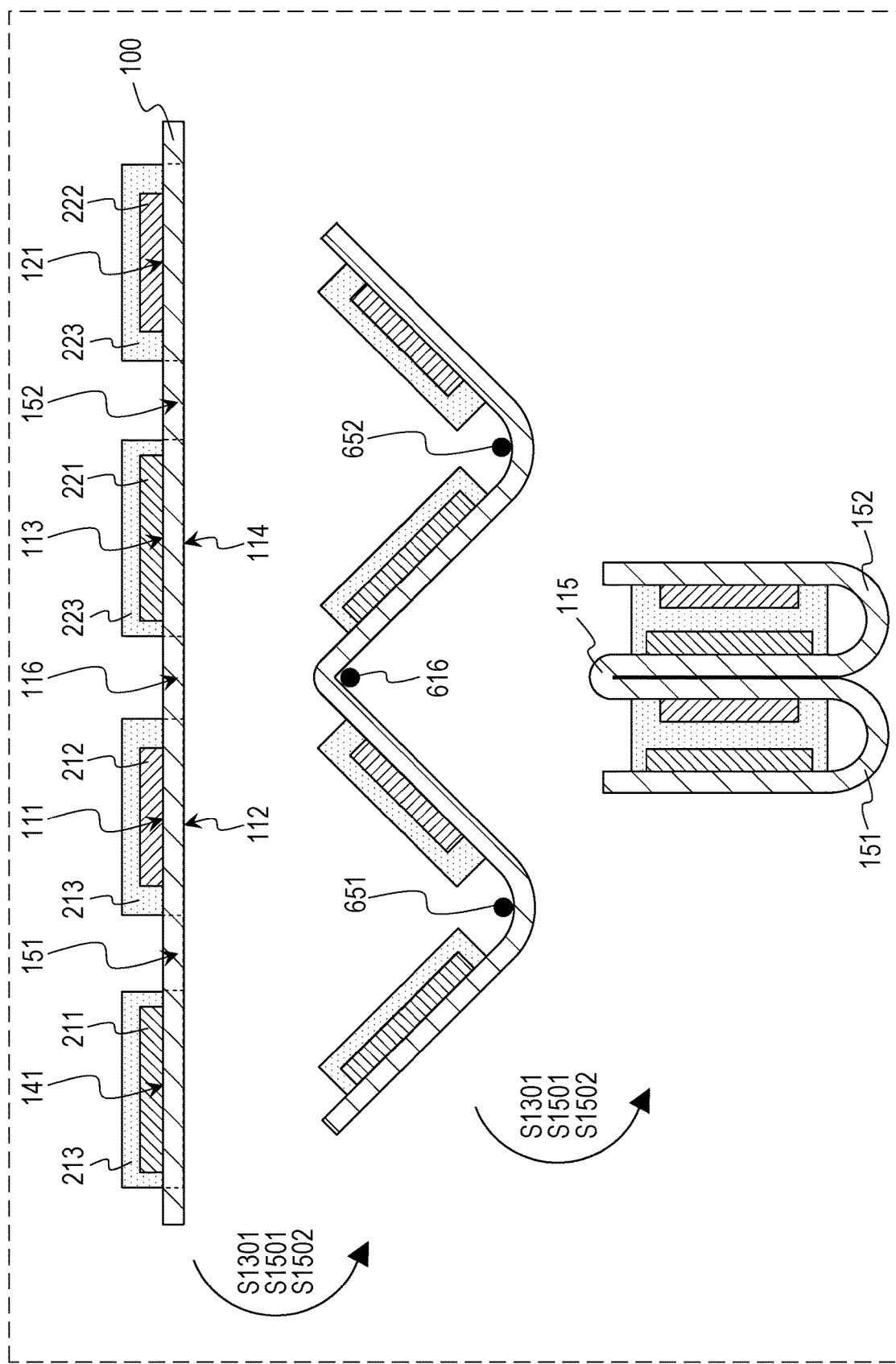
FIG. 22 is a diagram illustrating an example of a first fold region folding step, first linking portion folding step, and a second linking portion folding step.

FIG. 22 is a diagram illustrating an example of a first fold region folding step S1301, first linking portion folding step S1501, and a second linking portion folding step S1501.

The first fold region 116 is folded by the current collector folding unit 430, by the first fold region folding step S1301 being executed. The current collector folding unit 430 may have a folding member 616 (e.g., rod member, wire member, etc.), for example. The current collector folding unit 430 may at this time apply the folding member 616 against the first fold region 116, and move at least one of the current collector 100 and the folding member 616, thereby folding the first fold region 116.

Folding the first fold region 116 in the first fold region folding step S1301 forms the first fold portion 115 illustrated in the first embodiment described above.

The first linking portion 151 is folded by the current collector folding unit 430, by the first linking portion folding step S1501 being executed. The current collector folding unit 430 may have a folding member 651 (e.g., rod member, wire member, etc.), for example. The current collector folding unit 430 may at this time apply the folding member 651 against the first linking portion 151, and move at least one of the current collector 100 and the folding member 651, thereby folding the first linking portion 151.

The second linking portion 152 is folded by the current collector folding unit 430, by the second linking portion folding step S1502 being executed. The current collector folding unit 430 may have a folding member 652 (e.g., rod member, wire member, etc.), for example. The current collector folding unit 430 may at this time apply the folding member 652 against the second linking portion 152, and move at least one of the current collector 100 and the folding member 652, thereby folding the second linking portion 152.

The first fold region folding step S1301 may be executed before the first linking portion folding step S1501 and second linking portion folding step S1502, or may be executed afterwards.

Further, first linking portion folding step S1501 may be executed before the second linking portion folding step S1502 or may be executed afterwards.

Alternatively, the first fold region folding step S1301, first linking portion folding step S1501, and second linking portion folding step S1502 may be executed at the same time, as illustrated in FIG. 22.

Figure 23:
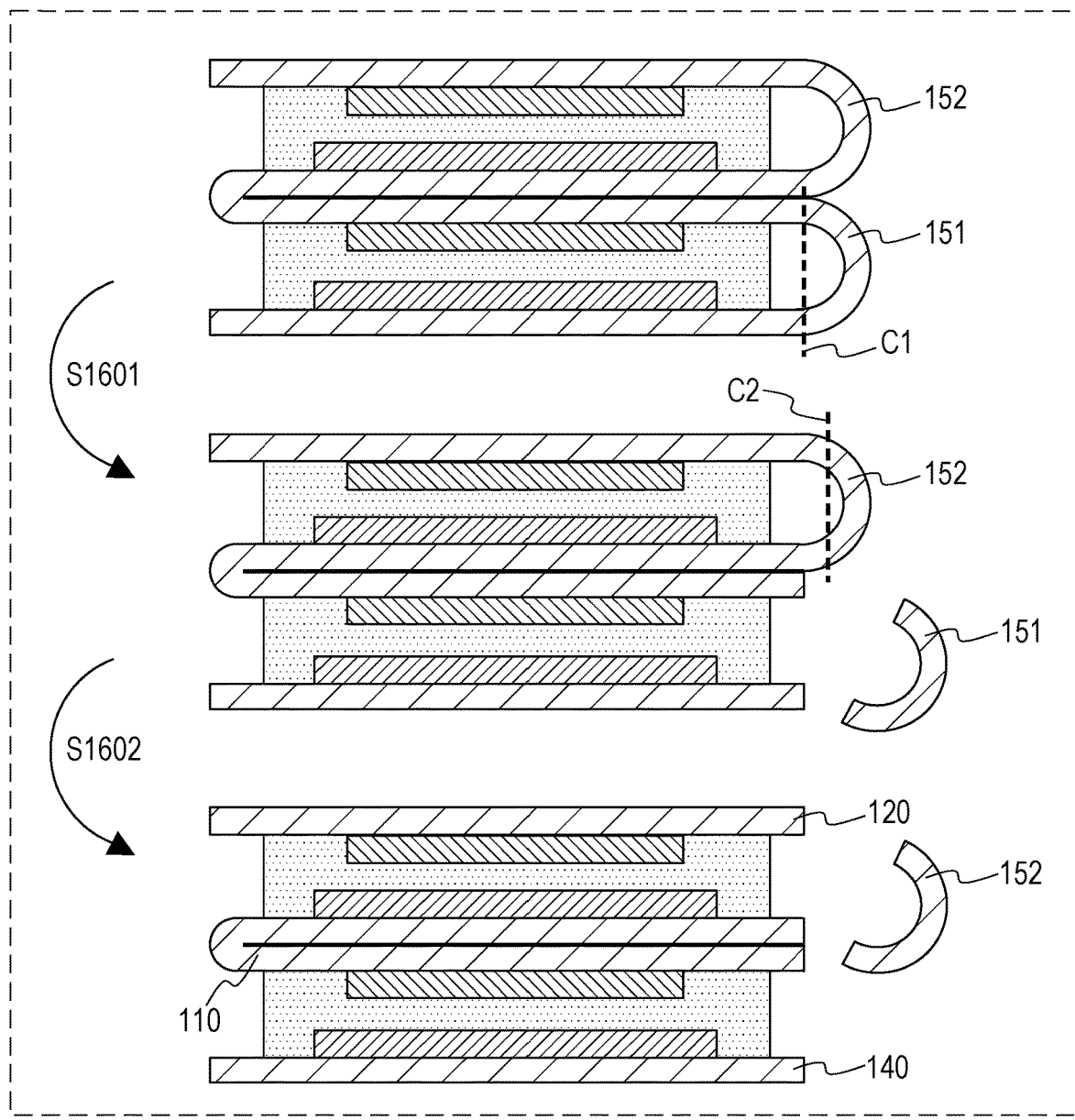
FIG. 23 is a diagram illustrating an example of a first linking portion cutting step and a second linking portion cutting step.

FIG. 23 is a diagram illustrating an example of the first linking portion cutting step S1601 and second linking portion cutting step S1602.

The first linking portion 151 is cut by the cutting unit 450, by the first linking portion cutting step S1601 being executed. The cutting unit 450 may cut the first linking portion 151 (e.g., at position C1 illustrated in FIG. 23) by a cutting member (e.g., cutter, die punch device, etc.), for example. Alternatively, the cutting unit 450 may cut the first linking portion 151 using a method where part of the first linking portion 151 is removed by a chemical reaction or the like, for example. The short-circuited state of the outer electrode layer 211 and first counter electrode layer 212 is resolved due to the first linking portion 151 being cut. Accordingly, the first power-generating element 210 can be charged/discharged as a cell battery.

The second linking portion 152 is cut by the cutting unit 450, by the second linking portion cutting step S1602 being executed. The cutting unit 450 may cut the second linking portion 152 (e.g., at position C2 illustrated in FIG. 23) by a cutting member (e.g., cutter, die punch device, etc.), for example. Alternatively, the cutting unit 450 may cut the second linking portion 152 using a method where part of the second linking portion 152 is removed by a chemical reaction or the like, for example. The short-circuited state of the first electrode layer 221 and second counter electrode layer 222 is resolved due to the second linking portion 152 being cut. Accordingly, the second power-generating element 220 can be charged/discharged as a cell battery.

Note that the first linking portion cutting step S1601 may be executed before the second linking portion cutting step S1602, or may be executed afterwards.

Alternatively, the first linking portion cutting step S1601 and second linking portion cutting step S1602 may be executed at the same time.

The current collector 100 becomes the outer current collector 140, first current collector 110, and second current collector 120 illustrated in the first embodiment described above, by the first linking portion cutting step S1601 and second linking portion cutting step S1602 being executed.

According to the specific example of the battery manufacturing method according to the second embodiment described above, the battery 1000 according to the first embodiment can be fabricated.

In the battery manufacturing apparatus 2100 according to the second embodiment, the solid electrolyte layer forming unit 440 may form the first solid electrolyte layer 213 on part of the first fold region 116. The solid electrolyte layer forming unit 440 may also form the second solid electrolyte layer 223 on part of the first fold region 116.

In other words, in the battery manufacturing method according to the second embodiment, the first solid electrolyte layer 213 may be formed on part of the first fold region 116 by the solid electrolyte layer forming unit 440 in the first solid electrolyte layer forming step S1401. Also, the second solid electrolyte layer 223 may be formed on part of the first fold region 116 by the solid electrolyte layer forming unit 440 in the second solid electrolyte layer forming step S1402.

According to the above configuration, processing can be executed to prevent exposure of the first fold region 116 (i.e., the first fold portion 115 after folding the current collector 100) in the step of forming the solid electrolyte layers (at least one of the first solid electrolyte layer 213 and second solid electrolyte layer 223). That is to say, the first fold region 116 (i.e., the first fold portion 115 after folding the current collector 100) can be prevented from being exposed, by a simple process. Accordingly, the probability of another current collector adjacent to the first fold portion 115 and the first fold portion 115 short-circuiting can be reduced. Thus, the reliability of the battery can be improved.

Figure 24:
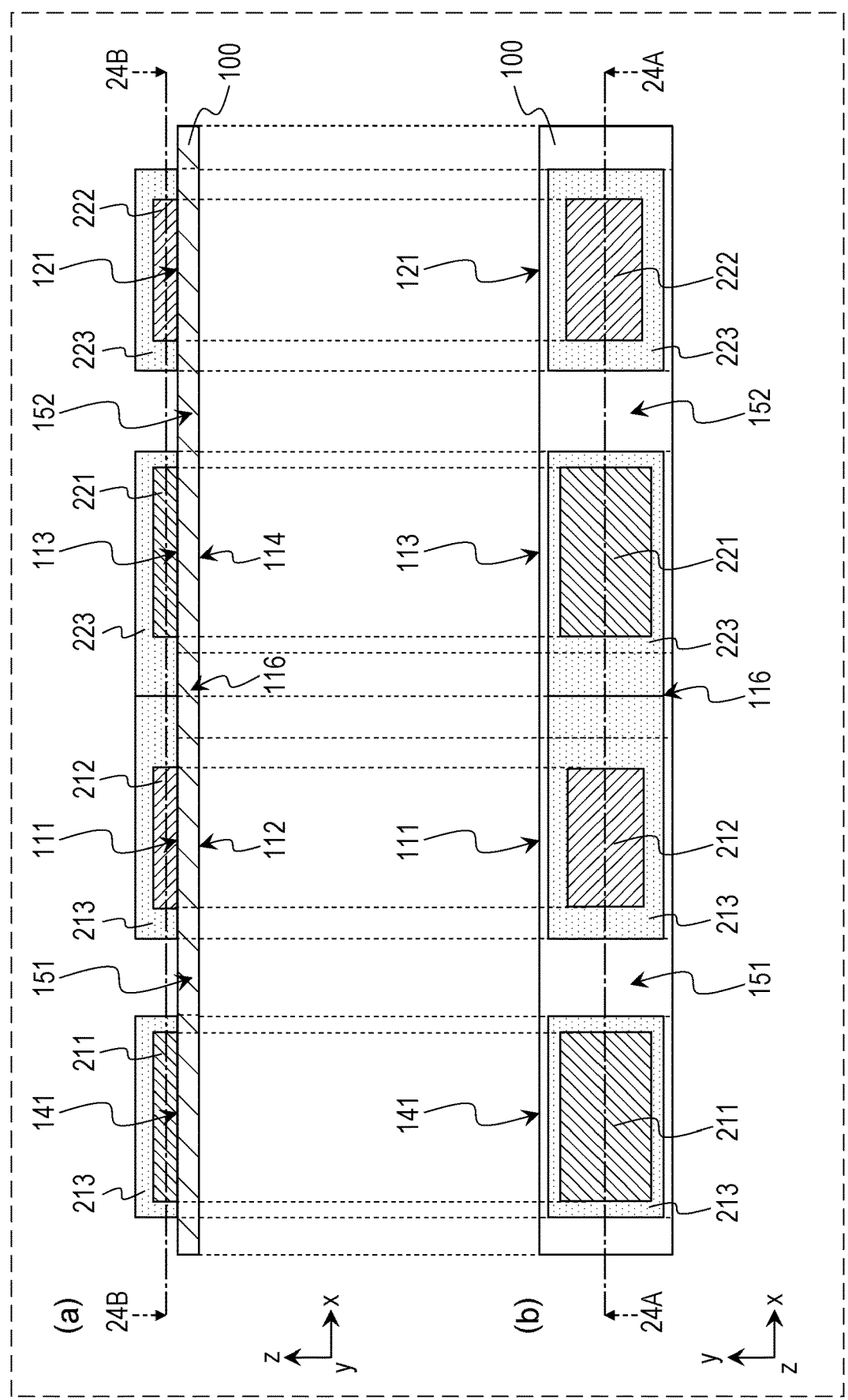
FIG. 24 is a diagram illustrating a schematic configuration of a current collector where electrode layers, counter electrode layers, and solid electrolyte layers have been formed.

FIG. 24 is a diagram illustrating a schematic configuration of the current collector 100 where electrode layers, counter electrode layers, and solid electrolyte layers have been formed.

Indicated by (a) in FIG. 24 is an x-z diagram (cross-sectional view taken along 24A in FIG. 24), illustrating a schematic configuration of the current collector 100.

Indicated by (b) FIG. 24 is an x-y diagram (cross-sectional view taken along 24B in FIG. 24), illustrating a schematic configuration of the current collector 100.

In the example illustrated in FIG. 24, part of the first fold portion 115 is covered by the first solid electrolyte layer 213, and the remaining part of the first fold portion 115 is covered by the second solid electrolyte layer 223.

According to the battery manufacturing method described above, the battery 1100 according to the above-described first embodiment can be fabricated.

Note that in the battery manufacturing method according to the second embodiment, the first fold portion 115 may be covered by the first solid electrolyte layer 213 alone. Alternatively, the first fold portion 115 may be covered by the second solid electrolyte layer 223 alone.

Figure 25:
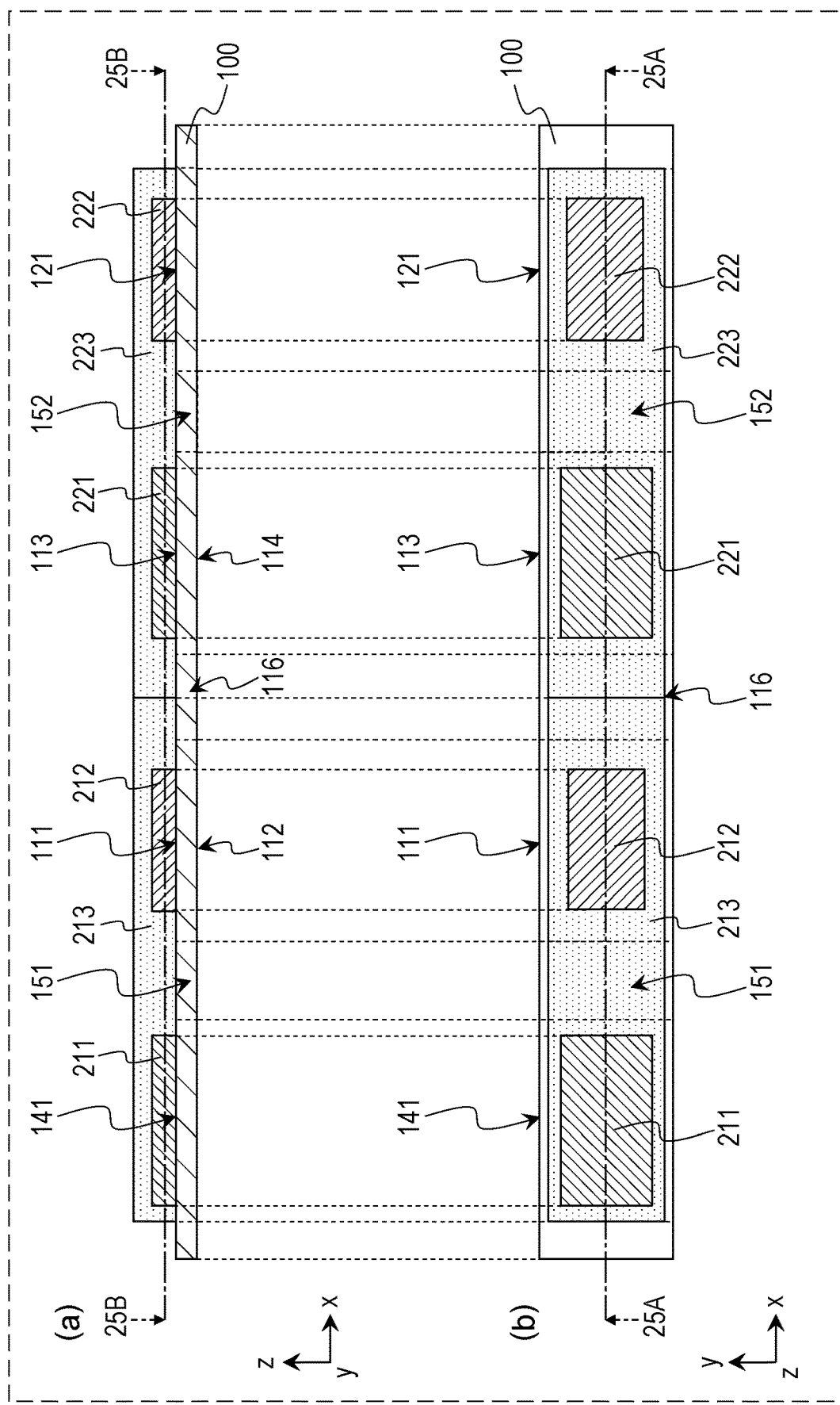
FIG. 25 is a diagram illustrating a schematic configuration of a current collector where electrode layers, counter electrode layers, and solid electrolyte layers have been formed.

FIG. 25 is a diagram illustrating a schematic configuration of the current collector 100 where electrode layers, counter electrode layers, and solid electrolyte layers have been formed.

Indicated by (a) in FIG. 25 is an x-z diagram (cross-sectional view taken along 25A in FIG. 25), illustrating a schematic configuration of the current collector 100.

Indicated by (b) in FIG. 25 is an x-y diagram (cross-sectional view taken along 25B in FIG. 25), illustrating a schematic configuration of the current collector 100.

In the first solid electrolyte layer forming step S1401, the first solid electrolyte layer 213 may be formed on the first linking portion 151 by the solid electrolyte layer forming unit 440, as illustrated in FIG. 25.

According to the above configuration, the first solid electrolyte layer 213 can be continuously formed on the outer electrode layer 211, first linking portion 151, and first counter electrode layer 212 in the first solid electrolyte layer forming step S1401. Accordingly, the step of forming the first solid electrolyte layer 213 can be further simplified.

The cutting unit 450 may at this time cut part of the first solid electrolyte layer 213 formed on the first linking portion 151 in the first linking portion cutting step S1601, along with the first linking portion 151.

In the second solid electrolyte layer forming step S1402, the second solid electrolyte layer 223 may be formed on the second linking portion 152 by the solid electrolyte layer forming unit 440, as illustrated in FIG. 25.

According to the above configuration, the second solid electrolyte layer 223 can be continuously formed on the first electrode layer 221, second linking portion 152, and second counter electrode layer 222 in the second solid electrolyte layer forming step S1402. Accordingly, the step of forming the second solid electrolyte layer 223 can be further simplified.

The cutting unit 450 may at this time cut part of the second solid electrolyte layer 223 formed on the second linking portion 152 in the second linking portion cutting step S1602, along with the second linking portion 152.

In a case where the material making up the first solid electrolyte layer 213 and second solid electrolyte layer 223 is the same (i.e., in a case where the coating material to become the first solid electrolyte layer 213 and second solid electrolyte layer 223 is the same), the first solid electrolyte layer forming step S1401 and second solid electrolyte layer forming step S1402 can be executed consecutively. This can further simplify the step of forming solid electrolyte layers.

Note that in the second embodiment, the first rear face region 112 and second rear face region 114 may come into contact with each other, due to the current collector folding unit 430 folding the current collector 100 at the first fold region 116.

In other words, the first rear face region 112 and second rear face region 114 may come into contact with each other due to the current collector 100 being folded at the first fold region 116 by the current collector folding unit 430 in the first fold region folding step S1301.

According to the above configuration, the first rear face region 112 and second rear face region 114 can be brought into contact with each other by a simple process (folding step). This enables conduction of electricity between the first rear face region 112 and second rear face region 114, which are in contact with each other. Thus, electron mobility is realized at the first fold region 116 (i.e., the first fold portion 115), and also electron mobility is realized between the first rear face region 112 and second rear face region 114 that are in contact with each other, while increasing the bonding strength between the component materials of the battery by the first fold region 116 (i.e., the first fold portion 115).

Note that the entire faces of the first rear face region 112 and second rear face region 114 may be in contact with each other, as illustrated in FIGS. 22 and 23 according to the second embodiment. Alternatively, part of the first rear face region 112 and second rear face region 114 may be in contact with each other. Alternatively, the first rear face region 112 and second rear face region 114 do not have to be in contact with each other. In this case, a separate member may be disposed between the first rear face region 112 and second rear face region 114.

Figure 26:
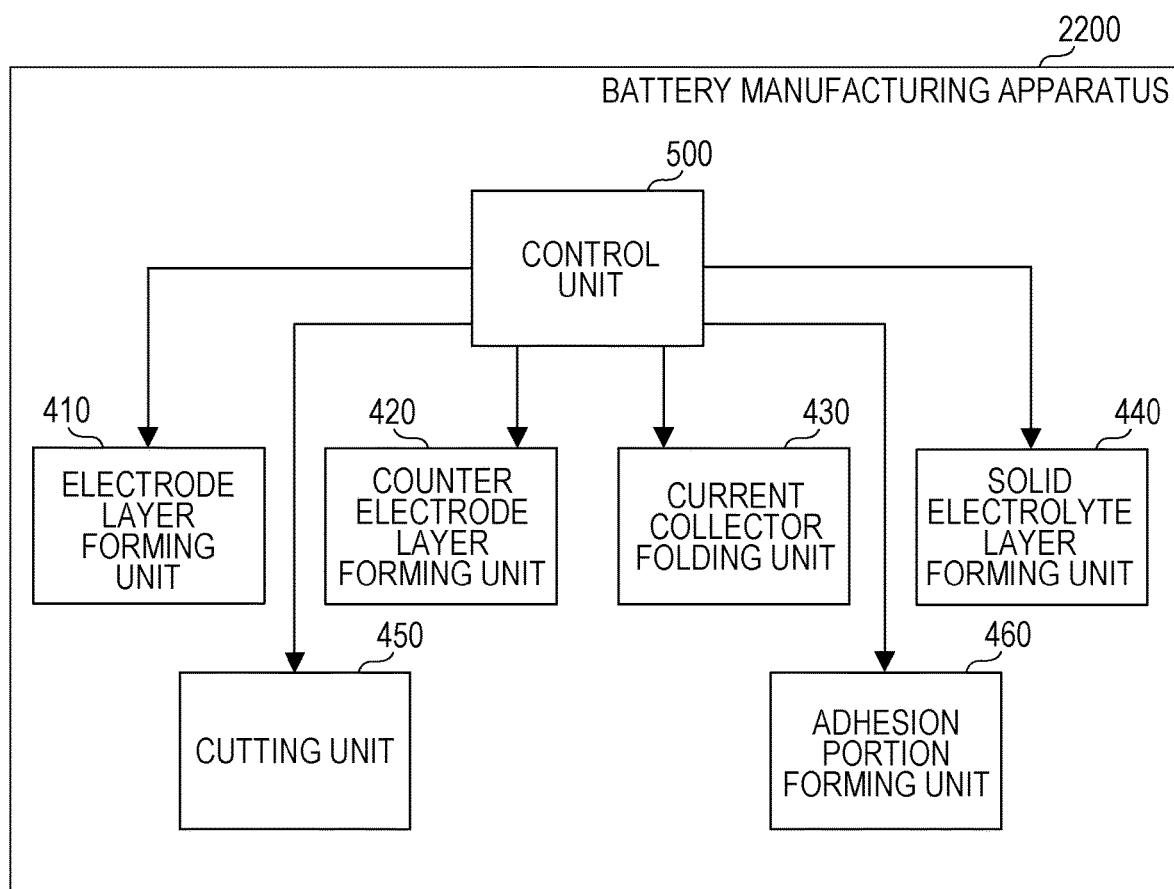
FIG. 26 is a diagram illustrating a schematic configuration of a battery manufacturing apparatus according to the second embodiment.

FIG. 26 is a diagram illustrating a schematic configuration of a battery manufacturing apparatus 2200 according to the second embodiment.

The battery manufacturing apparatus 2200 according to the second embodiment further has the following configuration, in addition to the configuration of the above-described battery manufacturing apparatus 2100 according to the second embodiment.

That is to say, the battery manufacturing apparatus 2200 according to the second embodiment is further provided with an adhesion portion forming unit 460.

The adhesion portion forming unit 460 forms a first adhesion portion 310 in contact with at least one of the first rear face region 112 and second rear face region 114.

The first adhesion portion 310 is a portion adhering the first rear face region 112 and second rear face region 114 to each other.

Figure 27:
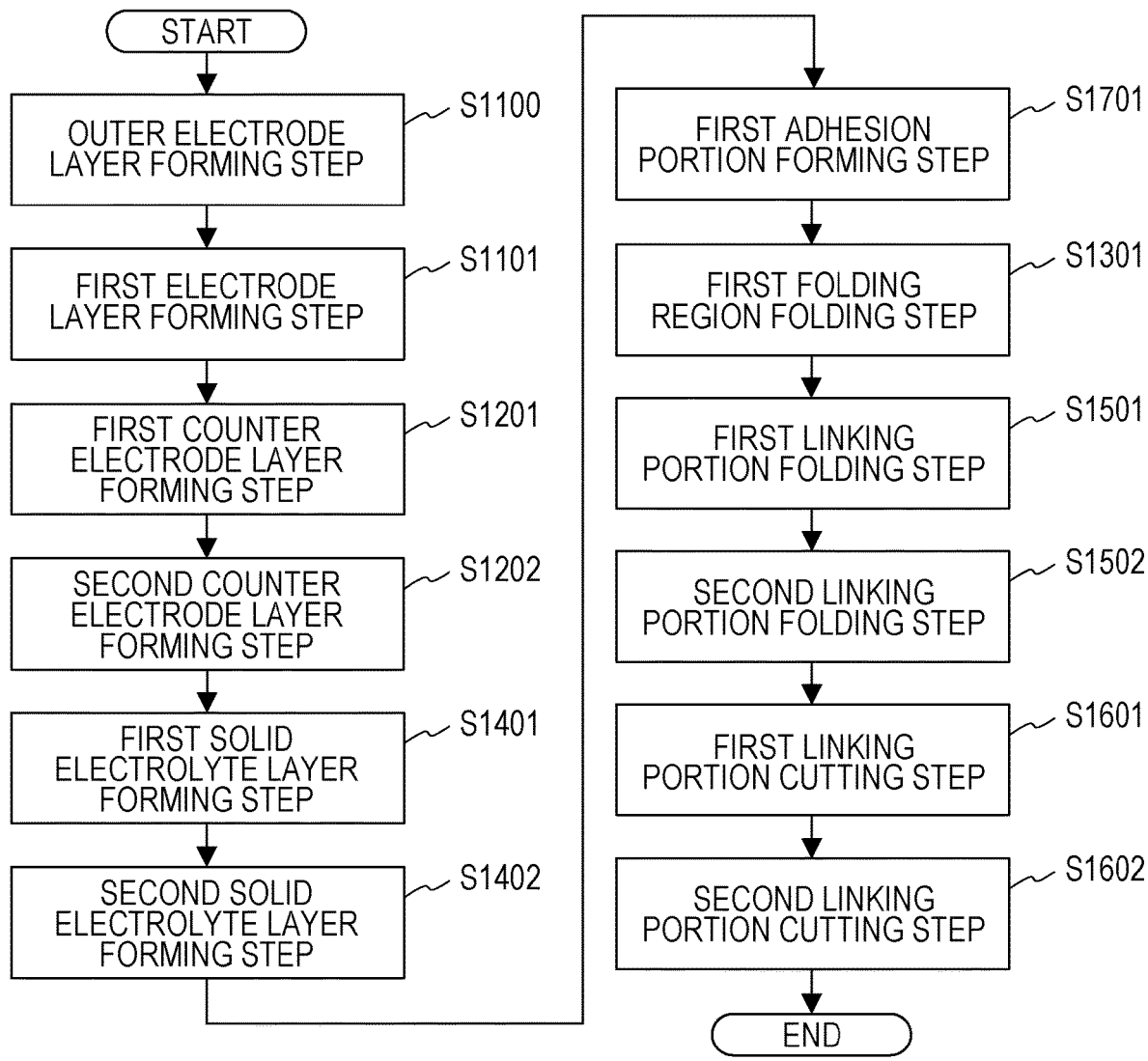
FIG. 27 is a flowchart illustrating an example of a battery manufacturing method according to the second embodiment.

FIG. 27 is a flowchart illustrating an example of a battery manufacturing method according to the second embodiment.

The battery manufacturing method illustrated in FIG. 27 further includes the following steps, in addition to the steps of the above-described battery manufacturing method illustrated in FIG. 16.

That is to say, the battery manufacturing method illustrated in FIG. 27 further includes a first adhesion portion forming step S1701 (i.e., a step (g1)).

The first adhesion portion forming step S1701 is a step in which the first adhesion portion 310 is formed in contact with at least one of the first rear face region 112 and second rear face region 114 by the adhesion portion forming unit 460.

According to the above manufacturing apparatus and manufacturing method, the bonding strength among the component members of the battery can be further improved. That is to say, the positional relationship between the first counter electrode layer 212 disposed on the first front face region 111 and the first electrode layer 221 disposed on the second front face region 113 can be more strongly maintained by the first adhesion portion 310, in addition to the first fold region 116 (i.e., the first fold portion 115). Accordingly, the layers (or cells) making up the battery can be prevented from exhibiting positional shifting or separation due to shock, vibration, and so forth, when manufacturing the battery or using the battery, for example. Thus, reliability of the battery can be improved.

Figure 28:
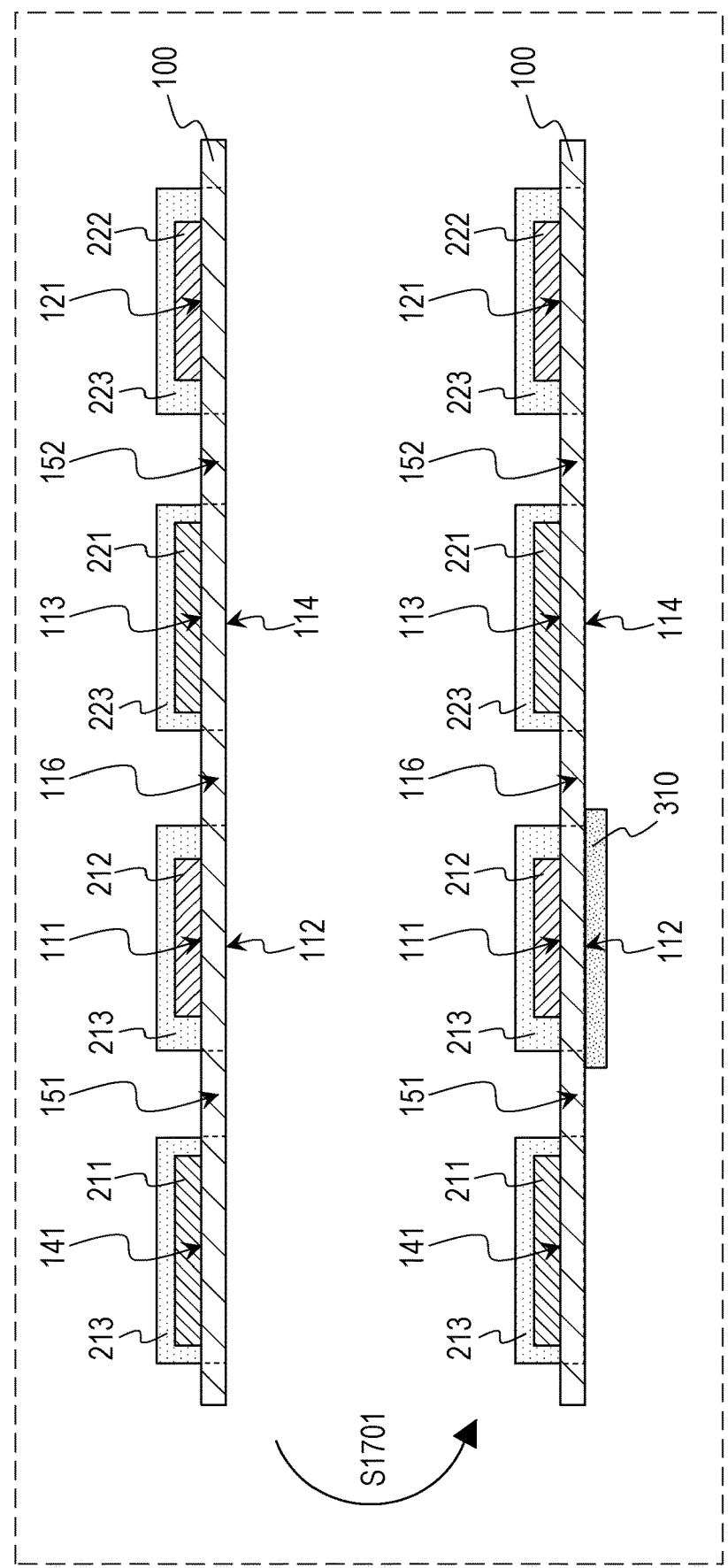
FIG. 28 is a diagram illustrating an example of a first adhesion portion forming step.

FIG. 28 is a diagram illustrating an example of the first adhesion portion forming step S1701.

The first adhesion portion 310 us formed in contact with at least one of the first rear face region 112 and second rear face region 114 by the adhesion portion forming unit 460, due to the first adhesion portion forming step S1701 being executed. The adhesion portion forming unit 460 may apply a coating material (i.e., an adhesive material making up the first adhesion portion 310) on at least one of the first rear face region 112 and second rear face region 114, for example.

Note that in the first adhesion portion forming step S1701, the first adhesion portion 310 may be formed in contact with both of the first rear face region 112 and second rear face region 114, by the adhesion portion forming unit 460. Alternatively, the first adhesion portion 310 may be formed in contact with only one of the first rear face region 112 and second rear face region 114, by the adhesion portion forming unit 460.

Figure 29:
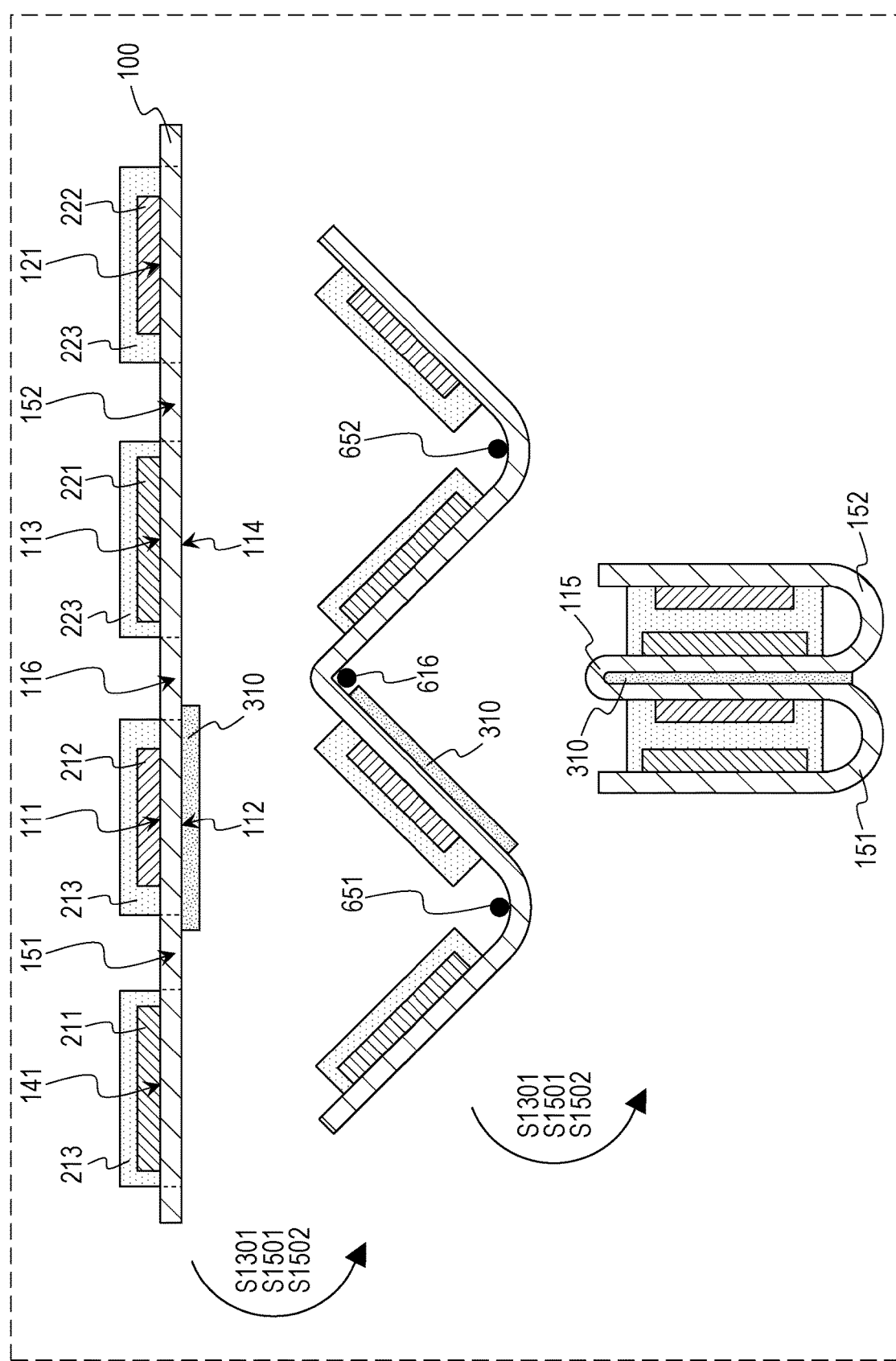
FIG. 29 is a diagram illustrating an example of a first fold region folding step.

FIG. 29 is a diagram illustrating an example of the first fold region folding step S1301.

The first adhesion portion 310 can be disposed between the first rear face region 112 and second rear face region 114 by folding the current collector 100, where the first adhesion portion 310 has been formed, as illustrated in FIG. 29.

Note that the first adhesion portion forming step S1701 may be executed before the first fold region folding step S1301.

Alternatively, the first adhesion portion forming step S1701 may be performed after the first fold region folding step S1301. At this time, the first adhesion portion forming step S1701 may be a step of forming the first adhesion portion 310 by injecting adhesive material into the gap between the first rear face region 112 and second rear face region 114 by the adhesion portion forming unit 460.

According to the above battery manufacturing method, the above-described battery 1200 according to the first embodiment can be fabricated.

Note that in the first adhesion portion forming step S1701, the first adhesion portion 310 may be formed non-continuously in contact with at least one of the first rear face region 112 and second rear face region 114, by the adhesion portion forming unit 460. Thus, the above-described battery 1300 according to the first embodiment can be fabricated.

Note that in the second embodiment, the current collector 100 may include the third rear face region 122, the fourth front face region 123, the fourth rear face region 124, and a second fold region 126.

The third rear face region 122 is a region situated on the rear face of the third front face region 121.

The fourth rear face region 124 is a region situated on the rear face of the fourth front face region 123.

The second fold region 126 is a region situated between the third front face region 121 and fourth front face region 123.

In the battery manufacturing apparatus according to the second embodiment, the electrode layer forming unit 410 may form the second electrode layer 231 in contact with the fourth front face region 123.

Also, in the battery manufacturing apparatus according to the second embodiment, the current collector folding unit 430 may fold the second fold region 126.

Figure 30:
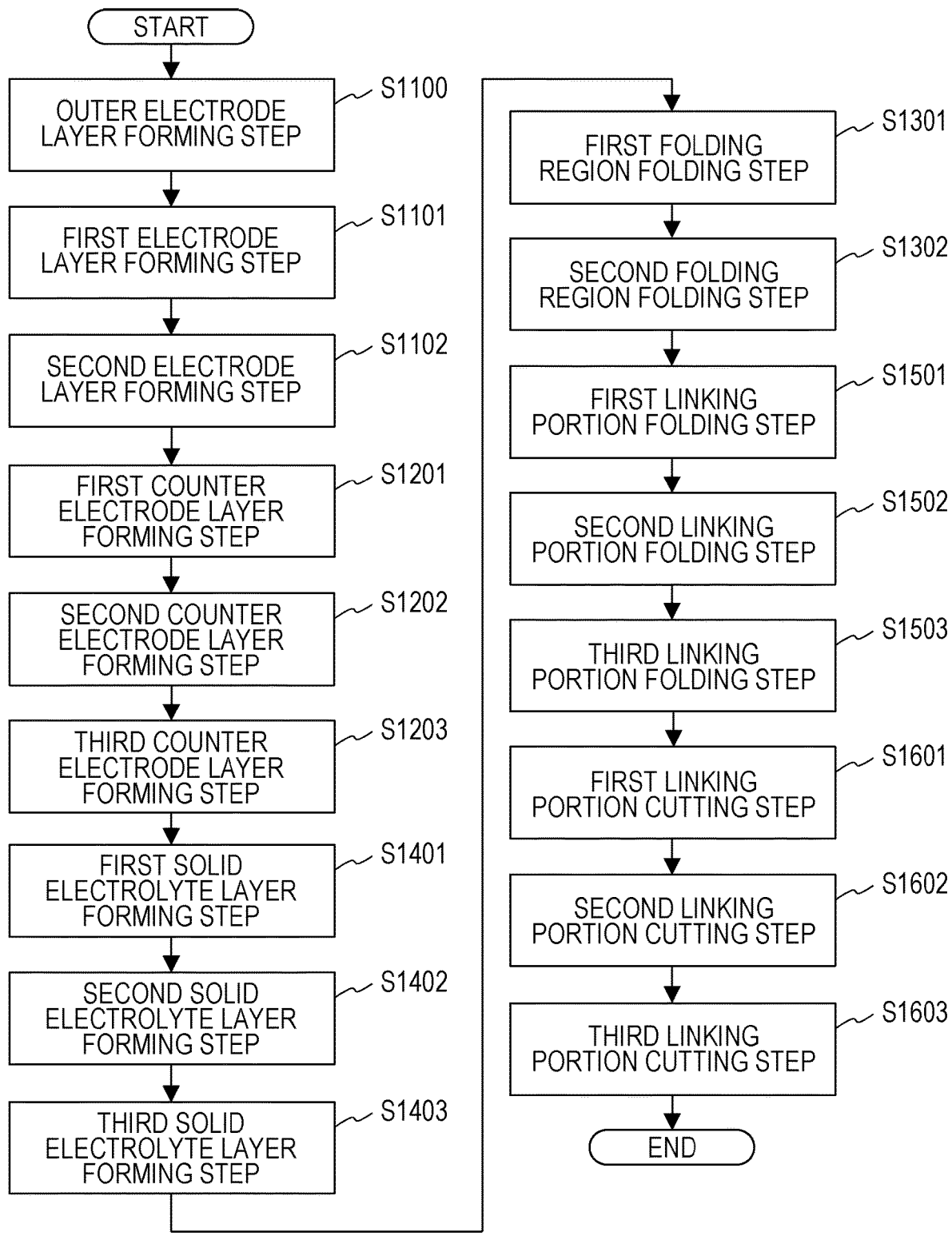
FIG. 30 is a flowchart illustrating an example of a battery manufacturing method according to the second embodiment.

FIG. 30 is a flowchart illustrating an example of a battery manufacturing method according to the second embodiment.

The battery manufacturing method illustrated in FIG. 30 further includes the following steps, in addition to the steps of the above-described battery manufacturing method illustrated in FIG. 16.

That is to say, the battery manufacturing method illustrated in FIG. 30 further includes a second electrode layer forming step S1102 (i.e., a step (a2)), and a second fold region folding step S1302 (i.e., a step (c2)).

The second electrode layer forming step S1102 is a step in which the second electrode layer 231 is formed in contact with the fourth front face region 123 by the electrode layer forming unit 410.

The second fold region folding step S1302 is a step in which the second fold region 126 is folded by the current collector folding unit 430.

According to the above manufacturing apparatus and manufacturing method, the bonding strength among component members of the battery can be further improved. That is to say, the second counter electrode layer 222 and second electrode layer 231 can be respectively disposed on the third front face region 121 and fourth front face region 123 (i.e., two regions that are partial regions of the current collector 100 and that are linked by the second fold region 126). Accordingly, the positional relationship between the position where the second counter electrode layer 222 is formed and the position where the second electrode layer 231 is formed can be strongly maintained by the second fold region 126 (in other words, by the current collector 100 that is one component). Thus, the formation position of the second counter electrode layer 222 and second electrode layer 231 can be prevented from deviating in a step of forming the second counter electrode layer 222 and second electrode layer 231 on the current collector 100 (or in other steps). Further, in a case where the laminated battery is configured using the current collector 100, for example, three battery cells (cells) making up the battery can be linked with each other by the current collector 100 when manufacturing the battery. Thus, the layers (or cells) making up the battery can be prevented from exhibiting positional shifting or separation due to shock, vibration, and so forth, when manufacturing the battery, for example. Thus, yield when manufacturing the battery can be improved.

Also, according to the above configuration, electrodes having a bipolar structure can be fabricated by a convenient single-face film formation process. That is to say, a bipolar current collector having the two poles of the second counter electrode layer 222 and second electrode layer 231 can be fabricated by the step of forming the second counter electrode layer 222 and second electrode layer 231 on one face of the current collector 100 (i.e., the front face of the current collector 100 where the third front face region 121 and fourth front face region 123 are situated), and the step of folding at the second fold region 126. Thus, bipolar-structure electrodes can be fabricated more conveniently and less expensively as compared to a case of using a process of forming films on both faces of the current collector.

The current collector 100 may have a third linking portion 153 and a fifth front face region 131 in the second embodiment.

The third linking portion 153 is a region adjacent to the fourth front face region 123.

The fifth front face region 131 is a region adjacent to the third linking portion 153.

Note that in the battery manufacturing apparatus according to the second embodiment, the counter electrode layer forming unit 420 may form the third counter electrode layer 232 in contact with the fifth front face region 131.

Also, in the battery manufacturing apparatus according to the second embodiment, the solid electrolyte layer forming unit 440 may form the third solid electrolyte layer 233 on at least one of the second electrode layer 231 and third counter electrode layer 232.

The current collector folding unit 430 may fold the third linking portion 153.

The third solid electrolyte layer 233 may be disposed between the second electrode layer 231 and third counter electrode layer 232 at this time, by the current collector 100 being folded at the third linking portion 153 by the current collector folding unit 430.

The cutting unit 450 may cut the third linking portion 153.

In other words, the battery manufacturing method according to the second embodiment may further include a third counter electrode layer forming step S1203 (i.e., a step (b3)), a third solid electrolyte layer forming step S1403 (i.e., a step (d3)), a third linking portion folding step S1503 (i.e., a step (e3)), and a third linking portion cutting step S1603 (i.e., a step (f3)) as illustrated in FIG. 30.

The third counter electrode layer forming step S1203 is a step in which the third counter electrode layer 232 is formed in contact with the fifth front face region 131 by the counter electrode layer forming unit 420.

The third solid electrolyte layer forming step S1403 is a step in which the third solid electrolyte layer 233 is formed on at least one of the second electrode layer 231 and third counter electrode layer 232 by the solid electrolyte layer forming unit 440.

The third linking portion folding step S1503 is a step in which the third linking portion 153 is folded by the current collector folding unit 430. The third linking portion folding step S1503 may be executed after the third solid electrolyte layer forming step S1403.

The third solid electrolyte layer 233 is disposed between the second electrode layer 231 and third counter electrode layer 232 due to the current collector 100 being folded at the third linking portion 153 by the current collector folding unit 430 in the third linking portion folding step S1503.

The third linking portion cutting step S1603 is a step in which the third linking portion 153 is cut by the cutting unit 450. The third linking portion cutting step S1603 may be executed after the third linking portion folding step S1503.

According to the above manufacturing apparatus and manufacturing method, one solid battery cell (third power-generating element 230) can be configured from the second electrode layer 231, third counter electrode layer 232, and third solid electrolyte layer 233. Thus, a laminated battery can be configured of the first power-generating element 210, second power-generating element 220, and third power-generating element 230 each being serially connected via the first current collector 110 and second current collector 120. The second power-generating element 220 (i.e., the first electrode layer 221, second counter electrode layer 222, and second solid electrolyte layer 223) and the third power-generating element 230 (i.e., the second electrode layer 231, third counter electrode layer 232, and third solid electrolyte layer 233) can be strongly linked by the second current collector 120 at this time. Accordingly, the battery cells (second power-generating element 220 and third power-generating element 230) that make up the battery can be prevented from exhibiting positional shifting or separation due to shock, vibration, and so forth, when manufacturing the battery or using the battery, for example. That is to say, the strength of bonding of the battery cells (second power-generating element 220 and third power-generating element 230) that make up the battery can be improved by the second current collector 120. Thus, the reliability of the battery can be improved while raising the battery voltage by the serial connection of the second power-generating element 220 and third power-generating element 230.

Figure 31:
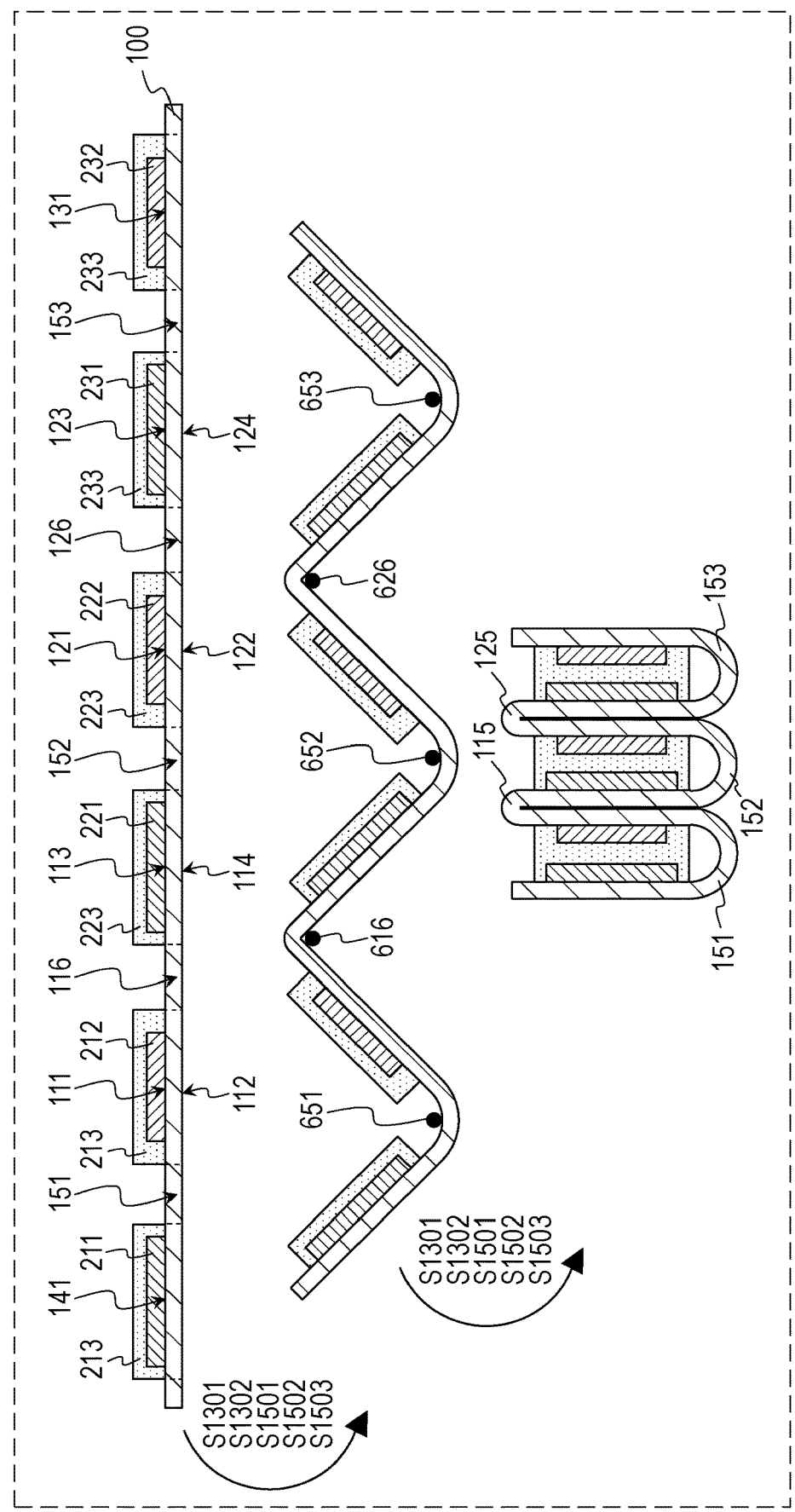
FIG. 31 is a diagram illustrating an example of second fold region folding step and a third linking portion folding step.

FIG. 31 is a diagram illustrating an example of the second fold region folding step S1302 and third linking portion folding step S1503.

The second fold region 126 is folded by the current collector folding unit 430, by the second fold region folding step S1302 being executed. The current collector folding unit 430 may have a folding member 626 (e.g., rod member, wire member, etc.), for example. The current collector folding unit 430 may at this time apply the folding member 626 against the second fold region 126, and move at least one of the current collector 100 and the folding member 626, thereby folding the second fold region 126.

Folding the second fold region 126 in the second fold region folding step S1302 forms the second fold portion 125 illustrated in the first embodiment described above.

The third linking portion 153 is folded by the current collector folding unit 430, by the third linking portion folding step S1503 being executed. The current collector folding unit 430 may have a folding member 653 (e.g., rod member, wire member, etc.), for example. The current collector folding unit 430 may at this time apply the folding member 653 against the third linking portion 153, and move at least one of the current collector 100 and the folding member 653, thereby folding the third linking portion 153.

The second fold region folding step S1302 may be executed before the first fold region folding step S1301, first linking portion folding step S1501, and second linking portion folding step S1502, or may be executed afterwards.

The third linking portion folding step S1503 may be executed before the second fold region folding step S1302, or may be executed afterwards.

Alternatively, the first fold region folding step S1301, second fold region folding step S1302, first linking portion folding step S1501, second linking portion folding step S1502, and third linking portion folding step S1503 may be executed at the same time, as illustrated in FIG. 31.

Also, in the third solid electrolyte layer forming step S1403, the third solid electrolyte layer 233 may be formed over a greater area than the second electrode layer 231 and third counter electrode layer 232, as illustrated in FIG. 31. Accordingly, the third solid electrolyte layer 233 can be disposed in contact with the second current collector 120 and third current collector 130.

Figure 32:
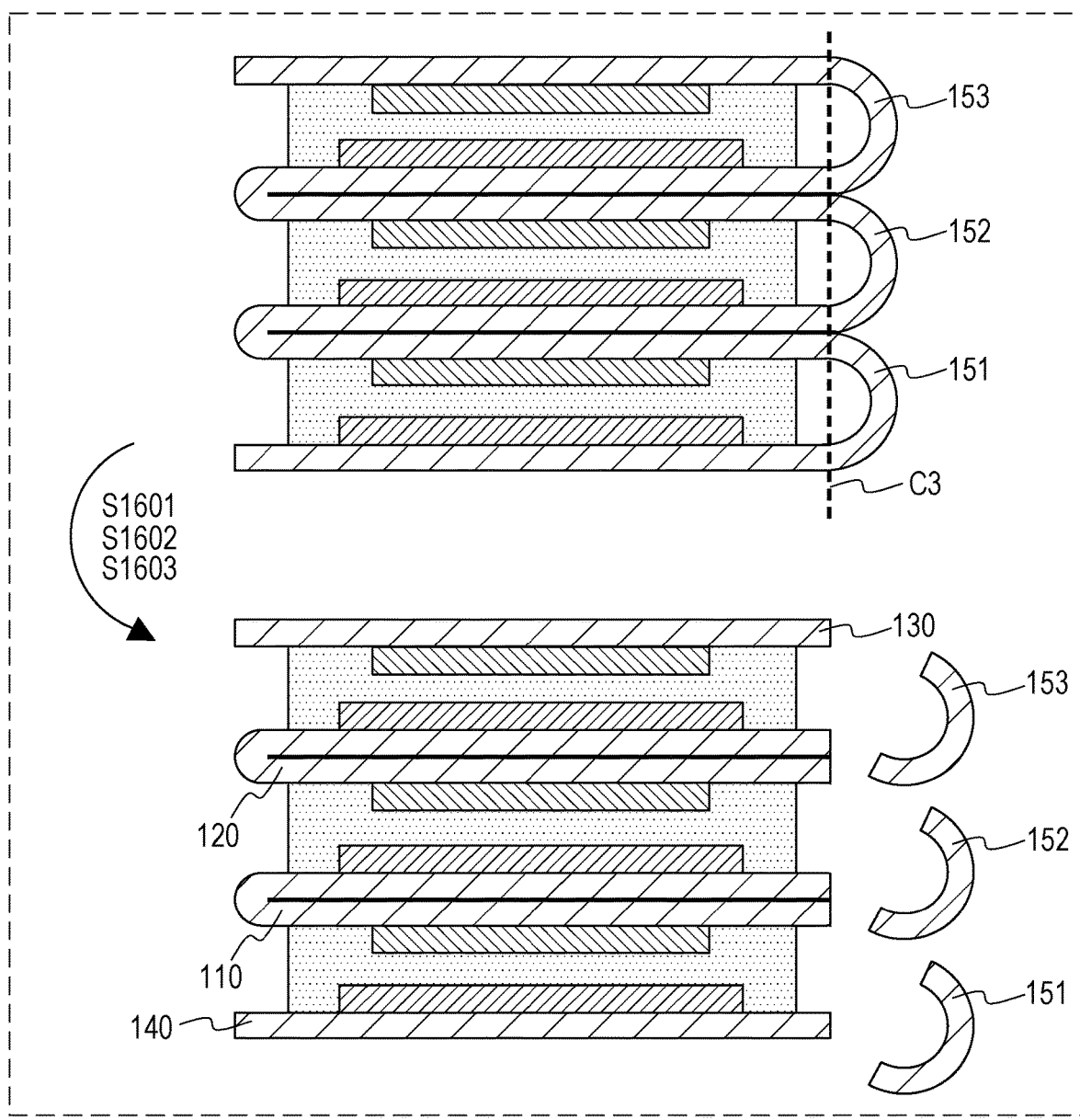
FIG. 32 is a diagram illustrating an example of a third linking portion cutting step.

FIG. 32 is a diagram illustrating an example of the third linking portion cutting step S1603.

The third linking portion 153 is cut by the cutting unit 450, by the third linking portion cutting step S1603 being executed. The cutting unit 450 may cut the third linking portion 153 by a cutting member (e.g., cutter, die punch device, etc.), for example. Alternatively, the cutting unit 450 may cut the third linking portion 153 using a method where part of the third linking portion 153 is removed by a chemical reaction or the like, for example. The short-circuited state of the second electrode layer 231 and third counter electrode layer 232 is resolved due to the third linking portion 153 being cut. Accordingly, the third power-generating element 230 can be charged/discharged as a cell battery.

The third linking portion cutting step S1603 may be executed before the first linking portion cutting step S1601 and second linking portion cutting step S1602, or may be executed afterwards.

Alternatively, the first linking portion cutting step S1601, second linking portion cutting step S1602, and third linking portion cutting step S1603 may be executed at the same time (e.g., the position C3 illustrated in FIG. 32 may be cut).

The current collector 100 becomes the outer current collector 140, first current collector 110, second current collector 120, and third current collector 130 illustrated in the first embodiment described above, by the first linking portion cutting step S1601, second linking portion cutting step S1602, and third linking portion cutting step S1603 being executed.

According to the specific example of the battery manufacturing method according to the second embodiment described above, the battery 1400 according to the above-described first embodiment can be fabricated.

Note that in the second embodiment, the adhesion portion forming unit 460 may form the second adhesion portion 320 in contact with at least one of the third rear face region 122 and fourth rear face region 124.

The second adhesion portion 320 is a portion that adheres the third rear face region 122 and fourth rear face region 124 to each other.

Figure 33:
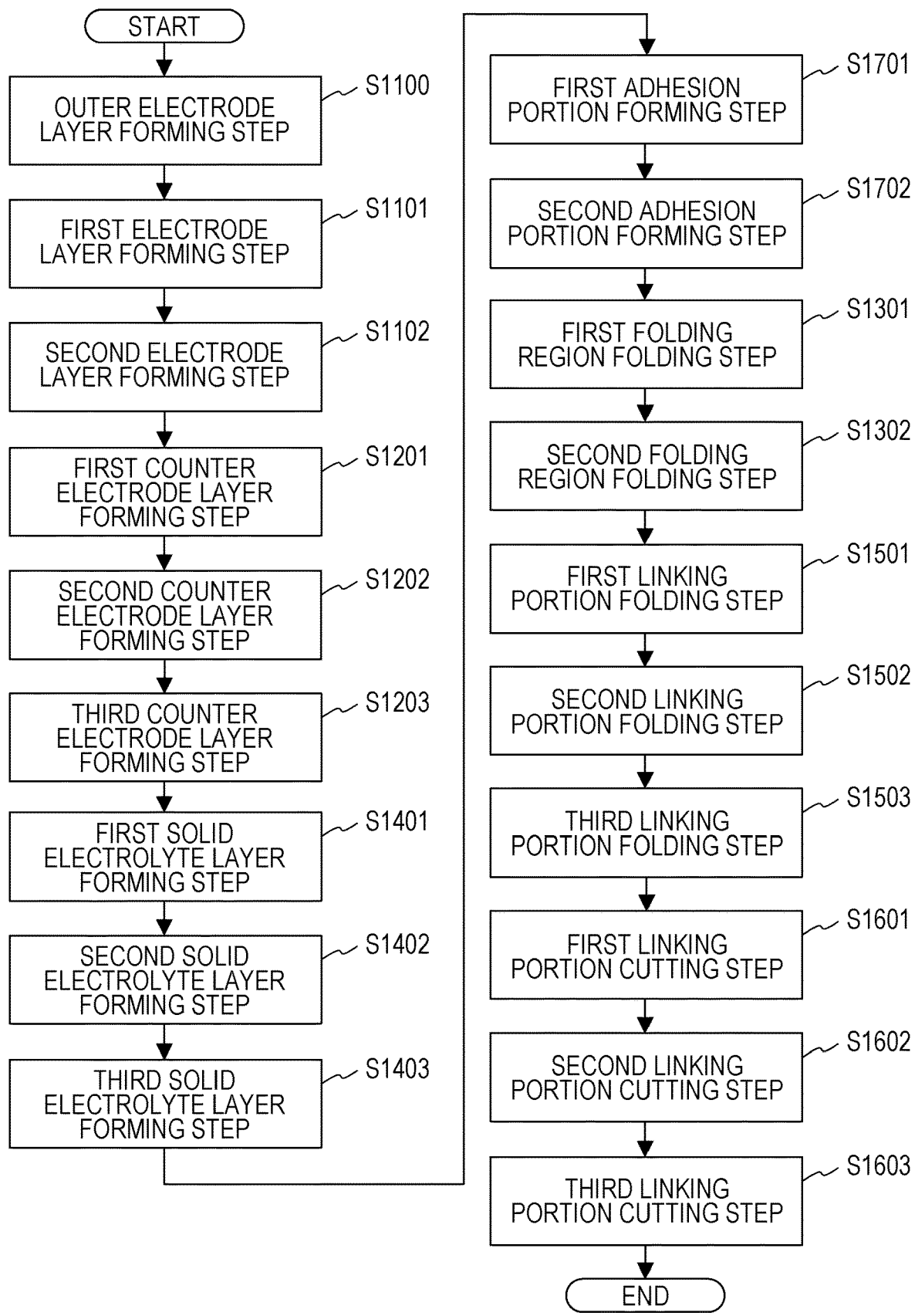
FIG. 33 is a flowchart illustrating an example of a battery manufacturing method according to the second embodiment.

FIG. 33 is a flowchart illustrating an example of a battery manufacturing method according to the second embodiment.

The battery manufacturing method illustrated in FIG. 33 further includes the following steps, in addition to the steps of the above-described battery manufacturing method illustrated in FIG. 30.

That is to say, the battery manufacturing method illustrated in FIG. 33 further includes the first adhesion portion forming step S1701 (i.e., the step (g1)) and a second adhesion portion forming step S1702 (i.e., a step (g2)).

The second adhesion portion forming step S1702 is a step in which the second adhesion portion 320 is formed in contact with at least one of the third rear face region 122 and fourth rear face region 124, by the adhesion portion forming unit 460.

According to the above manufacturing apparatus and manufacturing method, the bonding strength among the component members of the battery can be further improved. That is to say, the positional relationship between the second counter electrode layer 222 disposed on the third front face region 121 and the second electrode layer 231 disposed on the fourth front face region 123 can be more strongly maintained by the second adhesion portion 320, in addition to the second fold region 126 (i.e., the second fold portion 125). Accordingly, the layers (or cells) making up the battery can be prevented from exhibiting positional shifting or separation due to shock, vibration, and so forth, when manufacturing the battery or using the battery, for example. Thus, reliability of the battery can be improved.

The second adhesion portion forming step S1702 may be executed before the first adhesion portion forming step S1701, or may be executed afterwards.

The second adhesion portion forming step S1702 may also be executed before the second fold region folding step S1302.

Alternatively, the second adhesion portion forming step S1702 may be executed after the second fold region folding step S1302. At this time, the second adhesion portion forming step S1702 may be a step of forming the second adhesion portion 320 by injecting adhesive material into the gap between the third rear face region 122 and fourth rear face region 124 by the adhesion portion forming unit 460.

According to the above-described battery manufacturing method, the above-described battery 1500 according to the first embodiment can be fabricated.

Note that in the second embodiment, the electrode layer forming unit 410, counter electrode layer forming unit 420, solid electrolyte layer forming unit 440, and adhesion portion forming unit 460 may each have, for example, a discharging mechanism (e.g., a discharge orifice) that discharges coating material (e.g., electrode material, counter electrode material, solid electrolyte material, adhesive material, etc.), a supply mechanism (e.g., a tank and supply tube) that supplies the coating material to the discharge mechanism, a conveyance mechanism (e.g., a roller) that conveys an object to be coated or the like, a pressing mechanism (e.g., a pressing stand and a cylinder) that applies pressure for compression, and so forth. Commonly known apparatuses and members may be used for these mechanisms as appropriate.

Note that in the second embodiment, the current collector folding unit 430 may be provided with, for example, a folding mechanism (e.g., rod member, wire member, etc.) that folds an object of folding, a conveying mechanism (e.g., roller) that conveys the object of folding or the like, and so forth. Commonly known apparatuses and members may be used for these mechanisms as appropriate.

Note that in the second embodiment, the cutting unit 450 may be provided with, for example, a cutting mechanism (e.g., cutter, die punch device, etc.), that cuts an object of cutting, a conveying mechanism (e.g., roller) that moves an object of cutting or the like, and so forth. Commonly known apparatuses and members may be used for these mechanisms as appropriate.

Note that the battery manufacturing apparatus according to the second embodiment may further have a control unit 500. The control unit 500 controls operations of the electrode layer forming unit 410, counter electrode layer forming unit 420, current collector folding unit 430, solid electrolyte layer forming unit 440, cutting unit 450, and adhesion portion forming unit 460.

The control unit 500 may be configured of a processor and memory, for example. The processor may be a central processing unit (CPU) or microprocessor unit (MPU) or the like, for example. At this time, the processor may execute the control method (battery manufacturing method) disclosed in the present disclosure by reading out and executing programs stored in the memory.

Note that the battery manufacturing method according to the second embodiment is not restricted to coating for the electrode layers, counter electrode layers, and solid electrolyte layers. These may be formed by other techniques (e.g., sequential laminating, applying two objects to each other, transferring, etc.), or by combinations of coating and other techniques, and so forth.

Note that in the battery manufacturing method according to the second embodiment, the power-generating elements may be pressed by a press or the like, after the folding steps of the insulating portions or the like. This can realize higher packing density, and stronger adhesion. That is to say, applying pressure in the layer direction of the layers enables making the layers more precise and in a better bonding state with each other.

The battery according to the present disclosure can be used as a battery for electronic equipment, electric appliances, electric vehicles, and so forth.

What is claimed is:

1. A battery, comprising:
a first current collector;
a first electrode layer;
a first counter electrode layer,
an outer electrode layer; and
a first solid electrolyte layer;
wherein the first counter electrode layer is a counter electrode of the first electrode layer,
wherein the first current collector includes a first front face region, a first rear face region, a second front face region, a second rear face region, and a first fold portion,
wherein the first rear face region is a region situated on the rear face of the first front face region,
wherein the second rear face region is a region situated on the rear face of the second front face region,
wherein the first fold portion is situated between the first front face region and second front face region,
wherein the first current collector is folded at the first fold portion, whereby the first rear face region and the second rear face region are positioned facing each other,
wherein the first electrode layer is disposed in contact with the second front face region,
wherein the first counter electrode layer is disposed in contact with the first front face region,
wherein the outer electrode layer is a counter electrode of the first counter electrode layer, and wherein the first solid electrolyte layer is disposed between the first counter electrode layer and the outer electrode layer.

2. The battery according to claim 1, further comprising:
an outer current collector;
wherein the outer current collector is disposed in contact with the outer electrode layer;
and wherein the solid electrolyte layer is disposed in contact with the first current collector and the outer current collector.

3. The battery according to claim 1, further comprising:
a second counter electrode layer; and
a second solid electrolyte layer,
wherein the second counter electrode layer is a counter electrode of the first electrode layer,
and wherein the second solid electrolyte layer is disposed between the first electrode layer and second counter electrode layer.

4. The battery according to claim 3, further comprising:
a second current collector,
wherein the second current collector is disposed in contact with the second counter electrode layer,
and wherein the second solid electrolyte layer is disposed in contact with the first current collector and second current collector.

5. The battery according to claim 3,
wherein the first fold portion is covered by at least one of the first solid electrolyte layer and second solid electrolyte layer.

6. The battery according to claim 1,
wherein the first rear face region and second rear face region are in contact with each other.

7. The battery according to claim 1, further comprising:
a first adhesion portion that adheres the first rear face region and second rear face region to each other,
wherein the first adhesion portion is disposed between the first rear face region and the second rear face region.

8. The battery according to claim 7,
wherein the first adhesion portion contains an electroconductive adhesive material.

9. The battery according to claim 1,
wherein the first front face region includes a first material,
wherein the second front face region includes a second material,
and wherein the second material is a material that is different from the first material.

10. The battery according to claim 1,
wherein the first rear face region and the second rear face region include a third material.

11. The battery according to claim 10,
wherein the first front face region includes a first material,
and wherein the first material is a material that is different from the third material.

12. The battery according to claim 10,
wherein the second front face region includes a second material,
and wherein the second material is a material that is different from the third material.

13. The battery according to claim 1, further comprising:
a second current collector;
a second electrode layer;
a second counter electrode layer, and;
a second solid electrolyte layer,
wherein the second counter electrode layer is a counter electrode of the first electrode layer and second electrode layer,
wherein the second current collector includes a third front face region, a third rear face region, a fourth front face region, a fourth rear face region, and a second fold portion,
wherein the third rear face region is a region situated on the rear face of the third front face region,
wherein the fourth rear face region is a region situated on the rear face of the fourth front face region,
wherein the second fold portion is situated between the third front face region and fourth front face region,
wherein the third rear face region and fourth rear face region are positioned facing each other, due to the second current collector being folded at the second fold portion,
wherein the second electrode layer is disposed in contact with the fourth front face region,
wherein the second counter electrode layer is disposed in contact with the third front face region,
and wherein the second solid electrolyte layer is disposed between the first electrode layer and second counter electrode layer.

14. A battery manufacturing method using a battery manufacturing apparatus,
wherein the battery manufacturing apparatus includes an electrode layer forming unit, a counter electrode layer forming unit, and a current collector folding unit that folds a current collector,
wherein the current collector includes a first front face region, a first rear face region, a second front face region, a second rear face region, and a first fold region,
wherein the first rear face region is a region situated on the rear face of the first front face region,
wherein the second rear face region is a region situated on the rear face of the second front face region,
wherein the first fold region is a region situated between the first front face region and the second front face region,
the method comprising steps of:
forming (a1) the first electrode layer in contact with the second front face region by the electrode layer forming unit;
forming (b1) the first counter electrode layer, which is a counter electrode of the first electrode layer, in contact with the first front face region, by the counter electrode layer forming unit;
forming (a0) an outer electrode layer, which is a counter electrode of the first counter electrode layer, in contact with the outer region, by the electrode layer forming unit;
forming (d1) a first solid electrolyte layer on at least one of the first counter electrode layer and outer electrode layer by the solid electrolyte layer forming unit; and
folding (c1) the first fold region by the current collector folding unit,
wherein the first rear face region and the second rear face region are positioned facing each other, due to the current collector being folded at the first fold region in the folding step (c1).

15. The battery manufacturing method according to claim 14,
wherein the battery manufacturing apparatus further includes a solid electrolyte layer forming unit and a cutting unit,
wherein the current collector includes a first linking portion adjacent to the first front face region, and an outer region adjacent to the first linking portion,
the method further comprising steps of:

folding (e1) the first linking portion by the current collector folding unit, after the forming step (d1); and cutting (f1) the first linking portion by the cutting unit, after the folding step (e1), wherein the first solid electrolyte layer is interposed between the first counter electrode layer and the outer electrode layer, due to the current collector being folded at the first linking portion by the current collector folding unit in the folding step (e1).

16. The battery manufacturing method according to claim 15, wherein the current collector includes a second linking portion adjacent to the second front face region and a third front face region adjacent to the second linking portion, the method further comprising steps of:

forming (b2) a second counter electrode layer, which is a counter electrode of the first electrode layer, in contact with the third front face region, by the counter electrode layer forming unit;

forming (d2) a second solid electrolyte layer on at least one of the first electrode layer and the second counter electrode layer by the solid electrolyte layer forming unit;

folding (e2) the second linking portion by the current collector folding unit after the forming step (d2); and cutting (f2) the second linking portion by the cutting unit after the folding (e2), wherein the second solid electrolyte layer is interposed between the first electrode layer and the second counter electrode layer, due to the current collector being folded at the second linking portion by the current collector folding unit in the folding step (e2).

17. The battery manufacturing method according to claim 16, wherein a first solid electrolyte layer is formed on a part of the first fold region by the solid electrolyte layer forming unit in the forming step (d1), or, a second solid electrolyte layer is formed on part of the first fold region by the solid electrolyte layer forming unit in the forming step (d2).

18. The battery manufacturing method according to claim 15, wherein the first rear face region and second rear face region come into contact with each other, due to the current collector being folded at the first fold region by the current collector folding unit in the folding step (c1).

19. The battery manufacturing method according to claim 15, wherein the battery manufacturing apparatus further includes an adhesion portion forming unit that forms a first adhesion portion that adheres the first rear face region and second rear face region to each other, the method further comprising a step of:

forming (g1) the first adhesion portion in contact with at least one of the first rear face region and the second rear face region, by the adhesion portion forming unit.

20. The battery manufacturing method according to claim 14, wherein the current collector includes a second linking portion adjacent to the second front face region, a third front face region adjacent to the second linking portion, a third rear face region, a fourth front face region, a fourth rear face region, and a second fold region, wherein the third rear face region is a region situated at the rear face of the third front face region, wherein the fourth rear face region is a region situated at the rear face of the fourth front face region, wherein the second fold region is a region situated between the third front face region and fourth front face region, the method further comprising steps of:

forming (a2) a second electrode layer in contact with the fourth front face region by the electrode layer forming unit;

forming (b2) a second counter electrode layer, which is a counter electrode of the first electrode layer and the second electrode layer, in contact with the third front face region, by the counter electrode layer forming unit;

folding (c2) the second fold region by the current collector folding unit;

forming (d2) a second solid electrolyte layer on at least one of the first electrode layer and the second counter electrode layer by the solid electrolyte layer forming unit;

folding (e2) the second linking portion by the current collector folding unit after the forming step (d2); and cutting (f2) the second linking portion by the cutting unit after the folding step (e2), wherein the second solid electrolyte layer is interposed between the first electrode layer and second counter electrode layer, due to the current collector being folded at the second linking portion by the current collector folding unit in the folding step (e2).

* * * * *